US010878846B2

(12) United States Patent
Kasada et al.

(10) Patent No.: US 10,878,846 B2
(45) Date of Patent: *Dec. 29, 2020

(54) MAGNETIC TAPE, MAGNETIC TAPE CARTRIDGE, AND MAGNETIC TAPE APPARATUS

(71) Applicant: FUJIFILM Corporation, Tokyo (JP)

(72) Inventors: Norihito Kasada, Minami-ashigara (JP); Eiki Ozawa, Minami-ashigara (JP); Atsushi Musha, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/777,201

(22) Filed: Jan. 30, 2020

(65) Prior Publication Data
US 2020/0251139 A1    Aug. 6, 2020

(30) Foreign Application Priority Data

Jan. 31, 2019    (JP) .................. 2019-016529

(51) Int. Cl.
*G11B 5/70*    (2006.01)
*G11B 5/702*    (2006.01)
(Continued)

(52) U.S. Cl.
CPC .......... *G11B 5/702* (2013.01); *G11B 5/00813* (2013.01); *G11B 5/70* (2013.01);
(Continued)

(58) Field of Classification Search
None
See application file for complete search history.

(56) References Cited

U.S. PATENT DOCUMENTS 4,731,292 A * 3/1988 Sasaki .................. G11B 5/7023
 252/62.54
4,818,606 A    4/1989 Koyama et al.
(Continued)

FOREIGN PATENT DOCUMENTS

JP    2-168415 A    6/1990
JP    9-190623 A    7/1997
(Continued)

OTHER PUBLICATIONS

Gerum et al., "Chromium containing magnetic iron oxide pigments process for their fabrication and their application," Apr. 10, 1991 (Apr. 10, 1991 publication) (Year: 1991).*
(Continued)

*Primary Examiner* — William J Klimowicz
(74) *Attorney, Agent, or Firm* — Sughrue Mion, PLLC

(57) ABSTRACT

The magnetic tape include a non-magnetic support and a magnetic layer including ferromagnetic powder and a binding agent, in which the magnetic layer has a timing-based servo pattern, an edge shape of the timing-based servo pattern, specified by magnetic force microscopy is a shape in which a difference ($L_{99.9}-L_{0.1}$) between a value $L_{99.9}$ of a cumulative distribution function of 99.9% and a value $L_{0.1}$ of a cumulative distribution function of 0.1% in a position deviation width from an ideal shape of the magnetic tape in a longitudinal direction is 180 nm or less, and an isoelectric point of a surface zeta potential of the magnetic layer is 5.5 or more.

20 Claims, 18 Drawing Sheets

(51) Int. Cl.
*G11B 5/008* (2006.01)
*G11B 5/735* (2006.01)
*G11B 5/78* (2006.01)
*G11B 5/706* (2006.01)

(52) U.S. Cl.
CPC .............. *G11B 5/706* (2013.01); *G11B 5/735* (2013.01); *G11B 5/78* (2013.01)

(56) References Cited

U.S. PATENT DOCUMENTS

| | | | |
|---|---|---|---|
| 5,689,384 | A | 11/1997 | Albrecht et al. |
| 7,755,863 | B2 | 7/2010 | Neumann et al. |
| 9,773,519 | B2* | 9/2017 | Kasada ................. G11B 5/5928 |
| 10,672,426 | B2* | 6/2020 | Kasada .................... G11B 5/78 |
| 2005/0153170 | A1 | 7/2005 | Inoue et al. |
| 2012/0003503 | A1 | 1/2012 | Mori |
| 2012/0244387 | A1 | 9/2012 | Mod et al. |
| 2015/0380036 | A1 | 12/2015 | Kasada et al. |
| 2016/0093322 | A1 | 3/2016 | Kasada et al. |
| 2016/0171993 | A1 | 6/2016 | Okubo |
| 2016/0189739 | A1 | 6/2016 | Kasada et al. |
| 2017/0186460 | A1* | 6/2017 | Kasada .................... G11B 5/78 |
| 2018/0374504 | A1* | 12/2018 | Kasada .............. G11B 5/70615 |
| 2019/0295586 | A1 | 9/2019 | Kasada |
| 2019/0295588 | A1* | 9/2019 | Kasada .................... G11B 5/78 |
| 2019/0295589 | A1* | 9/2019 | Kasada .................. G11B 5/735 |
| 2020/0126589 | A1* | 4/2020 | Iwamoto ............. G11B 5/7021 |
| 2020/0211593 | A1 | 7/2020 | Kasada |
| 2020/0243110 | A1 | 7/2020 | Kasada |

FOREIGN PATENT DOCUMENTS

| | | |
|---|---|---|
| JP | 2002-8910 A | 1/2002 |
| JP | 2005-243162 A | 9/2005 |
| JP | 2006-54018 A | 2/2006 |
| JP | 2011-134372 A | 7/2011 |
| JP | 2012-203956 A | 10/2012 |
| JP | 2016-110680 A | 6/2016 |

OTHER PUBLICATIONS

Notice of Allowance dated Sep. 16, 2020 in U.S. Appl. No. 16/848,331.
Office Action dated Sep. 2, 2020 in U.S. Appl. No. 16/361,814.
Office Action dated Sep. 27, 2019 in U.S. Appl. No. 16/361,570.
Communication issued Mar. 3, 2020 by the Japanese Patent Office in application No. 2017-123062, corresponds to U.S. Appl. No. 16/009,461.
Office Action dated Jun. 10, 2020 in U.S. Appl. No. 16/848,331.
Office Action dated Aug. 18, 2020 in U.S. Appl. No. 16/361,797.

* cited by examiner

MAGNETIC TAPE, MAGNETIC TAPE CARTRIDGE, AND MAGNETIC TAPE APPARATUS

CROSS-REFERENCE TO RELATED APPLICATIONS

This application claims priority under 35 U.S.C 119 to Japanese Patent Application No. 2019-016529 filed on Jan. 31, 2019. The above application is hereby expressly incorporated by reference, in its entirety, into the present application.

BACKGROUND OF THE INVENTION

1. Field of the Invention

The present invention relates to a magnetic tape, a magnetic tape cartridge, and a magnetic tape apparatus.

2. Description of the Related Art

A magnetic recording and reproducing apparatus which performs recording of data on a magnetic recording medium and/or reading (reproducing) of the recorded data is widely divided into a magnetic disk apparatus and a magnetic tape apparatus. A representative example of the magnetic disk apparatus is a hard disk drive (HDD). In the magnetic disk apparatus, a magnetic disk is used as the magnetic recording medium. Meanwhile, in the magnetic tape apparatus, a magnetic tape is used as the magnetic recording medium.

In both of the magnetic disk apparatus and the magnetic tape apparatus, it is preferable to narrow a recording track width, in order to increase recording capacity (to make high capacity). On the other hand, as the recording track width is narrowed, a signal of an adjacent track is easily mixed with a signal of a reading target track during the reproducing, and accordingly, it is difficult to maintain reproducing quality in a signal-to-noise ratio (SNR) or the like. In this regard, in recent years, it is proposed to improve reproducing quality by reading a signal of a recording track by a plurality of reading elements (also referred to as "reproducing elements") two-dimensionally (for example, see JP2016-110680A, JP2011-134372A, and U.S. Pat. No. 7,755,863B). In a case where the reproducing quality can be improved by doing so, the reproducing quality can be maintained, even in a case where the recording track width is narrowed, and accordingly, it is possible to increase recording capacity by narrowing the recording track width.

SUMMARY OF THE INVENTION

In JP2016-110680A and JP2011-134372A, studies regarding a magnetic disk apparatus are conducted. Meanwhile, in recent years, a magnetic tape is receiving attention as a data storage medium for storing a large amount of data for a long period of time. However, the magnetic tape apparatus is generally a sliding type apparatus in which data reading (reproducing) is performed due to contact and sliding between the magnetic tape and a reading element. Accordingly, a relative position between the reading element and a reading target track easily changes during the reproducing, and the reproducing quality in the magnetic tape apparatus tends to be hardly improved, compared to that in the magnetic disk apparatus. U.S. Pat. No. 7,755,863B discloses the description regarding the magnetic tape apparatus (tape drive), but does not disclose specific means for improving the reproducing quality of the magnetic tape apparatus.

An object of an aspect of the present invention is to provide a magnetic tape capable of reproducing data with excellent reproducing quality in a magnetic tape apparatus that uses a plurality of reading elements (reproducing elements).

An aspect of the present invention relates to a magnetic tape comprising: a non-magnetic support; and a magnetic layer including ferromagnetic powder and a binding agent, in which the magnetic layer has a timing-based servo pattern, an edge shape of the timing-based servo pattern, specified by magnetic force microscopy is a shape in which a difference ($L_{99.9}-L_{0.1}$) between a value $L_{99.9}$ of a cumulative distribution function of 99.9% and a value $L_{0.1}$ of a cumulative distribution function of 0.1% in a position deviation width from an ideal shape of the magnetic tape in a longitudinal direction is 180 nm or less, and an isoelectric point of a surface zeta potential of the magnetic layer is 5.5 or more.

In an aspect, the isoelectric point may be 5.5 or more and 7.0 or less.

In an aspect, the binding agent may be a binding agent containing an acidic group.

In an aspect, the acidic group may include at least one type of acidic group selected from the group consisting of a sulfonic acid group and a salt thereof.

In an aspect, the timing-based servo pattern may be a linear servo pattern which continuously extends from one side of the magnetic tape in a width direction to the other side thereof and is inclined at an angle α with respect to the width direction, and the ideal shape may be a linear shape extending in a direction of the angle α.

In an aspect, the difference ($L_{99.9}-L_{0.1}$) may be 100 nm or more and 180 nm or less.

In an aspect, the magnetic tape may further comprise a non-magnetic layer including non-magnetic powder and a binding agent between the non-magnetic support and the magnetic layer.

In an aspect, the magnetic tape may further comprise a back coating layer including non-magnetic powder and a binding agent on a surface side of the non-magnetic support opposite to a surface side provided with the magnetic layer.

An aspect of the present invention relates to a magnetic tape cartridge comprising the above magnetic tape.

An aspect of the present invention relates to a magnetic tape apparatus comprising: the above described magnetic tape; a reading element unit; and an extraction unit, in which the reading element unit includes a plurality of reading elements each of which reads data from a specific track region including a reading target track in a track region included in the magnetic tape, and the extraction unit performs a waveform equalization process with respect to each reading result for each reading element, to extract, from the reading result, data derived from the reading target track.

In an aspect, each of the plurality of reading elements may read data by a linear scanning method from the specific track region including the reading target track in the track region included in the magnetic tape.

In an aspect, the waveform equalization process may be a waveform equalization process according to a deviation amount in position between the magnetic tape and the reading element unit.

In an aspect, the waveform equalization process may be performed by using a tap coefficient determined in accordance with the deviation amount.

In an aspect, the deviation amount may be determined in accordance with a result obtained by reading the timing-based servo pattern of the magnetic layer of the magnetic tape using a servo element.

In an aspect, the reading element unit may include a servo element and a reading operation by the reading element unit may be performed synchronously with a reading operation by the servo element.

In an aspect, parts of the plurality of reading elements may be overlapped each other in a running direction of the magnetic tape.

In an aspect, the specific track region may be a region including the reading target track and an adjacent track which is adjacent to the reading target track, and each of the plurality of reading elements may straddle over both of the reading target track and the adjacent track, in a case where a positional relationship with the magnetic tape is changed.

In an aspect, the plurality of reading elements may be disposed in a line in a state of being adjacent to each other, in a width direction of the magnetic tape.

In an aspect, the plurality of reading elements may fall in the reading target track in a width direction of the magnetic tape.

In an aspect, regarding each of the plurality of reading elements, a ratio between an overlapping region with the reading target track and an overlapping region with an adjacent track which is adjacent to the reading target track may be specified from the deviation amount, and the tap coefficient may be determined in accordance with the specified ratio.

In an aspect, the extraction unit may include a two-dimensional finite impulse response (FIR) filter, and the two-dimensional FIR filter may compose each result obtained by performing the waveform equalization process with respect to each reading result for each reading element, to extract, from the reading result, data derived from the reading target track.

In an aspect, the plurality of reading elements may be a pair of reading elements.

According to an aspect of the present invention, it is possible to provide a magnetic tape with which a magnetic tape apparatus using a plurality of reading elements (reproducing elements) can reproduce data with excellent reproducing quality. According to an aspect of the present invention, it is possible to provide a magnetic tape cartridge including the magnetic tape. According to an aspect of the present invention, it is possible to provide a magnetic tape apparatus including the magnetic tape and a plurality of reading elements (reproducing elements).

DESCRIPTION OF THE PREFERRED EMBODIMENTS

Hereinafter, first, a configuration of a magnetic tape apparatus using a plurality of reading elements (reproducing elements) will be described.

Figure 22:
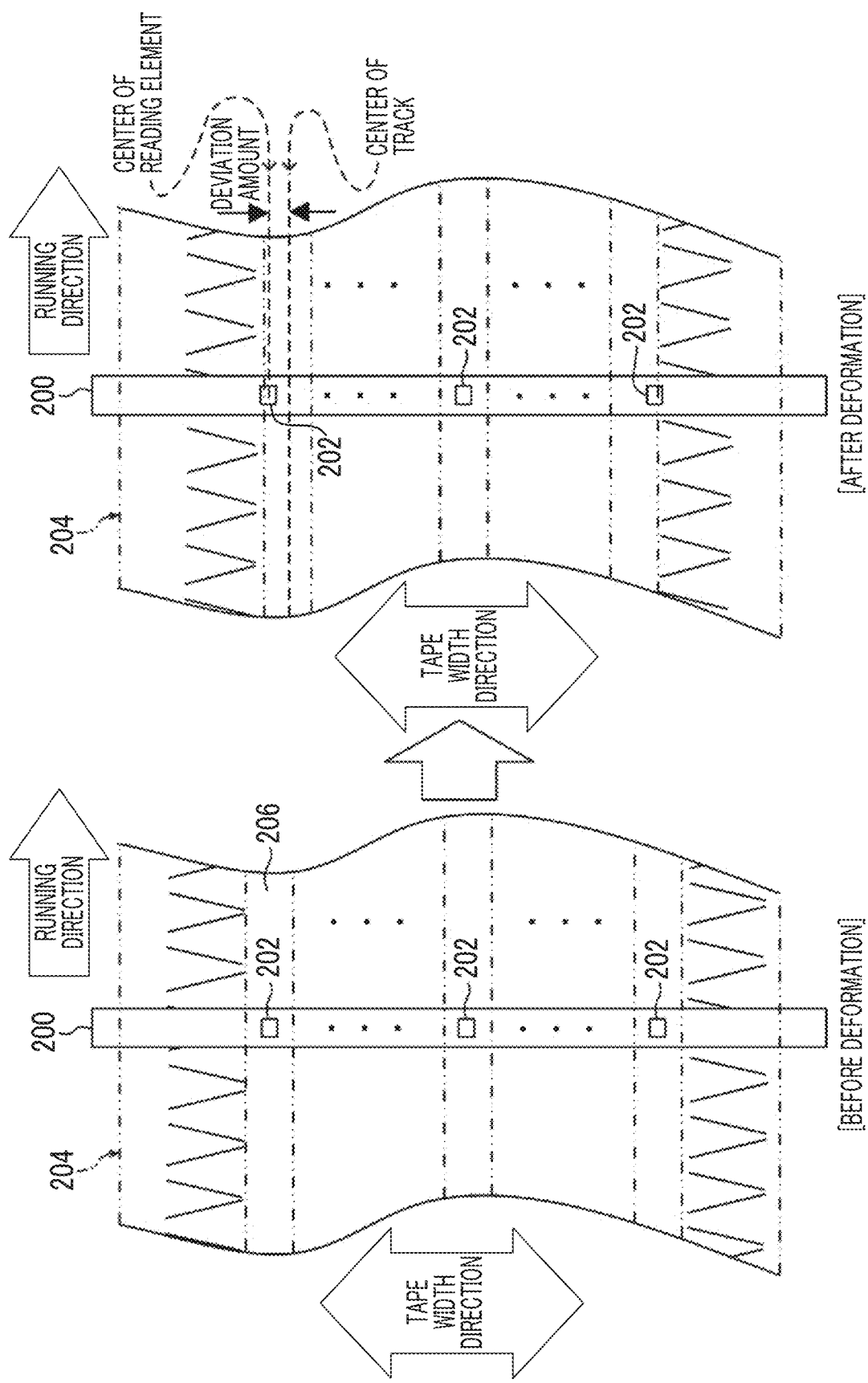
FIG. 22 is a conceptual view provided for description of a first example.

The magnetic tape apparatus includes a magnetic tape, a reading element unit, and an extraction unit. With respect to reading data from the magnetic tape, in an example shown in FIG. 22, an elongated reading head 200 comprises a plurality of reading elements 202 along a longitudinal direction. In a magnetic tape 204, a plurality of tracks 206 are formed. The reading head 200 is disposed so that the longitudinal direction coincides with a width direction of the magnetic tape 204. In addition, each of the plurality of reading elements 202 is allocated for each of the plurality of tracks 206 in a one-to-one relation, and reads data from the track 206 at a position faced.

However, in general, the magnetic tape 204 expands and contracts due to time elapse, an environment, a change of a tension, and the like. In a case where the magnetic tape expands and contracts in a width direction of the magnetic tape 204, the center of each of the reading elements 202 disposed on both ends in the longitudinal direction in the reading head 200 is deviated from the center of the track 206. In a case where the magnetic tape 204 is deformed due to the expansion and contraction in a width direction, particularly, the reading elements 202 closer to both ends of the reading head 200, among the plurality of reading elements 202, receive a greater effect of off-track. In order to reduce the effect of the off-track, for example, a method of applying a surplus width to the width of the track 206 has been considered. However, as the width of the track 206 increases, a recording capacity of the magnetic tape 204 decreases.

Figure 23:
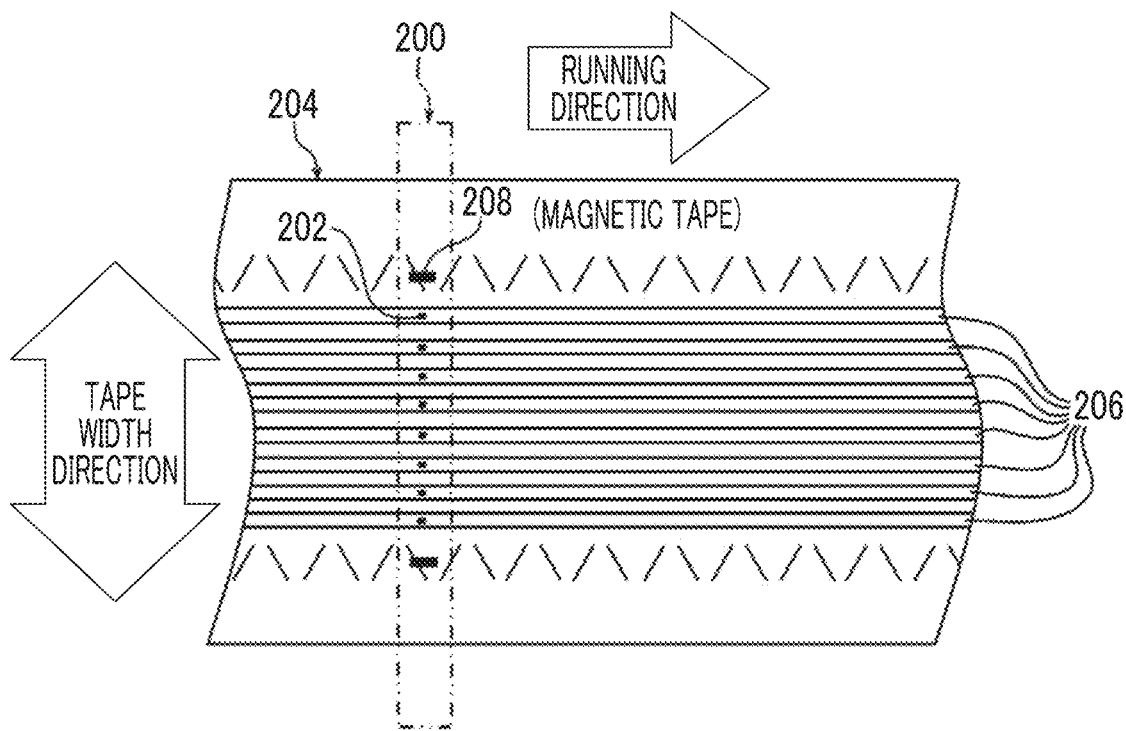
FIG. 23 is a conceptual view provided for description of a second example.

In addition, as shown in FIG. 23 as an example, in general, a servo element 208 is provided in the reading head 200. Regarding a magnetic tape 204, a servo pattern formed on a magnetic layer of the magnetic tape 204 is read by the servo element 208. A control device (not shown) specifies that which position on the magnetic tape 204 the reading element 202 runs on, for example, at regular time interval, from the servo signal obtained by reading the servo pattern by the servo element 208. Accordingly, a position error signal (PES) in a width direction of the magnetic tape 204 is detected by the control device.

As described above, in a case where the control device specifies a running position of the reading element 202, a feedback control is performed with respect to an actuator (not shown) for the reading head by the control device based on the specified running position, and accordingly, tracking by the magnetic tape 204 in the width direction is realized.

However, although the tracking is performed, sharp vibration, a high-frequency component of jitter, and the like are factors of an increase in PES, and this causes a deterioration in reproducing quality of data read from a reading target track.

On the other hand, in a case where data is each read by the plurality of reading elements from a specific track region including a reading target track in a track region included in the magnetic tape, a waveform equalization process is performed with respect to each reading result for each reading element, and data derived from the reading target track is extracted from the reading result, it is possible to improve reproducing quality of the data read from the reading target track, compared to a case where data is read by only a single reading element from the reading target track. As a result, it is possible to increase an acceptable amount of a deviation amount (a track off-set amount), for ensuring excellent reproducing quality.

Here, in a case where a change of the relative position between the reading element and the reading target track (hereinafter, referred to as "relative positional change") is large, a waveform equalization process performed on each of the reading results for each of the plurality of reading elements may not necessarily be a most suitable waveform equalization process for each reading result. For example, a waveform equalization process performed by a two-dimensional FIR filter may not necessarily be a most suitable waveform equalization process for each reading result. On the other hand, in a case where the relative positional change can be suppressed, a more suitable waveform equalization process can be performed for each of the reading results read by the plurality of reading elements. As a result, it is possible to increase an acceptable amount of a deviation amount, for ensuring excellent reproducing quality with respect to data derived from the reading target track, extracted by performing the waveform equalization process. In this regard, in the magnetic tape according to an aspect of the present invention, it is considered that an isoelectric point of a surface zeta potential of the magnetic layer of 5.5 or more leads to stabilization of a contact state between the magnetic tape and the reading element. It is supposed that this aspect contributes to suppression of the relative positional change. This point will be further described later.

Further, as the servo pattern is formed to be closer to a design shape (for example, ideal shape, details of which will be described later), an accuracy of specifying the position where the reading element is traveling is higher. This also leads to an increase in an acceptable amount of a deviation amount (a track off-set amount), for ensuring excellent reproducing quality. Regarding the above points, the difference ($L_{99.9}-L_{0.1}$) is an index related to a shape of the servo pattern (timing-based servo pattern). Details thereof will be described later.

As described above, an increase in an acceptable amount of a deviation amount, for ensuring excellent reproducing quality can contribute to the reproducing with excellent reproducing quality (for example, high SNR or low error rate), even in a case where a track margin (recording track width–reproducing element width) is decreased. A decrease in a track margin can contribute to an increase in the number of recording tracks capable of being disposed in a width direction of the magnetic tape by decreasing the recording track width, that is, realization of high capacity.

Hereinafter, a magnetic tape, a magnetic tape cartridge, and a magnetic tape apparatus according to an aspect of the present invention will be described in more detail. In the following, the magnetic tape apparatus and the like may be described with reference to the drawings. However, the present invention is not limited to aspects shown in the drawings.

Configuration of Magnetic Tape Apparatus and Magnetic Tape Reading Process

Figure 1:
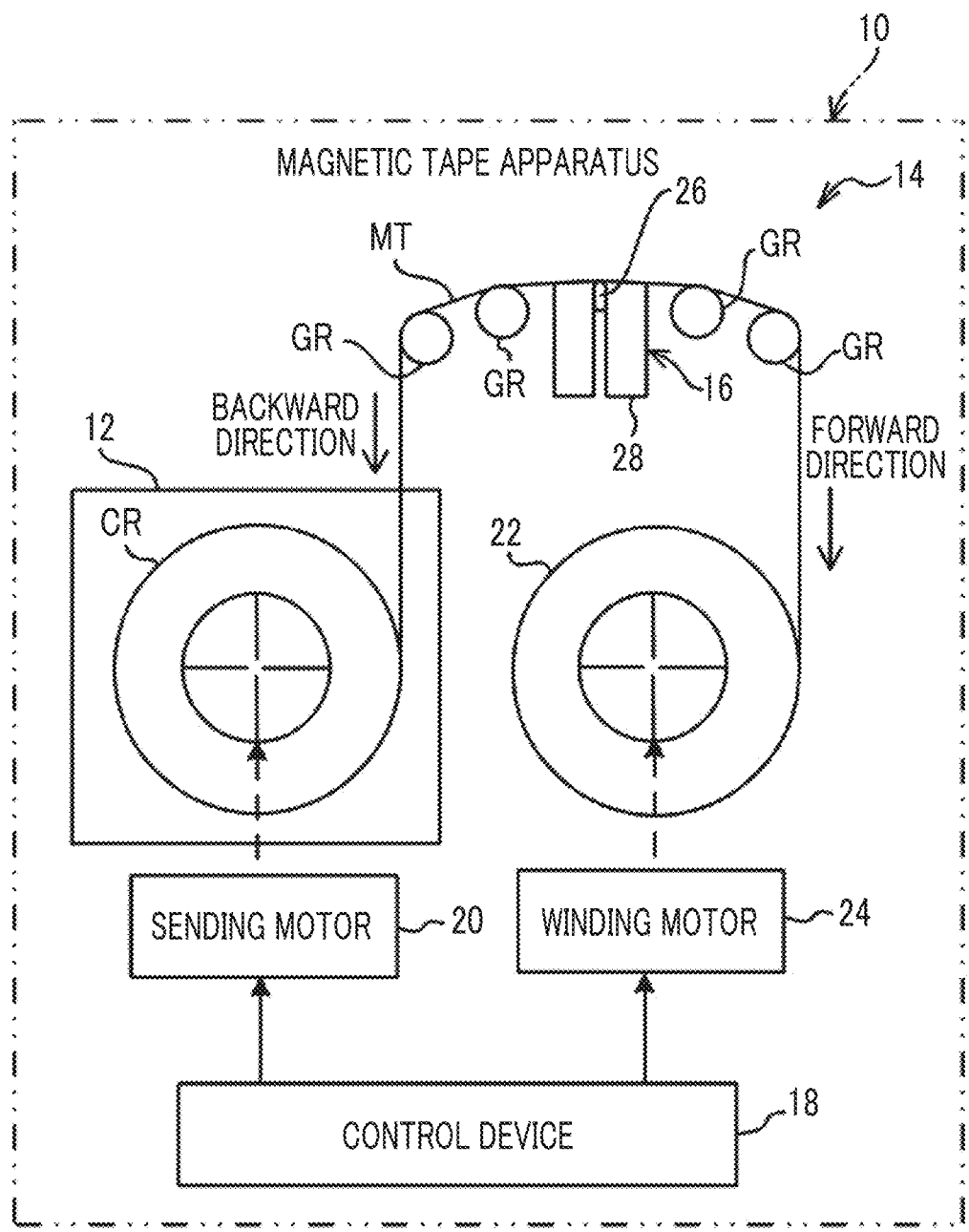
FIG. 1 is a schematic configuration view showing an example of an entire configuration of a magnetic tape apparatus.

As shown in FIG. 1 as an example, a magnetic tape apparatus 10 comprises a magnetic tape cartridge 12, a transportation device 14, a reading head 16, and a control device 18.

The magnetic tape apparatus 10 is an apparatus which extracts a magnetic tape MT from the magnetic tape cartridge 12 and reads data from the extracted magnetic tape MT by using the reading head 16 by a linear scanning method. The reading of data can also be referred to as reproducing of data.

The control device 18 controls the entire magnetic tape apparatus 10. In an aspect, the control performed by the control device 18 can be realized with an application specific integrated circuit (ASIC). In addition, in an aspect, the control performed by the control device 18 can be realized with a field-programmable gate array (FPGA). The control performed by the control device 18 may be realized with a computer including a central processing unit (CPU), a read only memory (ROM), and a random access memory (RAM). Further, the control may be realized with a combination of two or more of AISC, FPGA, and the computer.

The transportation device 14 is a device which selectively transports the magnetic tape MT in a forward direction and a backward direction, and comprises a sending motor 20, a winding reel 22, a winding motor 24, a plurality of guide rollers GR, and the control device 18.

A cartridge reel CR is provided in the magnetic tape cartridge 12. The magnetic tape MT is wound around the cartridge reel CR. The sending motor 20 causes the cartridge reel CR in the magnetic tape cartridge 12 to be rotatably driven under the control of the control device 18. The control device 18 controls the sending motor 20 to control a rotation direction, a rotation rate, a rotation torque, and the like of the cartridge reel CR.

In a case of winding the magnetic tape MT around the winding reel 22, the control device 18 rotates the sending motor 20 so that the magnetic tape MT runs in a forward direction. A rotation rate, a rotation torque, and the like of the sending motor 20 are adjusted in accordance with a speed of the magnetic tape MT wound around the winding reel 22.

The winding motor 24 causes the winding reel 22 to be rotatably driven under the control of the control device 18. The control device 18 controls the winding motor 24 to control a rotation direction, a rotation rate, a rotation torque, and the like of the winding reel 22.

In a case of winding the magnetic tape MT around the winding reel 22, the control device 18 rotates the winding motor 24 so that the magnetic tape MT runs in the forward direction. A rotation rate, a rotation torque, and the like of the winding motor 24 are adjusted in accordance with a speed of the magnetic tape MT wound around the winding reel 22.

By adjusting the rotation rate, the rotation torque, and the like of each of the sending motor 20 and the winding motor 24 as described above, a tension in a predetermined range is applied to the magnetic tape MT. Here, the predetermined range indicates a range of a tension obtained from a computer simulation and/or a test performed with a real machine, as a range of a tension at which data can be read from the magnetic tape MT by the reading head 16, for example.

In a case of rewinding the magnetic tape MT to the cartridge reel CR, the control device 18 rotates the sending motor 20 and the winding motor 24 so that the magnetic tape MT runs in the backward direction.

In an aspect, the tension of the magnetic tape MT is controlled by controlling the rotation rate, the rotation torque, and the like of each of the sending motor 20 and the winding motor 24. In addition, in an aspect, the tension of the magnetic tape MT may be controlled by using a dancer roller, or may be controlled by drawing the magnetic tape MT to a vacuum chamber.

Each of the plurality of guide rollers GR is a roller guiding the magnetic tape MT. A running path of the magnetic tape MT is determined by separately disposing the plurality of guide rollers GR on positions straddling over the reading head 16 between the magnetic tape cartridge 12 and the winding reel 22.

The reading head 16 comprises a reading unit 26 and a holder 28. The reading unit 26 is held by the holder 28 so as to come into contact with the magnetic tape MT during running.

Figure 2:
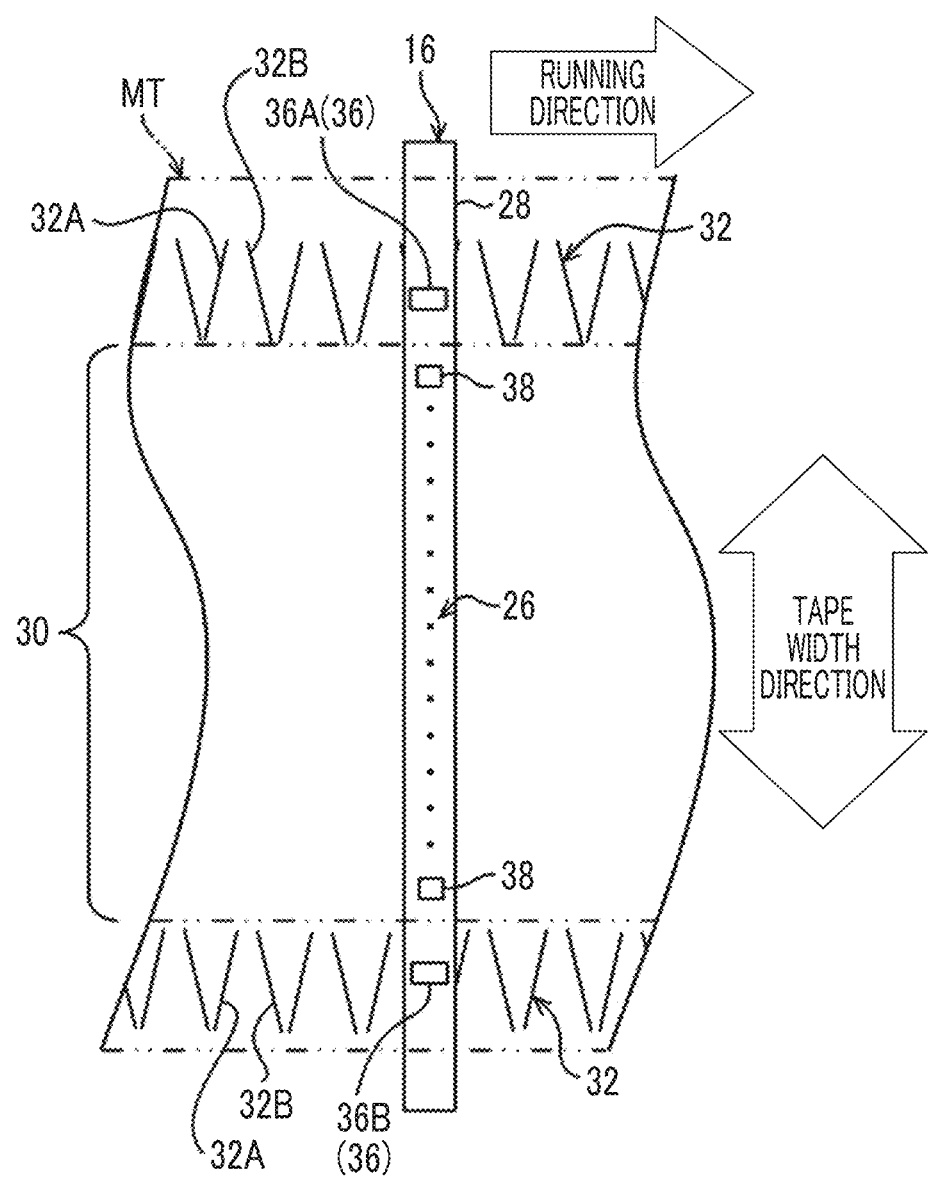
FIG. 2 is a schematic plan view showing an example of a schematic configuration in a plan view of a reading head and a magnetic tape included in the magnetic tape apparatus.

As shown in FIG. 2 as an example, the magnetic tape MT comprises a track region 30 and a servo pattern 32. The servo pattern 32 is a pattern used for detection of the position of the reading head 16 on the magnetic tape MT. The servo pattern 32 is a pattern in which a first diagonal line 32A at a first predetermined angle (for example, 95 degrees) and a second diagonal line 32B at a second predetermined angle (for example, 85 degrees) are alternately disposed on both end portions in a tape width direction at a constant pitch (cycle) along a running direction of the magnetic tape MT. The "tape width direction" here indicates a width direction of the magnetic tape MT.

The track region 30 is a region where data which is a reading target is written, and is formed on the center of the magnetic tape MT in the tape width direction. The "center in the tape width direction" here indicates, for example, a region between the servo pattern 32 on one end portion and the servo pattern 32 on the other end portion of the magnetic tape MT in the tape width direction. Hereinafter, for convenience of description, the "running direction of the magnetic tape MT" is simply referred to as the "running direction".

The reading unit 26 comprises a servo element pair 36 and a plurality of reading element units 38. The holder 28 is formed to be elongated in the tape width direction, and a total length of the holder 28 in the longitudinal direction is longer than the width of the magnetic tape MT. The servo element pair 36 is disposed on both end portions of the holder 28 in the longitudinal direction, respectively, and the plurality of reading element units 38 are disposed on the center of the holder 28 in the longitudinal direction.

The servo element pair 36 comprises servo elements 36A and 36B. The servo element 36A is disposed on a position facing the servo pattern 32 on one end portion of the magnetic tape MT in the tape width direction, and the servo element 36B is disposed on a position facing the servo pattern 32 on the other end portion of the magnetic tape MT in the tape width direction.

In the holder 28, the plurality of reading element units 38 are disposed between the servo element 36A and the servo element 36B along the tape width direction. The track region 30 comprises the plurality of tracks at regular interval in the tape width direction, and in a default state of the magnetic tape apparatus 10, each of the plurality of reading element units 38 is disposed to face each track in the track region 30.

Accordingly, the reading unit 26 and the magnetic tape MT relatively move linearly along the longitudinal direction of the magnetic tape MT, and thus, data of each track in the track region 30 is read by each reading element unit 38 at the corresponding position among the plurality of reading element units 38 by the linear scanning method. In addition, in the linear scanning method, the servo patterns 32 are read by the servo element pair 36 synchronously with the reading operation of the reading element units 38. That is, in an aspect of the linear scanning method, the reading with respect to the magnetic tape MT is performed in parallel by the plurality of reading element units 38 and the servo element pair 36.

Here, "each track in the track region 30" described above indicates a track included in "each of a plurality of specific track regions each including the reading target track in the track region included in the magnetic tape".

The "default state of the magnetic tape apparatus 10" indicates a state where the magnetic tape MT is not deformed and a positional relationship between the magnetic tape MT head the reading head 16 is a correct positional relationship. Here, the "correct positional relationship" indicates, for example, a positional relationship in which the center of the magnetic tape MT in the tape width direction and the center of the reading head 16 in the longitudinal direction coincide with each other.

Figure 3:
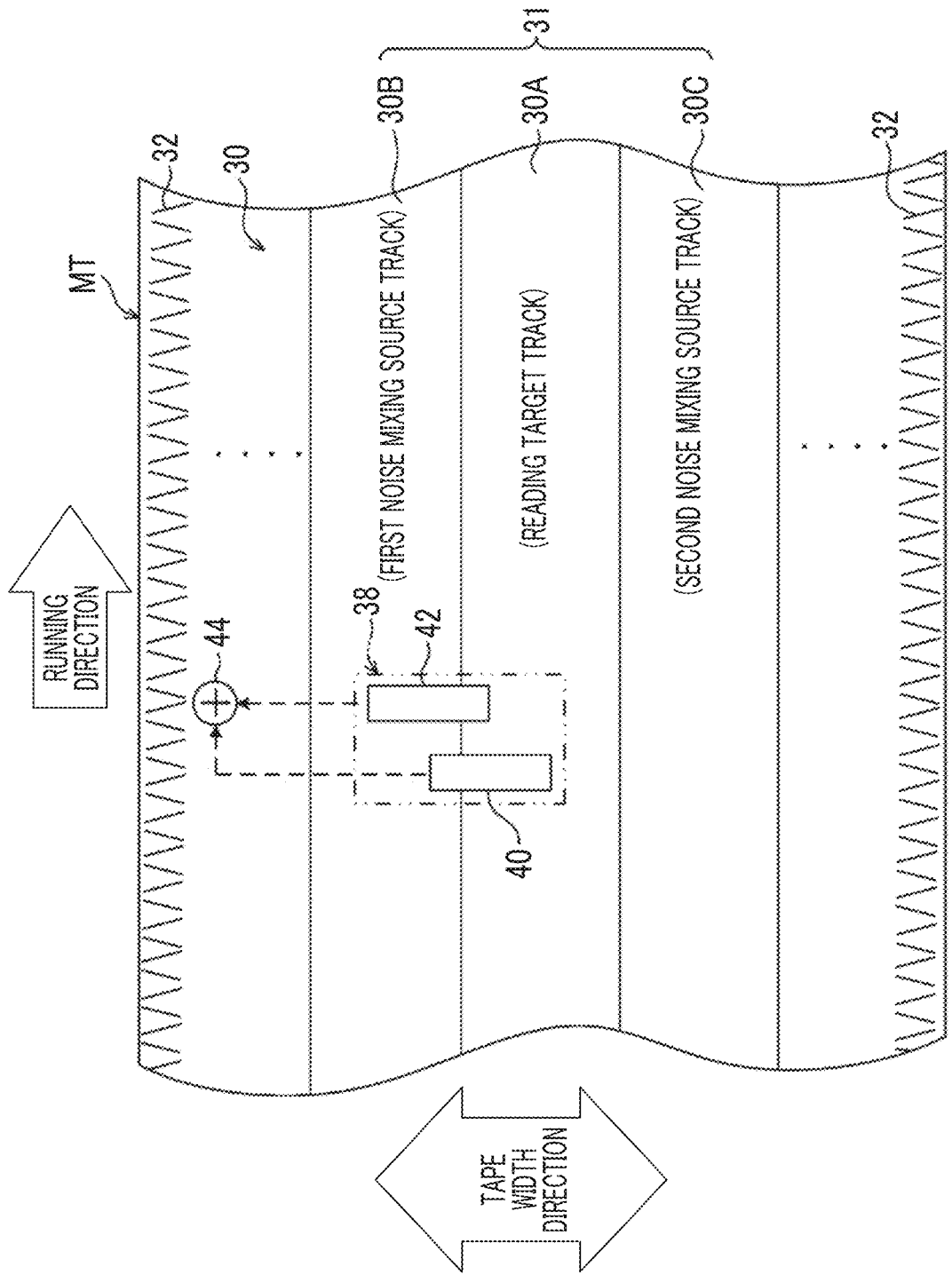
FIG. 3 is a schematic plan view showing an example of a schematic configuration in a plan view of a reading element unit and the magnetic tape.

In an aspect, each of the plurality of reading element unit 38 has the same configuration. Hereinafter, the description will be performed using one of the plurality of reading element unit 38 as an example, for convenience of description. As shown in FIG. 3 as an example, the reading element unit 38 comprises a pair of reading elements. In the example shown in FIG. 3, "a pair of reading elements" indicates a first reading element 40 and a second reading element 42. Each of the first reading element 40 and the second reading element 42 reads data from a specific track region 31 including a reading target track 30A in the track region 30.

In the example shown in FIG. 3, for convenience of description, one specific track region 31 is shown. In practice, in general, in the track region 30, a plurality of the specific track regions 31 are present, and the reading target track 30A is included in each specific track region 31. The reading element unit 38 is allocated to each of the plurality of specific track regions 31 in a one-to-one manner. Specifically, the reading element unit 38 is allocated to the reading target track 30A in each of the plurality of specific track regions 31 in a one-to-one manner.

The specific track region 31 indicates three adjacent tracks. A first track among the three adjacent tracks is the reading target track 30A in the track region 30. A second track among the three adjacent tracks is a first noise mixing source track 30B which is one adjacent track adjacent to the reading target track 30A. A third track among the three adjacent tracks is a second noise mixing source track 30C which is one adjacent track adjacent to the reading target track 30A. The reading target track 30A is a track at a position facing the reading element unit 38 in the track region 30. That is, the reading target track 30A indicates a track having data to be read by the reading element unit 38.

The first noise mixing source track 30B is a track which is adjacent to the reading target track 30A on one side in the tape width direction and is a mixing source of noise mixed to data read from the reading target track 30A. The second noise mixing source track 30C is a track which is adjacent to the reading target track 30A on the other side in the tape width direction and is a mixing source of noise mixed to data read from the reading target track 30A. Hereinafter, for convenience of description, in a case where it is not necessary to describe the first noise mixing source track 30B and the second noise mixing source track 30C separately, these are referred to as the "adjacent track" without reference numerals.

In an aspect, in the track region 30, the plurality of specific track regions 31 are disposed at regular interval in the tape width direction. For example, in the track region 30, 32 specific track regions 31 are disposed at regular interval in the tape width direction, and the reading element unit 38 is allocated to each specific track region 31 in a one-to-one manner.

The first reading element 40 and the second reading element 42 are disposed at positions parts of which are overlapped in the running direction, in a state of being adjacent in the running direction. In a default state of the magnetic tape apparatus 10, the first reading element 40 is disposed at a position straddling over the reading target track 30A and the first noise mixing source track 30B. In a default state of the magnetic tape apparatus 10, the second reading element 42 is disposed at a position straddling over the reading target track 30A and the first noise mixing source track 30B.

In a default state of the magnetic tape apparatus 10, an area of a portion of the first reading element 40 facing the reading target track 30A is greater than an area of a portion of the first reading element 40 facing the first noise mixing source track 30B, in a plan view. Meanwhile, in a default state of the magnetic tape apparatus 10, an area of a portion of the second reading element 42 facing the first noise mixing source track 30B is greater than the area of a portion of the first reading element 40 facing the reading target track 30A, in a plan view.

The data read by the first reading element 40 is subjected to a waveform equalization process by a first equalizer 70 (see FIG. 7) which will be described later. The data read by the second reading element 42 is subjected to a waveform equalization process by a second equalizer 72 (see FIG. 7) which will be described later. Each data obtained by performing the waveform equalization process by each of the first equalizer 70 and the second equalizer 72 is added by an adder 44 and composed.

In FIG. 3, the aspect in which the reading element unit 38 includes the first reading element 40 and the second reading element 42 has been described as an example. Here, for example, even in a case where only one reading element (hereinafter, also referred to as a single reading element) among a pair of reading elements is used, a signal corresponding to a reproducing signal obtained from the reading element unit 38 is obtained.

Figure 8:
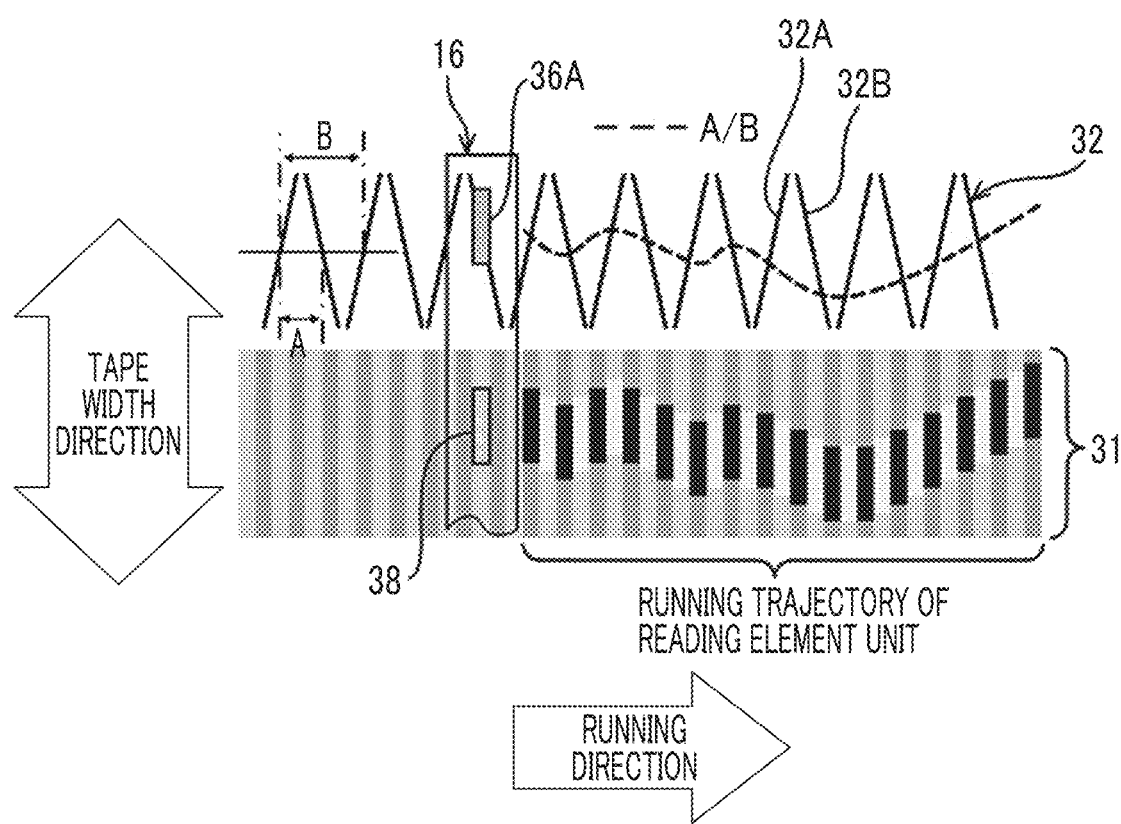
FIG. 8 is a conceptual view provided for description of a method of calculating a deviation amount.

In this case, for example, as shown in FIG. 8 as an example, the reproducing signal obtained from the single reading element is allocated to a plane position on a track calculated from a servo signal obtained by the servo element pair 36 synchronously with the reproducing signal. By repeating this operation while moving the single reading element in the tape width direction, a two-dimensional image of the reproducing signal (hereinafter, simply referred to as a "two-dimensional image") is obtained. Here, a reproducing signal configuring the two-dimensional image or a part of the two-dimensional image (for example, a reproducing signal corresponding to the positions of the plurality of tracks) is a signal corresponding to the reproducing signal obtained from the reading element unit 38.

Figure 24:
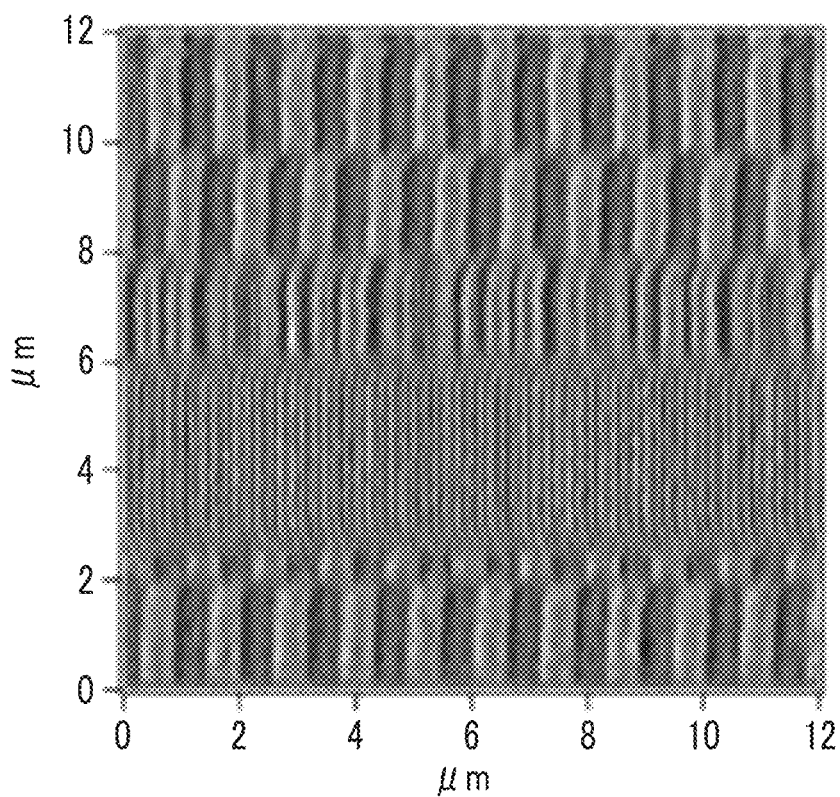
FIG. 24 is a view showing an example of a two-dimensional image of a reproducing signal obtained from a single reading element.

FIG. 24 shows an example of a two-dimensional image of the reproducing signal obtained by using a loop tester, in the magnetic tape MT in a loop shape (hereinafter, also referred to as a "loop tape"). Here, the loop tester indicates a device which transports the loop tape in a state where the loop tape is repeatedly in contact with the single reading element, for example. In order to obtain a two-dimensional image in the same manner as in the case of the loop tester, a reel tester may be used or an actual tape drive may be used. The "reel tester" here indicates a device which transports the magnetic tape MT in a reel state, for example.

As described above, even in a case where a head for a magnetic tape which does not include the reading element unit on which the plurality of reading elements are loaded at adjacent positions is used, the effect according to the technique disclosed in this specification can be quantitatively evaluated. As an example of an index for quantitatively evaluating the effect according to the technique disclosed in this specification, an SNR, an error rate, and the like are used.

Figure 4:
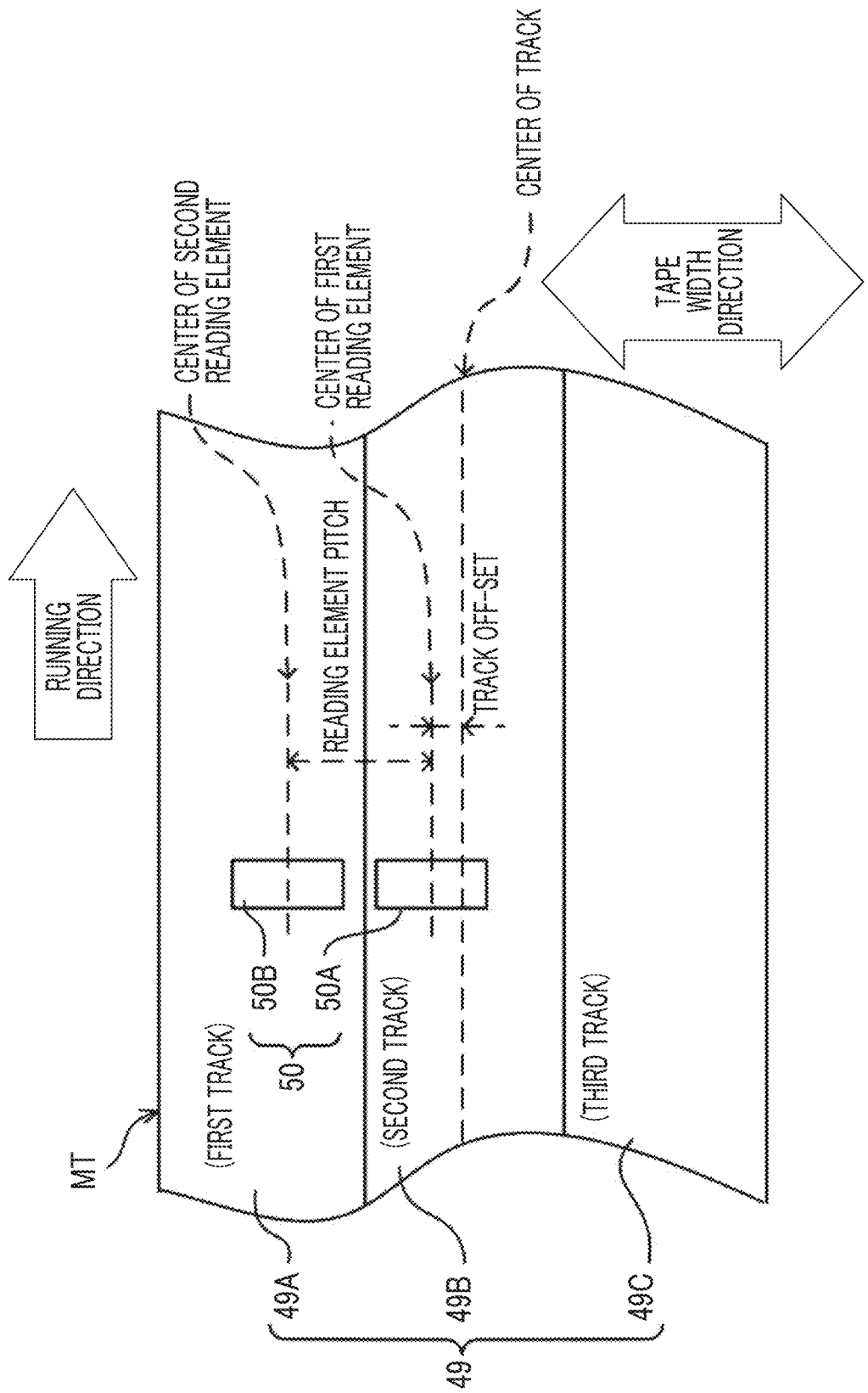
FIG. 4 is a schematic plan view showing an example of a schematic configuration in a plan view of a track region and a reading element pair.
Figure 5:
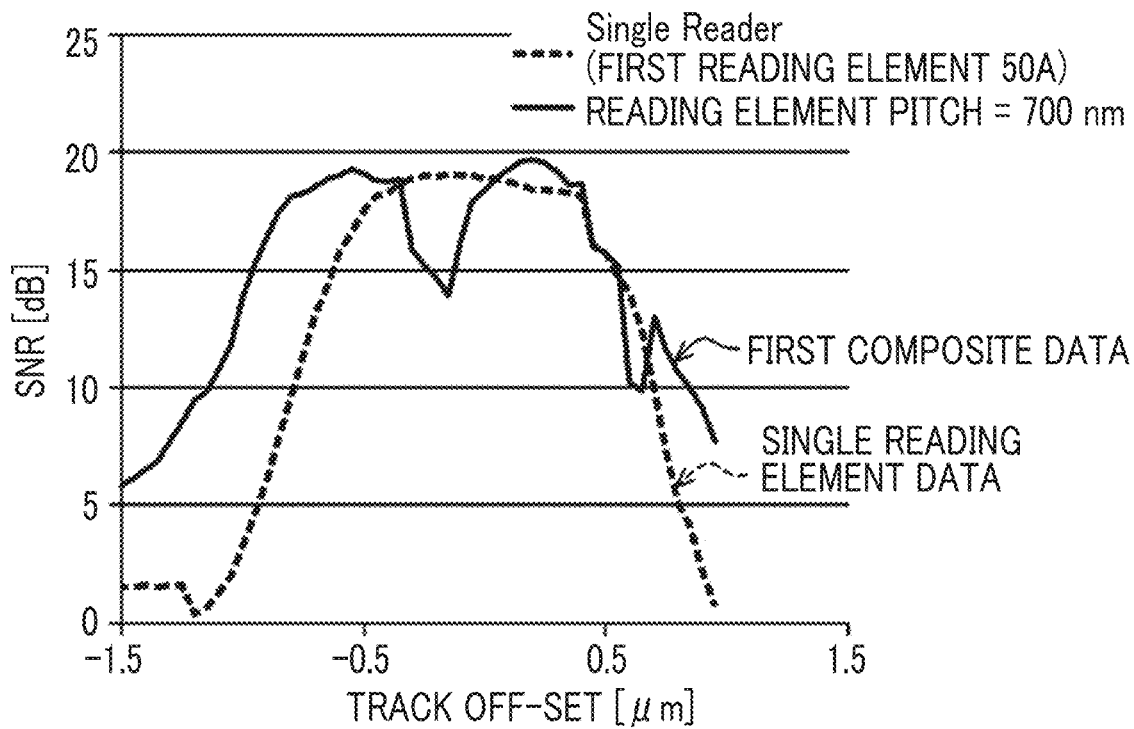
FIG. 5 is a graph showing an example of a correlation between an SNR regarding each of single reading element data and first composite data under a first condition, and track off-set.
Figure 6:
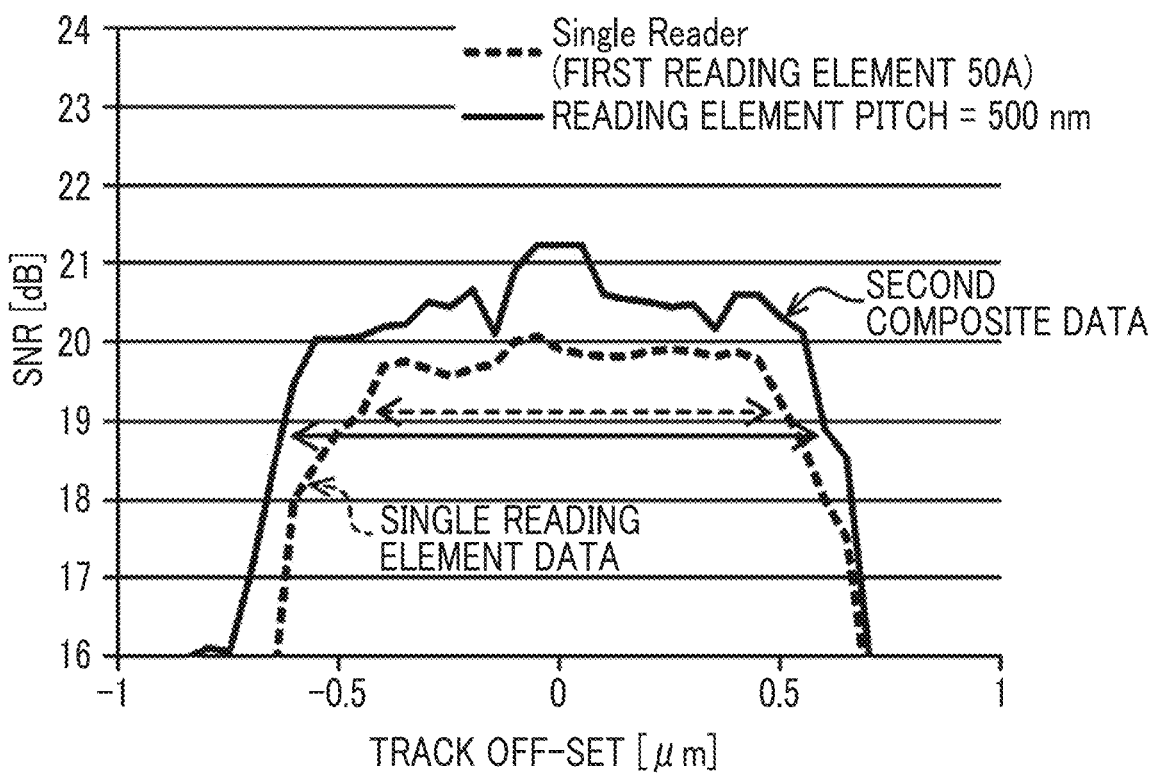
FIG. 6 is a graph showing an example of a correlation between an SNR regarding each of single reading element data and second composite data under a second condition, and track off-set.

FIGS. 4 to 6 show results obtained from experiments performed by the present inventors. As shown in FIG. 4 as an example, a reading element pair 50 are disposed on a track region 49. The track region 49 includes a first track 49A, a second track 49B, and a third track 49C which are adjacent to one another in the tape width direction. The reading element pair 50 includes a first reading element 50A and a second reading element 50B. The first reading element 50A and the second reading element 50B are disposed at positions adjacent to each other in the tape width direction. The first reading element 50A is disposed so as to face the second track 49B which is the reading target track and fall in the second track 49B. In addition, the second reading element 50B is disposed so as to face the first track 49A adjacent to one side of the second track 49B and fall in the first track 49A.

FIG. 5 shows an example of a correlation between an SNR regarding each of single reading element data and first composite data under a first condition, and track off-set. In addition, FIG. 6 shows an example of a correlation between an SNR regarding each of single reading element data and second composite data under a second condition, and track off-set.

Here, the single reading element data indicates data obtained by performing a waveform equalization process with respect to data read by the first reading element 50A, in the same manner as in the case of the first reading element 40 shown in FIG. 3. The first condition indicates a condition in which a reading element pitch is 700 nm (nanometers). The second condition indicates a condition in which a reading element pitch is 500 nm. The reading element pitch indicates a pitch between the first reading element 50A and the second reading element 50B in the tape width direction, as shown in FIG. 4 as an example. The track off-set indicates a deviation amount between the center of the second track 49B in the tape width direction and the center of the first reading element 50A in the track width direction, as shown in FIG. 4 as an example.

The first composite data indicates data composed by adding first waveform equalized data and second waveform equalized data obtained under the first condition. The first waveform equalized data indicates data obtained by performing the waveform equalization process with respect to the data read by the first reading element 50A, in the same manner as in the case of the first reading element 40 shown in FIG. 3. The second waveform equalized data indicates data obtained by performing the waveform equalization process with respect to the data read by the second reading element 50B, in the same manner as in the case of the second reading element 42 shown in FIG. 3. The second composite data indicates data composed by adding first waveform equalized data and second waveform equalized data obtained under the second condition.

In a case of comparing the SNR of the first composite data shown in FIG. 5 to the SNR of the second composite data shown in FIG. 6, the SNR of the first composite data rapidly declines to generate a groove of the graph in a range of the track off-set of −0.4 μm (micrometers) to 0.2 μm, whereas the SNR of the second composite data does not rapidly decline as the graph of the SNR of the first composite data. Each of the SNR of the first composite data and the SNR of the second composite data is higher than the SNR of the single reading element data, and particularly, the SNR of the second composite data is higher than the SNR of the single reading element data over the entire range of the track off-set.

From the experimental results shown in FIGS. 5 and 6, the present inventors have found that it is preferable to perform the reading of data in a state where the first reading element 50A and the second reading element 50B are adjacent to each other in the tape width direction, compared to a case where the reading of data is performed by only the first reading element 50A. The "state adjacent to each other" here means, for example, that the first reading element 50A and the second reading element 50B are not in contact with each other, but are disposed in a line in the tape width direction, so that the SNR of the composite data becomes higher than the SNR of the single reading element data, over the entire range of the track off-set.

In an aspect, as shown in FIG. 3 as an example, in the reading element unit 38, parts of the first reading element 40 and the second reading element 42 are overlapped each other in the running direction, and accordingly, a high density of the tracks included in the magnetic tape MT is realized.

Figure 7:
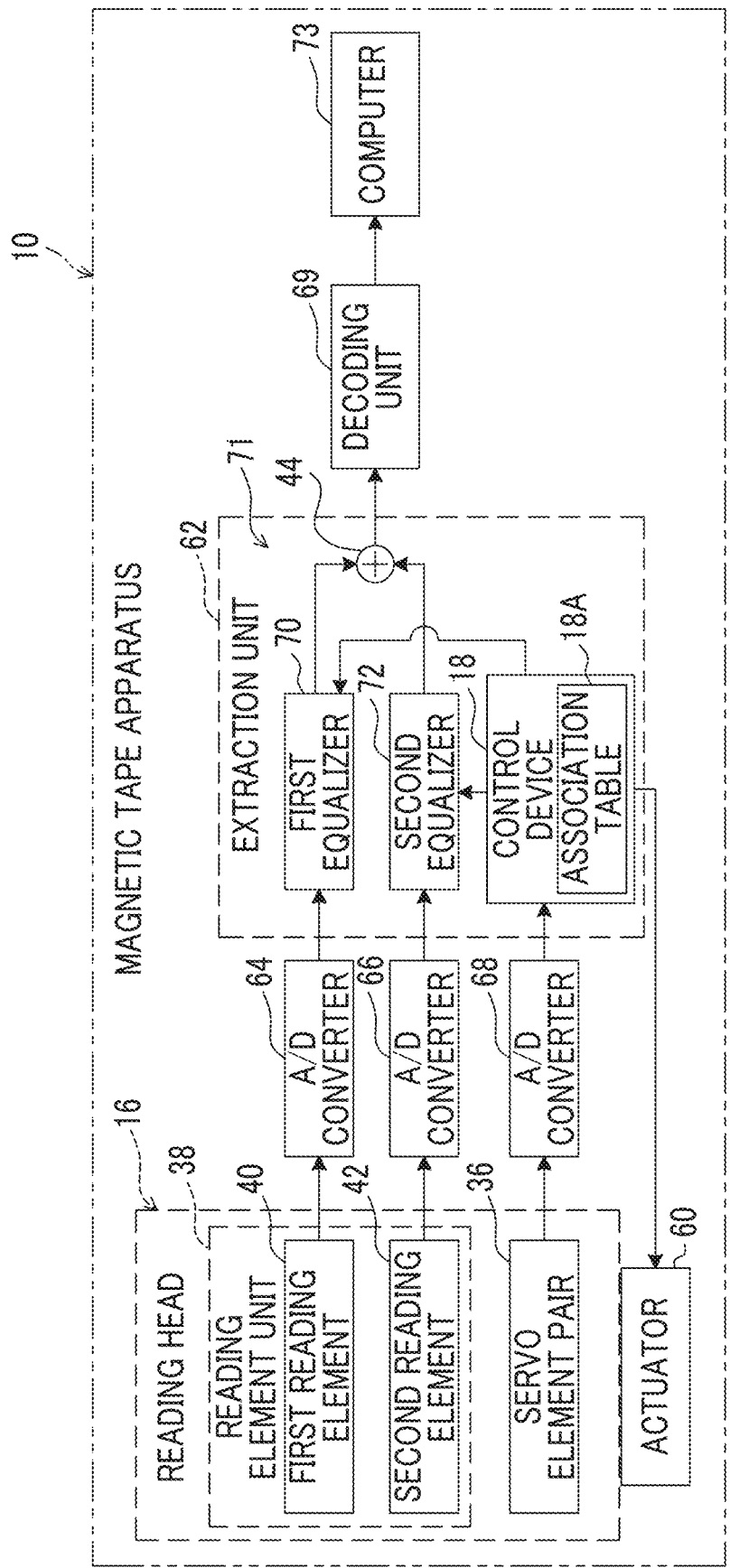
FIG. 7 is a block diagram showing an example of a main configuration of hardware of an electric system of the magnetic tape apparatus.

As shown in FIG. 7 as an example, the magnetic tape apparatus 10 comprises an actuator 60, an extraction unit 62, analog/digital (A/D) converters 64, 66, and 68, a decoding unit 69, and a computer 73.

The control device 18 is connected to the servo element pair 36 through the analog/digital (A/D) converter 68. The A/D converter 68 outputs a servo signal obtained by converting an analog signal obtained by reading the servo pattern 32 by the servo elements 36A and 36B included in the servo element pairs 36 into a digital signal, to the control device 18.

The control device 18 is connected to the actuator 60. The actuator 60 is attached to the reading head 16 and applies power to the reading head 16 under the control of the control device 18, to change the position of the reading head 16 in the tape width direction. The actuator 60 includes, for example, a voice coil motor, and the power applied to the reading head 16 is power obtained by converting an electric energy based on a current flowing through the coil into a kinetic energy, using an energy of a magnet as a medium.

Here, the aspect in which the voice coil motor is loaded on the actuator 60 has been described. Here, the magnetic tape apparatus is not limited to the aspect, and for example, a piezoelectric element can also be used, instead of the voice coil motor. In addition, the voice coil motor and the piezoelectric element can be combined with each other.

In an aspect, the deviation amount of the positions of the magnetic tape MT and the reading element unit 38 is determined in accordance with a servo signal which is a result obtained by reading the servo pattern 32 by the servo element pair 36. The control device 18 controls the actuator 60 to apply power according to the deviation amount of the positions of the magnetic tape MT and the reading element unit 38 to the reading head 16. Accordingly, the position of the reading head 16 is changed in the tape width direction and the position of the reading head 16 is adjusted to a normal position. Here, as shown in FIG. 3, the normal position indicates, for example, a position of the reading head 16 in a default state of the magnetic tape apparatus 10.

Here, the aspect in which the deviation amount of the positions of the magnetic tape MT and the reading element unit 38 is determined in accordance with the servo signal which is the result obtained by reading the servo pattern 32 by the servo element pair 36 is used as an example. However, the magnetic tape apparatus according to an aspect of the present invention is not limited to such an example. For example, as the deviation amount of the positions of the magnetic tape MT and the reading element unit 38, the deviation amount from predetermined reference positions of the servo element 36A and the magnetic tape MT may be used, or the deviation amount of an end surface of the reading head 16 and a center position of a specific track included in the magnetic tape MT may be used. As described above, the deviation amount of the positions of the magnetic tape MT and the reading element unit 38 may be the deviation amount corresponding to the deviation amount between the center of the reading target track 30A in the tape width direction and the center of the reading head 16 in the tape width direction. Hereinafter, for convenience of description, the deviation amount of the positions of the magnetic tape MT and the reading element unit 38 is simply referred to as a "deviation amount".

For example, as shown in FIG. 8, the deviation amount is calculated based on a ratio of a distance A to a distance B. The distance A indicates a distance calculated from a result obtained by reading the first diagonal line 32A and the second diagonal line 32B adjacent to each other by the servo element 36A. The distance B indicates a distance calculated from a result obtained by reading the two first diagonal lines 32A adjacent to each other by the servo element 36A.

The extraction unit 62 comprises the control device 18 and a two-dimensional FIR filter 71. The two-dimensional FIR filter 71 comprises the adder 44, the first equalizer 70, and the second equalizer 72.

The first equalizer 70 is connected to the first reading element 40 through the A/D converter 64. In addition, the first equalizer 70 is connected to each of the control device 18 and the adder 44. The data read by the first reading element 40 from the specific track region 31 is an analog signal, and the A/D converter 64 outputs a first reading signal obtained by converting the data read by the first reading element 40 from the specific track region 31 into a digital signal, to the first equalizer 70.

The second equalizer 72 is connected to the second reading element 42 through the A/D converter 66. In addition, the second equalizer 72 is connected to each of the control device 18 and the adder 44. The data read by the second reading element 42 from the specific track region 31 is an analog signal, and the A/D converter 66 outputs a second reading signal obtained by converting the data read by the second reading element 42 from the specific track region 31 into a digital signal, to the second equalizer 72. Each of the first reading signal and the second reading signal is an example of a "reading result for each reading element".

The first equalizer 70 performs a waveform equalization process with respect to the input first reading signal. For example, the first equalizer 70 performs a convolution arithmetic operation of a tap coefficient with respect to the input first reading signal, and outputs the first arithmetic operation processed signal which is a signal after the arithmetic operation.

The second equalizer 72 performs a waveform equalization process with respect to the input second reading signal. For example, the second equalizer 72 performs a convolution arithmetic operation of a tap coefficient with respect to the input second reading signal, and outputs the second arithmetic operation processed signal which is a signal after the arithmetic operation.

Each of the first equalizer 70 and the second equalizer 72 outputs the first arithmetic operation processed signal and the second arithmetic operation processed signal to the adder 44. The adder 44 adds and composes the first arithmetic operation processed signal input from the first equalizer 70 and the second arithmetic operation processed signal input from the second equalizer 72, and outputs the composite data obtained by the composite to the decoding unit 69.

Each of the first equalizer 70 and the second equalizer 72 is a one-dimensional FIR filter.

In an aspect, the FIR filter is a series of actual values including positive and negative values, the number of lines of the series is referred to as a tap number, and the numerical value is referred to as a tap coefficient. In addition, in an aspect, the waveform equalization indicates a process of the convolution arithmetic operation (multiplication and accumulation) of the series of actual values, that is, the tap coefficient, with respect to the reading signal. The "reading signal" here indicates a collective term of the first reading signal and the second reading signal. In an aspect, the equalizer indicates a circuit which carries out a process of performing the convolution arithmetic operation of the tap coefficient with respect to the reading signal or the other input signal and outputting the signal after the arithmetic operation. In addition, in an aspect, the adder indicates a circuit which simply adds two series. Weighting of the two series is reflected on the numerical values, that is, the tap coefficient of the FIR filter used in the first equalizer 70 and the second equalizer 72.

The control device 18 performs the waveform equalization process according to the deviation amount with respect to each of the first equalizer 70 and the second equalizer 72 by setting the tap coefficient according to the deviation amount with respect to the FIR filter of each of the first equalizer 70 and the second equalizer 72.

The control device 18 comprises an association table 18A. The association table 18A associates the tap coefficient with the deviation amount regarding each of the first equalizer 70 and the second equalizer 72. A combination of the tap coefficient and the deviation amount is, for example, a combination obtained in advance as a combination of the tap coefficient and the deviation amount, with which the best composite data is obtained by the adder 44, based on the result obtained by performing at least one of the test performed with a real machine or a simulation. The "best composite data" here indicates data corresponding to the reading target track data.

Here, the "reading target track data" indicates "data derived from the reading target track 30A". The "data derived from the reading target track 30A" indicates data corresponding to data written on the reading target track 30A. As an example of data corresponding to the data written on the reading target track 30A, data which is read from the reading target track 30A and to which a noise component from the adjacent tracks is not mixed is used.

As described above, the association table 18A is used as an example. In another aspect, an arithmetic expression may be used instead of the association table 18A. The "arithmetic expression" here indicates an arithmetic expression in which an independent variable is set as the deviation amount and a dependent variable is set as the tap coefficient, for example.

As described above, the aspect in which the tap coefficient is derived from the association table 18A, in which combinations of the tap coefficients and the deviation amounts are regulated, has been described. In another aspect, for example, the tap coefficient may be derived from the association table in which the combinations of tap coefficients and ratios are regulated, or the arithmetic expression. The "ratio" here indicates a ratio between an overlapping region with the reading target track 30A and an overlapping region with the adjacent track, regarding each of the first reading element 40 and the second reading element 42. The ratio is calculated and specified from the deviation amount by the control device 18 and the tap coefficient is determined in accordance with the specified ratio. Alternatively, in an aspect, it is possible to determine a series of a series of a plurality of the tap coefficients so as to minimize an error from a reference waveform (target) which is an equalization target using a plurality of the reading results obtained by reading data by each of the plurality of reading elements in a calibration region in advance, for example.

The decoding unit 69 decodes the composite data input from the adder 44 and outputs a decoded signal obtained by the decoding to the computer 73. The computer 73 performs various processes with respect to the decoded signal input from the decoding unit 69.

Next, a magnetic tape reading process carried out by the extraction unit 62 will be described with reference to FIG. 9. Hereinafter, for convenience of description, the embodiment is described based on assumption that the servo signal is input to the control device 18, in a case where a period of sampling comes. Here, the sampling is not limited to the sampling of the servo signal and also means the sampling of the reading signal. That is, in an aspect, the track region 30 is formed in parallel with the servo pattern 32 along the running direction, and accordingly, the reading operation by the reading element unit 38 is performed synchronously with the reading operation by the servo element pair 36.

Figure 9:
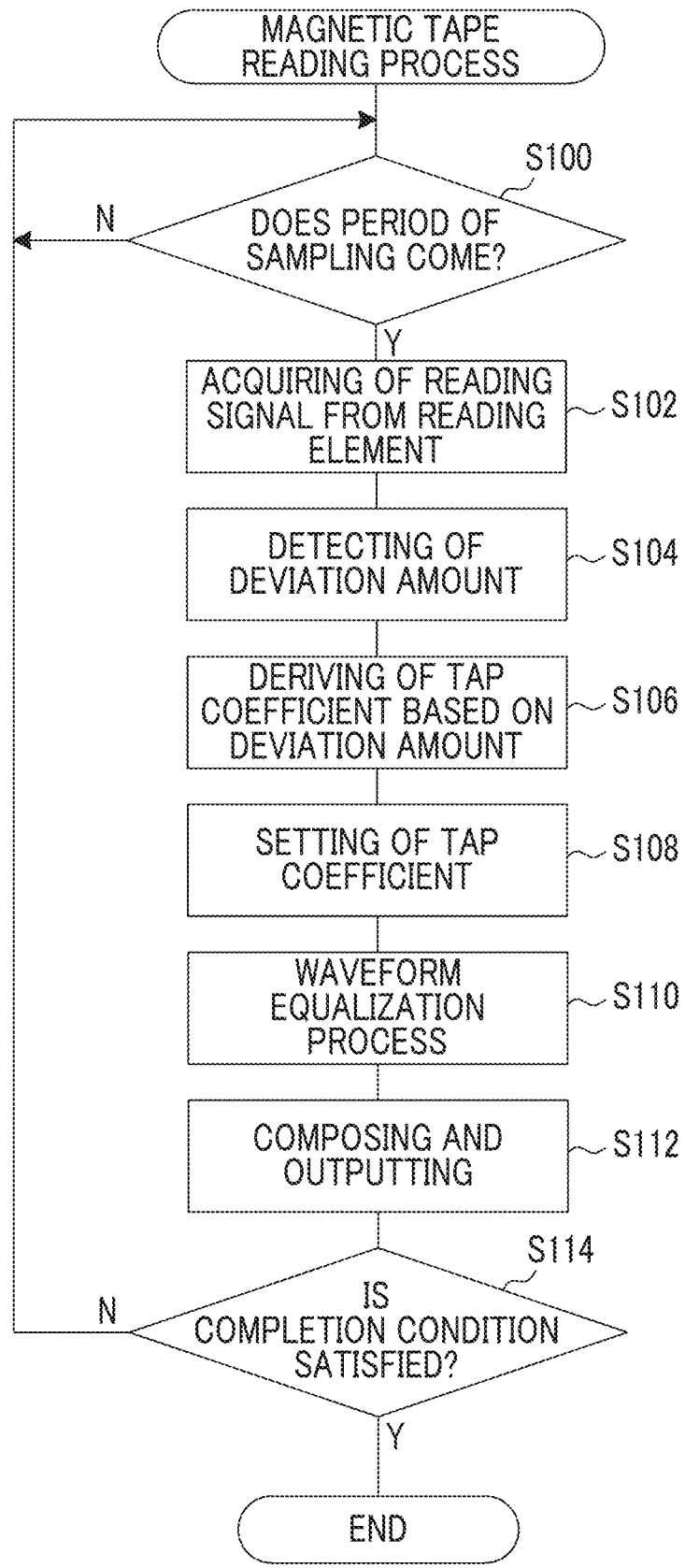
FIG. 9 is a flowchart showing an example of a flow of a magnetic tape reading process.

In the process shown in FIG. 9, first, in a step S100, the control device 18 determines whether or not the period of the sampling comes. In the step S100, in a case where the period of the sampling comes, the determination is affirmative and the magnetic tape reading process moves to a step S102. In the step S100, in a case where the period of the sampling does not come, the determination is denied, and the determination of the step S100 is performed again.

In a step S102, the first equalizer 70 acquires a first reading signal, the second equalizer 72 acquires a second reading signal, and then, the magnetic tape reading process moves to a step S104.

In the step S104, the control device 18 acquires a servo signal and calculates a deviation amount from the acquired servo signal, and then the magnetic tape reading process moves to a step S106.

In the step S106, the control device 18 derives a tap coefficient corresponding to the deviation amount calculated in the process of the step S104 from the association table 18A, regarding first to third taps of each of the first equalizer 70 and the second equalizer 72. That is, by performing the process of the step S106, an optimal combination is determined as a combination of a one-dimensional FIR filter which is an example of the first equalizer 70 and a one-dimensional filter which is an example of the second equalizer 72. The "optimal combination" here indicates, for example, a combination in which the composite data output by performing a process of a step S112 which will be described later is set as data corresponding to the reading target track data.

In the next step S108, the control device 18 sets the tap coefficient derived in the process of the step S106 with respect to each of the first equalizer 70 and the second equalizer 72, and then the magnetic tape reading process moves to a step S110.

In the step S110, the first equalizer 70 performs the waveform equalization process with respect to the first reading signal acquired in the process of the step S102, and accordingly, the first arithmetic operation processed signal is generated. The first equalizer 70 outputs the generated first arithmetic operation processed signal to the adder 44. The second equalizer 72 performs the waveform equalization process with respect to the second reading signal acquired in the process of the step S102, and accordingly, the second arithmetic operation processed signal is generated. The second equalizer 72 outputs the generated second arithmetic operation processed signal to the adder 44.

Figure 10:
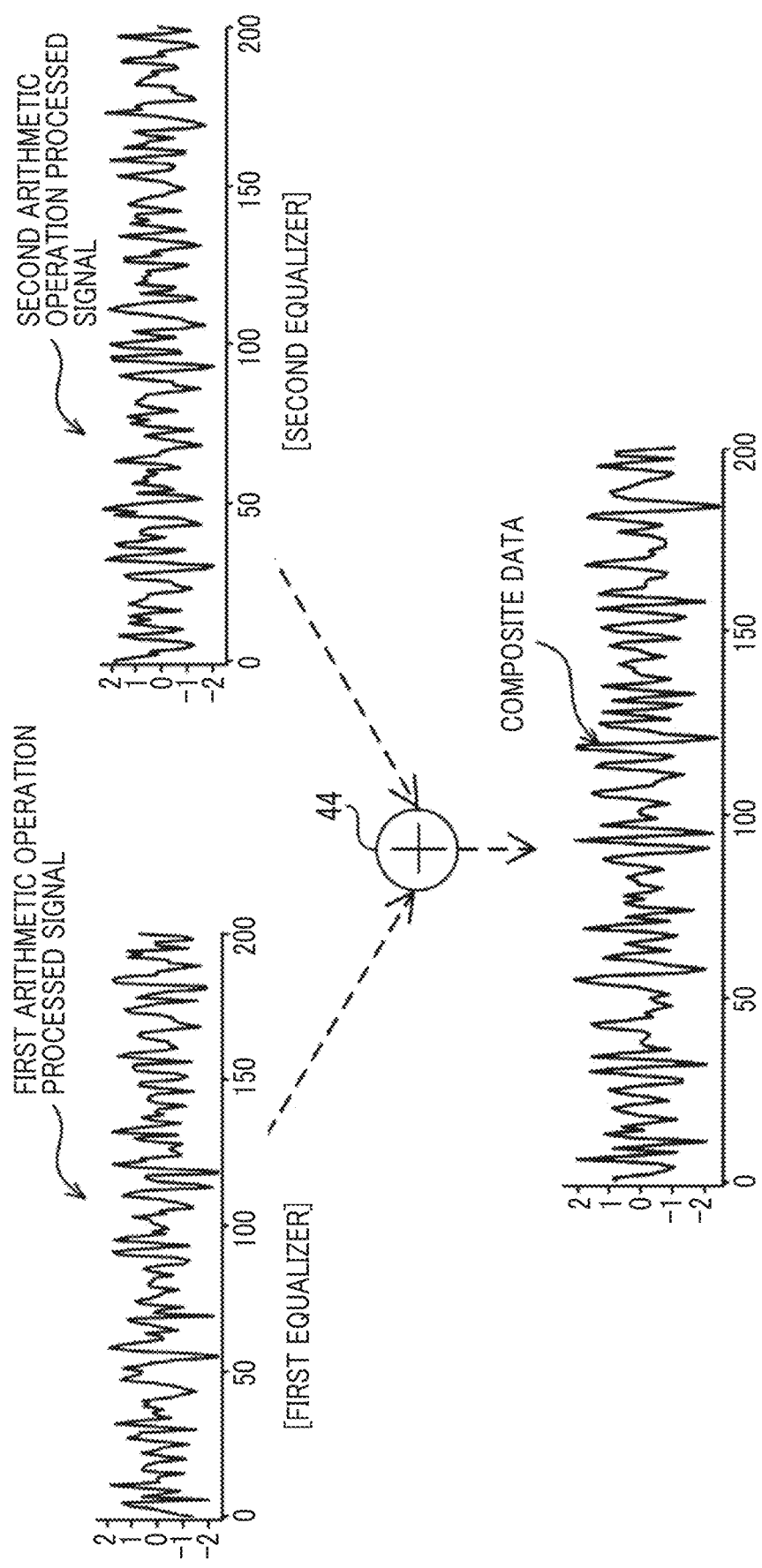
FIG. 10 is a conceptual view provided for description of a process performed by a two-dimensional FIR filter of an extraction unit.

In the next step S112, the adder 44 adds and composes the first arithmetic operation processed signal input from the first equalizer 70 and the second arithmetic operation processed signal input from the second equalizer 72, as shown in FIG. 10 as an example. The adder 44 outputs the composite data obtained by the composite to the decoding unit 69.

In a case where the reading element unit 38 is disposed in the specific track region 31, as the example shown in FIG. 3, the data corresponding to the reading target track data, from which the noise component from the first noise mixing source track 30B is removed, is output as the composite data, by performing the process of the step S112. That is, by performing the processes of the step S102 to the step S112, the extraction unit 62 extracts only the data derived from the reading target track 30A.

Figure 11:
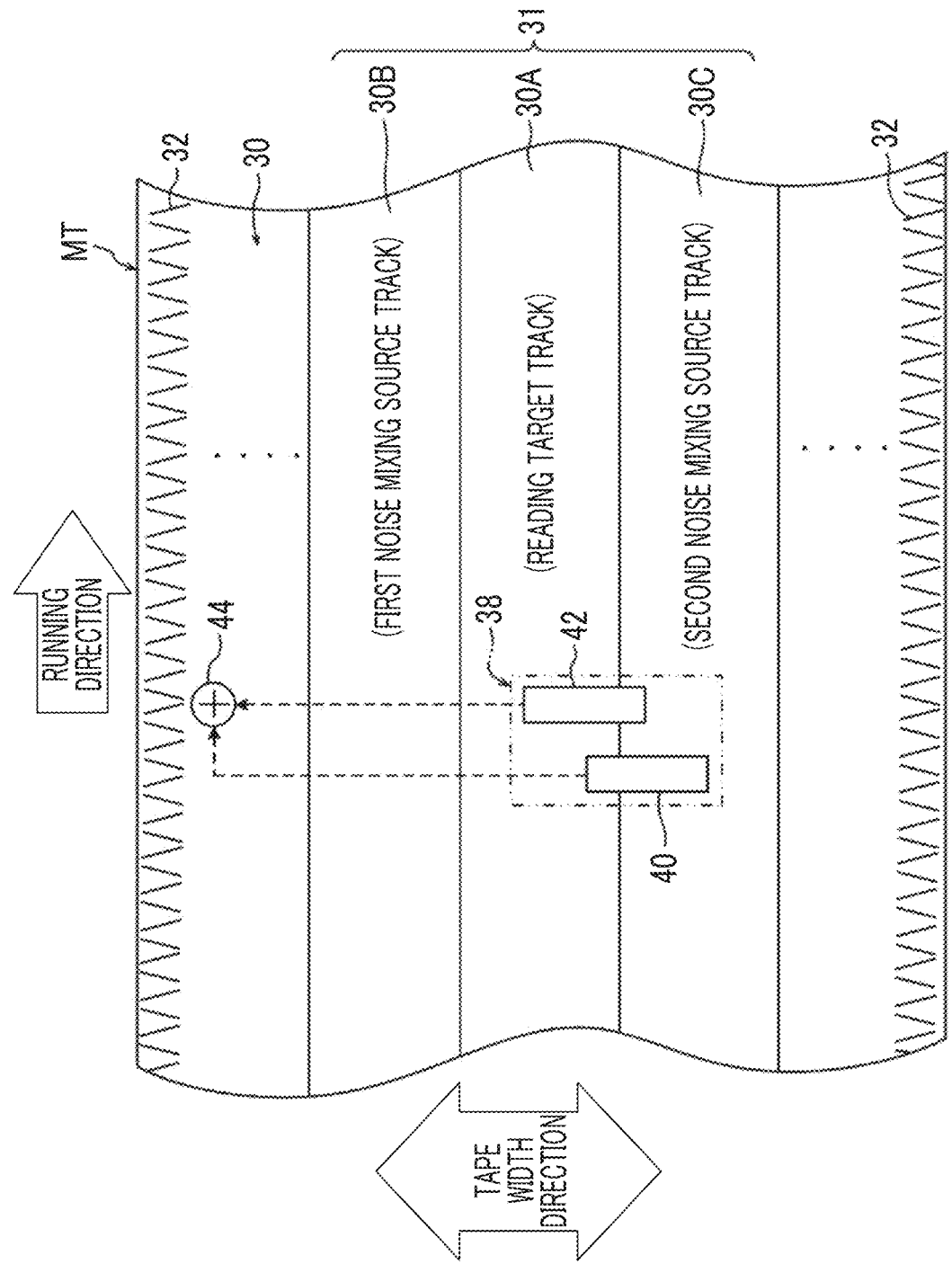
FIG. 11 is a schematic plan view showing an example of a state where the reading element unit straddles over a reading target track and a second noise mixing source track.

In a case where the magnetic tape MT expands and contracts in the tape width direction or vibration is applied to at least one of the magnetic tape MT or the reading head 16, the reading element unit 38 is displaced to a position shown in FIG. 11 from the position shown in FIG. 3 as an example. In the example shown in FIG. 11, the first reading element 40 and the second reading element 42 are disposed at positions straddling over both of the reading target track 30A and the second noise mixing source track 30C. In this case, by performing the processes of the step S102 to the step S112, the data corresponding to the reading target track data, from which the noise component from the second noise mixing source track 30C is removed, is output to the decoding unit 69 as the composite data.

In the next step S114, the control device 18 determines whether or not a condition for completing the magnetic tape reading process (hereinafter, referred to as a "completion condition") is satisfied. The completion condition indicates, for example, a condition in which the entire magnetic tape MT is wound around the winding reel 22, a condition in which an instruction for forced completion of the magnetic tape reading process is applied from the outside, and the like.

In the step S114, in a case where the completion condition is not satisfied, the determination is denied, and the magnetic tape reading process is moved to the step S100. In the step S114, in a case where the completion condition is satisfied, the determination is affirmative, and the magnetic tape reading process ends.

As described above, in an aspect of the magnetic tape apparatus 10, the data is read from the specific track region 31 by each of the first reading element 40 and the second reading element 42 disposed in a state of being adjacent to each other. In addition, the extraction unit 62 performs the waveform equalization process according to the deviation amount with respect to each of the first reading element 40 and the second reading element 42, to extract the data derived from the reading target track 30A from the first reading signal and the second reading signal. Therefore, in the magnetic tape apparatus 10, it is possible to prevent a deterioration in reproducing quality of data read from the reading target track 30A by the linear scanning method, compared to a case where the data is read from the reading target track 30A by only a single reading element by the linear scanning method.

In an aspect of the magnetic tape apparatus 10, parts of the first reading element 40 and the second reading element 42 are overlapped each other in the running direction. Therefore, in the magnetic tape apparatus 10, it is possible to increase reproducing quality of data read from the reading target track 30A by the linear scanning method, compared to a case where the entire portions of the plurality of reading elements are overlapped in the running direction.

In an aspect of the magnetic tape apparatus 10, the specific track region 31 includes the reading target track 30A, the first noise mixing source track 30B, and the second noise mixing source track 30C, and each of the first reading element 40 and the second reading element 42 straddles over both of the reading target track 30A and the adjacent track, in a case where a positional relationship with the magnetic tape MT is changed. Therefore, in the magnetic tape apparatus 10, it is possible to reduce the noise component generated in one of the reading element of the first reading element 40 and the second reading element 42 due to entering the adjacent track from the reading target track 30A in the tape width direction, by using the reading result obtained by the other reading element entering the adjacent track from the reading target track 30A in the tape width direction, compared to a case where the data is read by only the single reading element from the reading target track 30A.

In an aspect of the magnetic tape apparatus 10, the tap coefficient used in the waveform equalization process is determined in accordance with the deviation amount. Therefore, by determining the tap coefficient in accordance with the deviation amount, it is possible to instantaneously reduce the noise component generated due to entering the reading target track 30A from the adjacent track in the tape width direction, in accordance with a change of the positional relationship between the magnetic tape MT and the reading element unit 38, compared to a case where the tap coefficient is determined in accordance with a parameter with no relation with the deviation amount.

In an aspect of the magnetic tape apparatus 10, regarding each of the first reading element 40 and the second reading element 42, the ratio between the overlapping region with the reading target track 30A and the overlapping region with the adjacent track is specified from the deviation amount, and the tap coefficient is determined according to the specified ratio. Therefore, in the magnetic tape apparatus 10, it is possible to exactly reduce the noise component, even in a case where the positional relationship between the magnetic tape MT and the reading element unit 38 is changed, compared to a case where the tap coefficient is determined in accordance with a parameter with no relation with a ratio between the overlapping region with the reading target track 30A and the overlapping region with the adjacent track regarding each of the plurality of reading elements.

In an aspect of the magnetic tape apparatus 10, the deviation amount is determined in accordance with the result obtained by reading the servo patterns 32 by the servo element pair 36. Therefore, in the magnetic tape apparatus 10, it is possible to easily determine the deviation amount, compared to a case where the servo patterns 32 are not applied to the magnetic tape MT.

In an aspect of the magnetic tape apparatus 10, the reading operation by the reading element unit 38 is performed synchronously with the reading operation by the servo element pair 36. Therefore, in the magnetic tape apparatus 10, it is possible to instantaneously reduce the noise component generated due to entering the reading target track from the adjacent track in the width direction of the magnetic tape, compared to a case of a magnetic disk and a magnetic tape in a helical scanning method, in which a servo pattern and data cannot be synchronously read.

In an aspect of the magnetic tape apparatus 10, the extraction unit 62 includes the two-dimensional FIR filter 71. Each result obtained by performing the waveform equalization process with respect to each of the first reading signal and the second reading signal is composed by the two-dimensional FIR filter 71, and accordingly, the data derived from the reading target track 30A is extracted from the first reading signal and the second reading signal. Therefore, in the magnetic tape apparatus 10, it is possible to rapidly extract the data derived from the reading target track 30A from the first reading signal and the second reading signal, compared to a case of using only a one-dimensional FIR filter. In addition, in the magnetic tape apparatus 10, it is possible to realize an operation due to a smaller operation amount, compared to a case of performing a matrix operation.

In an aspect of the magnetic tape apparatus 10, the first reading element 40 and the second reading element 42 are used as a pair of reading elements. Therefore, in the magnetic tape apparatus 10, it is possible to contribute to miniaturization of the reading element unit 38, compared to a case of using three or more reading elements. By miniaturizing the reading element unit 38, the reading unit 26 and the reading head 16 can also be miniaturized. In addition, in the magnetic tape apparatus 10, it is also possible to prevent occurrence of a situation in which the reading element units 38 adjacent to each other are in contact with each other.

In an aspect of the magnetic tape apparatus 10, each of the plurality of reading element units 38 reads data from the corresponding reading target track 30A included in each of the plurality of specific track regions 31 by the linear scanning method. Therefore, in the magnetic tape apparatus 10, it is possible to rapidly complete the reading of data from the plurality of reading target tracks 30A, compared to a case where the data is read by only the single reading element unit 38 from each of the plurality of reading target tracks 30A.

In the aspect, in a default state of the magnetic tape apparatus 10, each of the first reading element 40 and the second reading element 42 is provided to straddle over both of the reading target track 30A and the first noise mixing source track 30B, here, the magnetic tape apparatus is not limited to the aspect. In an example shown in FIG. 12, a reading element unit 138 is used instead of the reading element unit 38 described above. The reading element unit 138 comprises a first reading element 140 and a second reading element 142. In a default state of the magnetic tape apparatus 10, the center of the first reading element 140 in the tape width direction coincides with a center CL of the reading target track 30A in the tape width direction. In a default state of the magnetic tape apparatus 10, the first reading element 140 and the second reading element 142 fall in the reading target track 30A, without being protruded to the first noise mixing source track 30B and the second noise mixing source track 30C. In addition, in a default state of the magnetic tape apparatus 10, parts of the first reading element 140 and the second reading element 142 are provided to be overlapped each other in the running direction, in the same manner as the case of the first reading element 40 and the second reading element 42 described in the embodiment.

Figure 12:
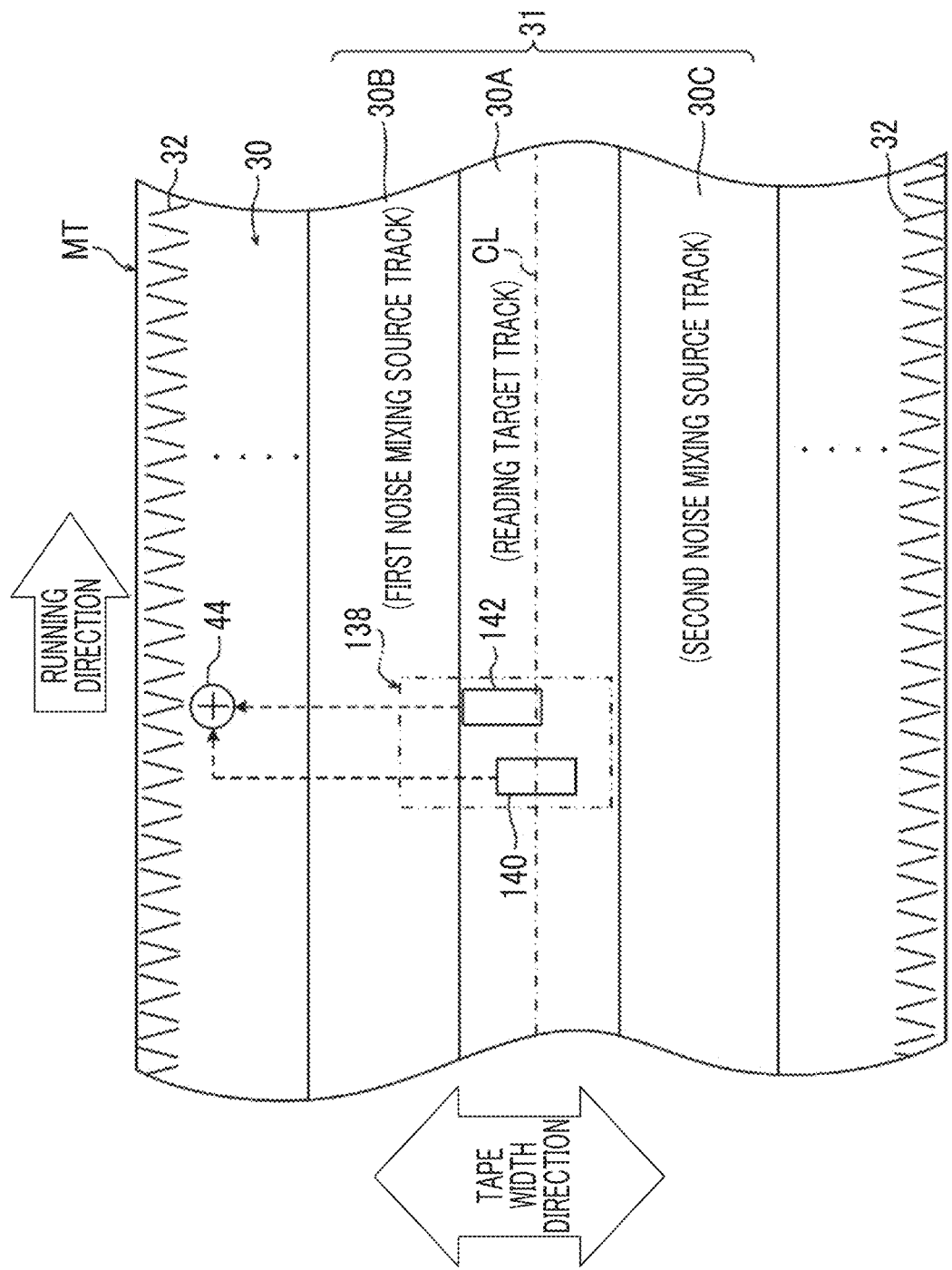
FIG. 12 is a schematic plan view showing a first modification example of the reading element unit.

As shown in FIG. 12 as an example, even in a state where the first reading element 140 and the second reading element 142 face the reading target track 30A, without being protruded from the reading target track 30A, a positional relationship between the reading element unit 138 and the magnetic tape MT may be changed. That is, the reading element unit 138 may straddle over the reading target track 30A and the first noise mixing source track 30B, or the reading element unit 138 may straddle over the reading target track 30A and the second noise mixing source track 30C. Even in these cases, by performing the processes in the step S102 to the step S112 described above, it is possible to obtain the data corresponding to the reading target track data, from which the noise component from the first noise mixing source track 30B or the second noise mixing source track 30C is removed.

In addition, the first reading element 140 and the second reading element 142 are disposed at position where parts thereof are overlapped each other in the running direction, and accordingly, the second reading element 142 can read the data from a portion of the reading target track 30A where the reading cannot be performed by the first reading element 140. As a result, it is possible to increase reliability of the reading target track data, compared to a case where the first reading element 140 singly reads the data from the reading target track 30A.

As shown in FIG. 11 as an example, in a default state of the magnetic tape apparatus 10, each of the first reading element 40 and the second reading element 42 may be disposed at a position straddling over both of the reading target track 30A and the second noise mixing source track 30C.

As described above, the reading element unit 38 including the first reading element 40 and the second reading element 42 has been described. However, the magnetic tape apparatus is not limited to the aspect. In an example shown in FIG. 13, a reading element unit 238 may be used instead of the reading element unit 38. The reading element unit 238 is different from the reading element unit 38, in a point that a third reading element 244 is included. In a default state of the magnetic tape apparatus 10, the third reading element 244 is disposed at a position where a part thereof is overlapped with a part of the first reading element 40 in the running direction. In addition, in a default state of the magnetic tape apparatus 10, the third reading element 244 is disposed at a position to straddle over the reading target track 30A and the second noise mixing source track 30C.

In this case, a third equalizer (not shown) is also allocated to the third reading element 244, in the same manner as a case where the first equalizer 70 is allocated to the first reading element 40 and the second equalizer 72 is allocated to the second reading element 42. The third equalizer also has the same function as that of each of the first equalizer and the second equalizer described above, and performs a waveform equalization process with respect to a third reading signal obtained by reading performed by the third reading element 244. The third equalizer performs, for example, a convolution arithmetic operation of a tap coefficient with respect to the third reading signal and outputs the third arithmetic operation processed signal which is a signal after the arithmetic operation. The adder 44 adds and composes a first arithmetic operation processed signal corresponding to the first reading signal, a second arithmetic operation processed signal corresponding to the second reading signal, the third arithmetic operation processed signal corresponding to the third reading signal, and outputs the composite data obtained by the composite to the decoding unit 69.

Figure 13:
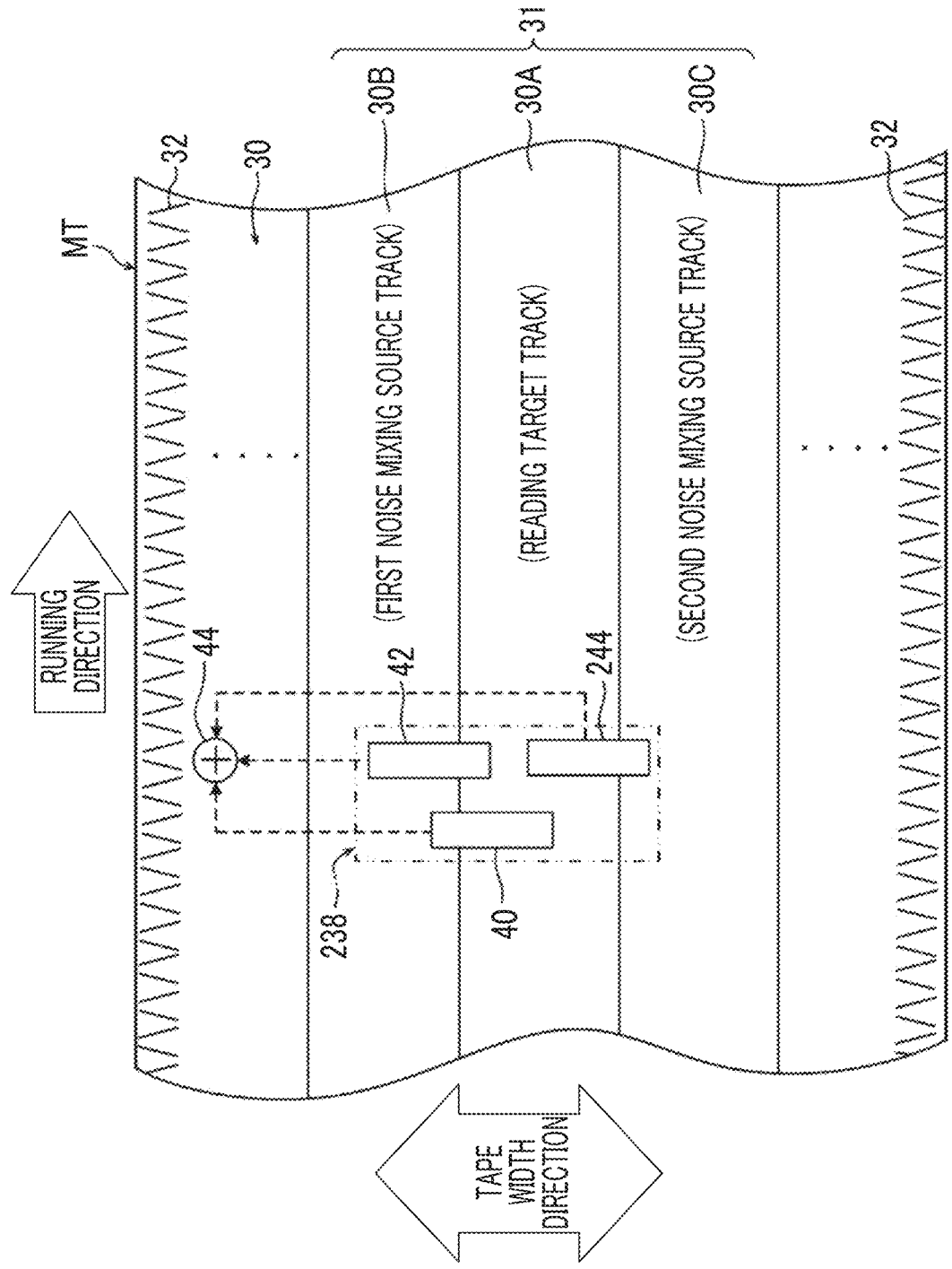
FIG. 13 is a schematic plan view showing a second modification example of the reading element unit.

In the example shown in FIG. 13, in a default state of the magnetic tape apparatus 10, the third reading element 244 is disposed at the position straddling over the reading target track 30A and the second noise mixing source track 30C, but the technique of the present disclosure is not limited thereto. In a default state of the magnetic tape apparatus 10, the third reading element 244 may be disposed at the position facing the reading target track 30A, without being protruded from the reading target track 30A.

As described above, the reading element unit 38 has been described. However, the magnetic tape apparatus is not limited to the aspect. For example, the reading element pair 50 shown in FIG. 4 may be used instead of the reading element unit 38. In this case, the first reading element 50A and the second reading element 50B are set to be disposed at positions adjacent to each other in the tape width direction. In addition, the first reading element 50A and the second reading element 50B are set to be disposed in a line in the tape width direction so that the SNR of the composite data is higher than the SNR of the single reading element data over the entire range of the track off-set, as shown in FIG. 6 as an example, without being in contact with each other.

In the example shown in FIG. 4, for example, the first reading element 50A falls in the second track 49B in a plan view, and the second reading element 50B falls in the first track 49A in a plan view.

As described above, the servo element pair 36 has been described. However, the magnetic tape apparatus is not limited to the aspect. For example, one of the servo elements 36A and 36B may be used instead of the servo element pair 36.

As described above, the aspect in which the plurality of specific track regions 31 are arranged in the track region 30 at regular interval in the tape width direction has been described. However, the magnetic tape apparatus is not limited to the aspect. For example, in two specific track regions 31 adjacent to each other in the plurality of specific track regions 31, one specific track region 31 and the other specific track region 31 may be arranged in the tape width direction so as to be overlapped by the area of one track in the tape width direction. In this case, one adjacent track included in one specific track region 31 (for example, the first noise mixing source track 30B) becomes the reading target track 30A in the other specific track region 31. In addition, the reading target track 30A included in one specific track region 31 becomes the adjacent track region (for example, the second noise mixing source track 30C) in the other specific track region 31.

The configuration of the magnetic tape apparatus and the magnetic tape reading process described above are merely an example. Accordingly, unnecessary steps can be removed, new steps can be added, and the process procedure can be changed, within a range not departing from the gist.

The magnetic tape apparatus can perform the reading (reproducing) of data recorded on the magnetic tape, and can also have a configuration for recording data on the magnetic tape.

Magnetic Tape Next, the details of a magnetic tape according to an aspect of the present invention will be described.

The magnetic tape according to the aspect of the present invention includes a non-magnetic support; and a magnetic layer including ferromagnetic powder and a binding agent. The magnetic layer has a timing-based servo pattern, an edge shape of the timing-based servo pattern, specified by magnetic force microscopy is a shape in which a difference ($L_{99.9}-L_{0.1}$) between a value $L_{99.9}$ of a cumulative distribution function of 99.9% and a value $L_{0.1}$ of a cumulative distribution function of 0.1% in a position deviation width from an ideal shape of the magnetic tape in a longitudinal direction is 180 nm or less, and the isoelectric point of a surface zeta potential of the magnetic layer is 5.5 or more.

In recent years, a timing-based servo type has been widely used as a system that uses a head tracking servo using a servo signal (hereinafter, referred to as a "servo system"). In the servo system of a timing-based servo type (hereinafter, referred to as a "timing-based servo system"), a plurality of servo patterns having two or more different shapes are formed on the magnetic layer, and a servo element recognizes a position of the servo element based on time interval at which two servo patterns having different shapes are reproduced (read) and time interval at which two servo patterns having the same shape are reproduced.

The "timing-based servo pattern" in the present invention and this specification refers to a servo pattern in which head tracking is possible in the timing-based servo system. A servo pattern in which head tracking is possible in the timing-based servo system, as a plurality of servo patterns having two or more different shapes, is formed on the magnetic layer by a servo write head that is a head for forming the servo pattern. In an example, the plurality of servo patterns having two or more different shapes are continuously disposed at constant interval for each of the plurality of servo patterns having the same shape. In another example, different types of servo patterns are alternately disposed. Regarding the servo patterns having the same shape, position deviation in an edge shape of the servo patterns is ignored. The shape of the servo pattern in which head tracking is possible in the timing-based servo system and the disposition on the servo band are known, and a specific aspect will be described later. Hereinafter, the timing-based servo pattern is also simply referred to as a servo pattern. In the present invention and this specification, an edge shape of the timing-based servo pattern, specified by magnetic force microscopy is also referred to as a shape of an edge (end side) located on a downstream side in a magnetic tape running direction (hereinafter, referred to simply as a "running direction") in a case where data (information) is recorded.

Next, in the present invention and this specification, an edge shape of the timing-based servo pattern, specified by magnetic force microscopy, a difference ($L_{99.9}$–$L_{0.1}$) between a value $L_{99.9}$ of a cumulative distribution function of 99.9% and a value $L_{0.1}$ of a cumulative distribution function of 0.1% in a position deviation width of the edge shape from an ideal shape of the magnetic tape in a longitudinal direction, and an ideal shape will be described.

Hereinafter, a linear servo pattern that continuously extends from one side toward the other side of the magnetic tape in a width direction and is inclined at an angle α with respect to a width direction of the magnetic tape will be mainly described as an example. The angle α refers to an angle formed by a line segment connecting two end portions in a tape width direction of the edge of the servo pattern located on a downstream side with respect to a running direction of the magnetic tape in a case where data (information) is recorded, and a width direction of the magnetic tape. This will be further described below including this point.

Figure 14:
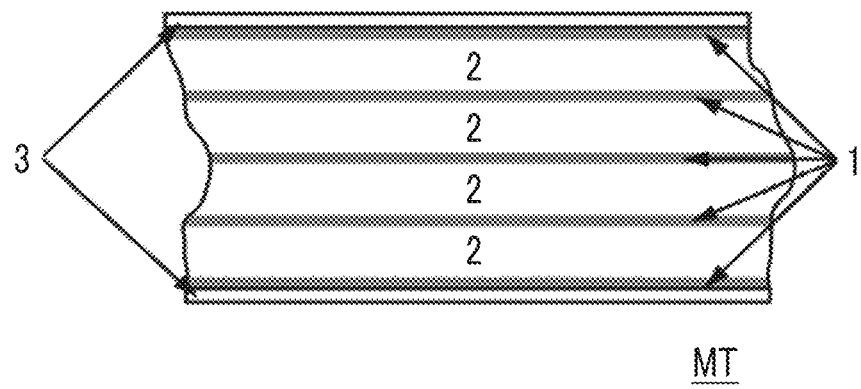
FIG. 14 shows a disposition example of a data band and a servo band.
Figure 15:
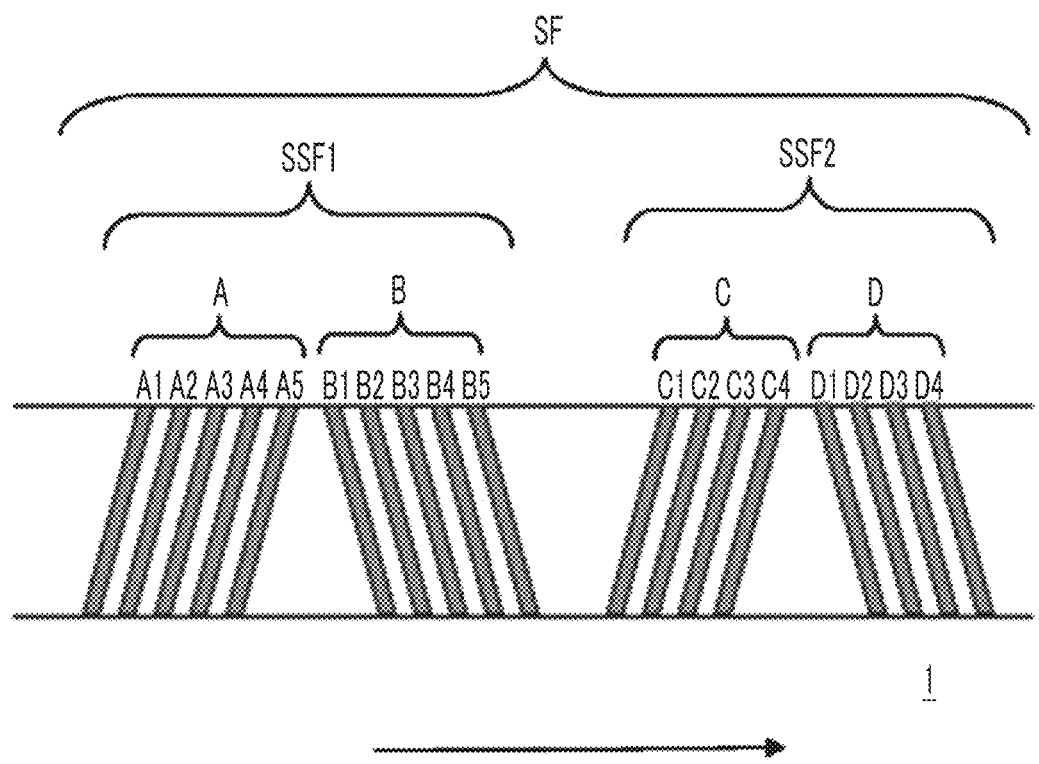
FIG. 15 shows a disposition example of a servo pattern of a linear-tape-open (LTO) Ultrium format tape.

For example, in a magnetic tape applied in a linear scanning method widely used as a recording method of the magnetic tape apparatus, in general, a plurality of regions in each of which a servo pattern is formed (referred to as a "servo band") exist on the magnetic layer along a longitudinal direction of the magnetic tape. A region interposed between two servo bands is referred to as a data band. The recording of information (magnetic signal) is performed on the data band, and a plurality of data tracks are formed on each data band along a longitudinal direction. FIG. 14 shows a disposition example of a data band and a servo band. In FIG. 14, in the magnetic layer of the magnetic tape MT, a plurality of servo bands 1 are disposed between the guide bands 3. A plurality of regions 2 each of which is interposed between two servo bands are data bands. The servo pattern is a magnetization region, and is formed by magnetizing a specific region of the magnetic layer with the servo write head. A region magnetized by the servo write head (a position where the servo pattern is formed) is determined by the standard. For example, in an LTO Ultrium format tape which is based on a local standard, a plurality of servo patterns tilted with respect to a tape width direction as shown in FIG. 15 are formed on a servo band, in a case of manufacturing a magnetic tape. Specifically, in FIG. 15, a servo frame SF on the servo band 1 is configured with a servo sub-frame 1 (SSF1) and a servo sub-frame 2 (SSF2). The servo sub-frame 1 is configured with an A burst (in FIG. 15, reference numeral A) and a B burst (in FIG. 15, reference numeral B). The A burst is configured with servo patterns A1 to A5 and the B burst is configured with servo patterns B1 to B5. Meanwhile, the servo sub-frame 2 is configured with a C burst (in FIG. 15, reference numeral C) and a D burst (in FIG. 15, reference numeral D). The C burst is configured with servo patterns C1 to C4 and the D burst is configured with servo patterns D1 to D4. Such 18 servo patterns are disposed in the sub-frames in the arrangement of 5, 5, 4, 4, as the sets of 5 servo patterns and 4 servo patterns, and are used for recognizing the servo frames. Although one servo frame is shown in FIG. 15, a plurality of servo frames are disposed in each servo band in a running direction. In FIG. 15, an arrow shows a running direction. A running direction side of the arrow is an upstream side, and the opposite side is a downstream side.

Figure 16:
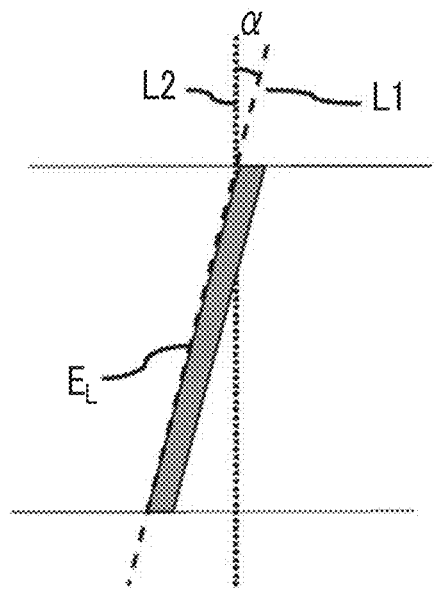
FIG. 16 is a view for describing an angle α regarding an edge shape of the servo pattern.
Figure 17:
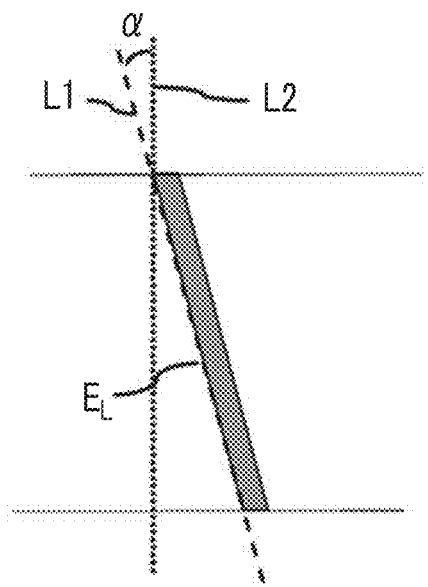
FIG. 17 is a view for describing an angle α regarding an edge shape of the servo pattern.

FIGS. 16 and 17 are views for describing an angle α. In the servo pattern shown in FIG. 15, in the servo pattern that is inclined toward an upstream side in a running direction like servo patterns A1 to A5 and C1 to C4, an angle formed by a line segment connecting two end portions of a downstream edge $E_L$ (a broken line L1 in FIG. 16) and a tape width direction (a broken line L2 in FIG. 16) is defined as an angle α. On the other hand, in the servo pattern that is inclined toward a downstream side in a running direction like servo patterns B1 to B5 and D1 to D4, an angle formed by a line segment connecting two end portions of a downstream edge $E_L$ (a broken line L1 in FIG. 17) and a tape width direction (a broken line L2 in FIG. 17) is defined as an angle α. This angle α is generally referred to as an azimuth angle and is determined by the setting of the servo write head in a case of forming a magnetization region (servo pattern) on the servo band.

Figure 18:
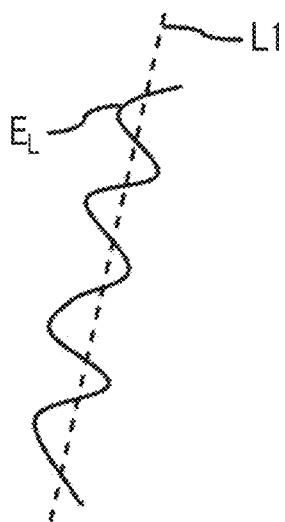
FIG. 18 shows an example of the edge shape of the servo pattern.

In a case where the magnetization region (servo pattern) is formed on a servo band, in a case where the servo pattern is ideally formed, an edge shape of the servo pattern inclined at an angle α with respect to the magnetic tape width direction coincides with a shape of a line segment connecting the two end portions of the edge (a broken line L1 in FIGS. 16 and 17). That is, the shape becomes a straight line. Therefore, at each portion on the edge, the position deviation width from the ideal shape of the magnetic tape in a longitudinal direction (hereinafter, also simply referred to as "position deviation width") becomes zero. On the other hand, as shown in an example in FIG. 18, an edge shape of the servo pattern may deviate from the ideal shape. The difference ($L_{99.9}$–$L_{0.1}$) is a value to be an index that the position deviation width from the ideal shape is small at each edge position of the servo pattern and that variation in the position deviation width at each edge portion is small. The difference ($L_{99.9}$–$L_{0.1}$) is a value obtained by the following method.

A magnetic layer surface of the magnetic tape on which the servo pattern is formed is observed with a magnetic force microscope (MFM). A measurement range is a range including five servo patterns. For example, in an LTO Ultrium format tape, five servo patterns of the A burst or the B burst can be observed by setting the measurement range to 90 μm×90 μm. A servo pattern (magnetization region) is extracted by measuring the measurement range at a 100 nm pitch (rough measurement). In the present invention and this specification, the "magnetic layer surface" is identical to a surface of the magnetic tape on a magnetic layer side.

Thereafter, in order to detect a boundary between the magnetization region and the non-magnetization region at the edge of the servo pattern located on a downstream side with respect to a running direction, a magnetic profile is obtained by performing measurement at a 5 nm pitch in the vicinity of the boundary. In a case where the obtained magnetic profile is inclined at an angle α with respect to a width direction of the magnetic tape, the magnetic profile is rotationally corrected by analysis software so as to be along the magnetic tape width direction (α=00). Thereafter, position coordinates of a peak value of each profile measured at a 5 nm pitch are calculated by analysis software. The position coordinates of this peak value indicate a position of a boundary between the magnetization region and the non-magnetization region. The position coordinates are specified by, for example, an xy coordinate system in which a running direction is an x coordinate and a width direction is a y coordinate.

In an example of a case where the ideal shape is a straight line and position coordinates of a certain position on the straight line are (x, y)=(a, b), in a case where the edge shape actually obtained (position coordinates of the boundary) is coincident with an ideal shape, the calculated position coordinates are (x, y)=(a, b). In this case, a position deviation width is zero. On the other hand, in a case where the edge shape actually obtained is deviated from an ideal shape, the x-coordinate of the position of y=b of the boundary is x=a+c or x=a−c. x=a+c is, for example, a case where a width c is deviated on an upstream side with respect to a running direction, and x=a−c is, for example, a case where a width c is deviated on a downstream side with respect to a running direction (that is, −c on the basis of the upstream side). Here, c is a position deviation width. That is, an absolute value of a position deviation width of the x coordinate from an ideal shape is a position deviation width from the ideal shape of the magnetic tape in the longitudinal direction. Thus, a position deviation width at each edge portion on a downstream side of the running direction of the magnetic profile obtained by measurement at 5 nm pitch is obtained.

From the values obtained for each servo pattern, the cumulative distribution function is obtained by analysis software. From the obtained cumulative distribution function, the value $L_{99.9}$ of a cumulative distribution function of 99.9% and the value $L_{0.1}$ of a cumulative distribution function of 0.1% are obtained, and a difference ($L_{99.9}-L_{0.1}$) is obtained for each servo pattern from the obtained values.

The above measurement is performed in three different measurement ranges (the number of measurements N=3).

An arithmetic average of differences ($L_{99.9}-L_{0.1}$) obtained for each servo pattern is defined as the above difference ($L_{99.9}-L_{0.1}$) for the magnetic tape.

Figure 19:
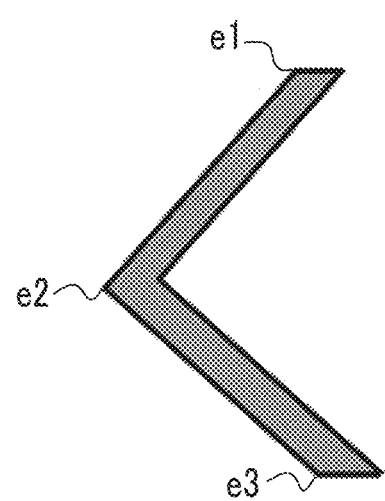
FIG. 19 shows an example of the servo pattern.
Figure 20:
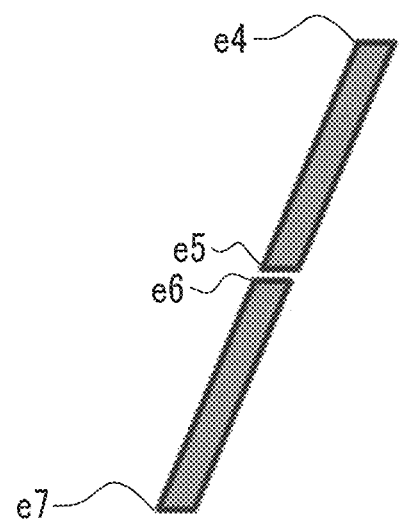
FIG. 20 shows an example of the servo pattern.
Figure 21:
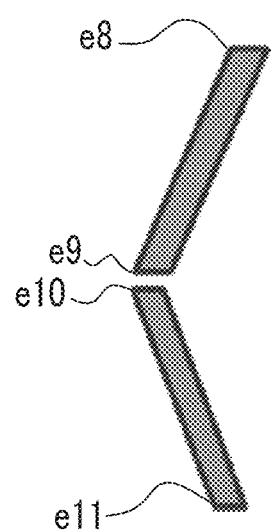
FIG. 21 shows an example of the servo pattern.

The "ideal shape" of an edge shape of the servo pattern in the present invention and this specification refers to an edge shape in a case where the servo pattern is formed without position deviation. For example, in an aspect, the servo pattern is a linear servo pattern extending continuously or discontinuously from one side toward the other side of the magnetic tape in a width direction. The "linear" for the servo pattern refers to that the pattern shape does not include a curved portion regardless of position deviation of the edge shape. "Continuous" refers to extending from one side toward the other side in a tape width direction without an inflection point of a tilt angle and without interruption. An example of the servo pattern extending continuously from one side toward the other side of the magnetic tape in a width direction is a servo pattern shown in FIG. 15. With respect to this, "discontinuous" refers to that there is one or more inflection points of a tilt angle and/or extending interruptedly at one or more portions. The shape that extends without interruption even though there is an inflection point of the tilt angle is a so-called polygonal line shape. An example of the discontinuous servo pattern extending from one side toward the other side in a tape width direction with one inflection point of the tilt angle and without interruption is a servo pattern shown in FIG. 19. On the other hand, an example of the discontinuous servo pattern extending from one side toward the other side in a tape width direction without an inflection point of the tilt angle and with interruption at one portion is a servo pattern shown in FIG. 20. In addition, an example of the discontinuous servo pattern extending from one side toward the other side in a tape width direction with one inflection point of the tilt angle and with interruption at one portion is a servo pattern shown in FIG. 21.

In a linear servo pattern that continuously extends from one side toward the other side in a tape width direction, the "ideal shape" of the edge shape is a shape of a line segment connecting two end portions of an edge on a downstream side in a running direction of the linear servo pattern (a linear shape). For example, the linear servo pattern shown in FIG. 15 has a shape of a straight line indicated by L1 in FIG. 16 or 17. On the other hand, in a linear servo pattern that extends discontinuously, the ideal shape is a shape of a line segment connecting one end and the other end of a portion with the same tilt angle (a linear shape) in a shape with an inflection point of the tilt angle. In addition, in the shape extending with interruption at one or more portions, the ideal shape is a shape of a line segment connecting one end and the other end of each continuously extending portion (linear shape). For example, in the servo pattern shown in FIG. 19, the ideal shape is a shape of a line segment connecting e1 and e2, and a line segment connecting e2 and e3. In the servo pattern shown in FIG. 20, the ideal shape is a shape of a line segment connecting e4 and e5, and a line segment connecting e6 and e7. In the servo pattern shown in FIG. 21, the ideal shape is a shape of a line segment connecting e8 and e9, and a line segment connecting e10 and e11.

In the above, a linear servo pattern has been described as an example. Here, the servo pattern may be a servo pattern in which an ideal shape of the edge shape is a curved shape. For example, in a servo pattern in which an edge shape on a downstream side with respect to a running direction is ideally a partial arc shape, it is possible to obtain a difference ($L_{99.9}-L_{0.1}$) from a position deviation width, of an edge shape on a downstream side with respect to a running direction, obtained from the position coordinates obtained by a magnetic force microscope, with respect to position coordinates of this partial arc.

As a magnetic force microscope used in the above measurement, a commercially available or known magnetic force microscope is used in a frequency modulation (FM) mode. As a probe of a magnetic force microscope, for example, SSS-MFMR (nominal curvature radius 15 nm) manufactured by Nanoworld AG can be used. A distance between a magnetic layer surface and a probe distal end during magnetic force microscopy is in a range of 20 to 50 nm.

In addition, as analysis software, commercially available analysis software or analysis software in which a known arithmetic expression is incorporated can be used.

Next, a method for measuring the isoelectric point of the surface zeta potential of the magnetic layer will be described. In the present invention and this specification, the "magnetic layer surface" is identical to a surface of the magnetic tape on a magnetic layer side.

In the present invention and this specification, the isoelectric point of the surface zeta potential of the magnetic layer is a value of pH in a case where a surface zeta potential measured by a flow potential method (also referred to as a flow current method) becomes zero. A sample is cut out from the magnetic tape which is a measurement target, and the sample is disposed in a measurement cell so that the magnetic layer surface comes into contact with an electrolyte. Pressure in the measurement cell is changed to flow the electrolyte and a flow potential at each pressure is measured, and then, the surface zeta potential is obtained by the following calculation expression.

Calculation Expression $$\zeta = \frac{dI}{dp} \times \frac{\eta}{\varepsilon \varepsilon_0} \frac{L}{A}$$

[$\zeta$: surface zeta potential, p: pressure, I: flow potential, $\eta$: viscosity of electrolyte, $\varepsilon$: relative dielectric constant of electrolyte, $\varepsilon_0$: dielectric constant in a vacuum state, L: length of channel (flow path between two electrodes), A: area of cross section of channel]

The pressure is changed in a range of 0 to 400,000 Pa (0 to 400 mbar). The calculation of the surface zeta potential by flowing the electrolyte to the measurement cell and measuring a flow potential is performed using the electrolytes having different pH (from pH 9 to pH 3 at interval of about 0.5). A total number of measurement points is 13 from the measurement point of pH 9 to the 13th measurement point of pH 3. By doing so, the surface zeta potential is obtained for each measurement point of pH. As pH decreases, the surface zeta potential decreases. Thus, two measurement points at which polarity of the surface zeta potential changes (a change from a positive value to a negative value) may appear, while pH decreases from 9 to 3. In a case where such two measurement points appear, using a straight line (linear function) showing a relationship between the surface zeta potential and pH of each of the two measurement points, pH in a case where the surface zeta potential is zero is obtained by interpolation. Meanwhile, in a case where all of the surface zeta potentials obtained during the decrease of pH from 9 to 3 is positive value, using a straight line (linear function) showing a relationship between the surface zeta potential and pH of the 13th measurement point (pH 3) which is the final measurement point and the 12th measurement point, pH in a case where the surface zeta potential is zero is obtained by extrapolation. On the other hand, in a case where all of the surface zeta potentials obtained during the decrease of pH from 9 to 3 is negative value, using a straight line (linear function) showing a relationship between the surface zeta potential and pH of the first measurement point (pH 9) which is the final measurement point and the 12th measurement point, pH in a case where the surface zeta potential is zero is obtained by extrapolation. By doing so, the value of pH in a case where the surface zeta potential of the magnetic layer measured by the flow potential method becomes zero is obtained.

The above measurement is performed three times in total at room temperature by using different samples cut out from the same magnetic tape (magnetic tape which is a measurement target), and pH in a case where the surface zeta potential becomes zero in each measurement is obtained. For the viscosity and the relative dielectric constant of the electrolyte, a measurement value at room temperature is used. The room temperature is set as a range from 20° C. to 27° C. Regarding the magnetic layer, an arithmetic average of three pHs obtained as described above is an isoelectric point of the surface zeta potential of the magnetic layer of the magnetic tape which is a measurement target. As the electrolyte having pH 9, an electrolyte obtained by adjusting pH of a KCl aqueous solution having a concentration of 1 mmol/L to pH 9 by using a KOH aqueous solution having a concentration of 0.1 mol/L is used. As the electrolyte having other pH, an electrolyte obtained by adjusting pH of the electrolyte having pH 9, which is adjusted as described above, by using an HCl aqueous solution having a concentration of 0.1 mol/L is used. The isoelectric point of the surface zeta potential measured by the method described above is an isoelectric point obtained regarding the magnetic layer surface.

The present inventors suppose that an unstable contact state between the magnetic layer surface and the reading element in a case of reading data recorded on the magnetic tape a cause of an increase in change of the relative position (relative positional change) between the reading element and the reading target track. With respect to this, it is supposed that in the magnetic tape in a range of pH in which the isoelectric point of the surface zeta potential of the magnetic layer is 5.5 or more, that is, in a range of nearly neutral to basic pH, the fact that it is difficult for the magnetic layer surface and the reading element to react electrochemically and/or the fact that it is difficult for scrapings generated by bringing the magnetic layer surface and the reading element into contact with each other and scraping the magnetic layer surface to be fixed to the magnetic head, contributes to stabilization of the contact state between the magnetic layer surface and the reading element and suppression of occurrence of the above relative potential change. The present inventors consider that this aspect contributes to a more appropriate waveform equalization process performed on each of the reading results obtained by a plurality of the reading elements, and leads to an increase in an acceptable amount of a deviation amount (a track off-set amount), for ensuring excellent reproducing quality.

In addition, as described above, it is considered that the formation of a servo pattern in a shape closer to a design shape also leads to an increase in an acceptable amount of a deviation amount (a track off-set amount), for ensuring excellent reproducing quality. In this regard, the present inventors consider that the above difference ($L_{99.9}-L_{0.1}$) is an index related to a shape of the servo pattern, and the difference ($L_{99.9}-L_{0.1}$) of 180 nm or less contributes to an increase in an acceptable amount of a deviation amount (a track off-set amount), for ensuring excellent reproducing quality. Regarding a shape of a servo pattern formed on the magnetic layer, as one of means for suppressing deviation between a shape of a servo pattern (a magnetization region) to be formed on the magnetic layer by applying a magnetic field by a servo write head and a shape of a servo pattern actually formed on the magnetic layer, it is considered to increase a capacity of a servo write head, specifically, to use a servo write head having a large magnetic field (leakage magnetic field). In addition, the present inventors suppose that an unstable contact state between the magnetic layer surface and the servo write head in a case of forming a servo pattern by applying a magnetic field to the magnetic layer by the servo write head while contacting the magnetic layer surface is a cause of deviation between a shape of a servo pattern (a magnetization region) to be formed on the magnetic layer by applying a magnetic field by a servo write head and a shape of a servo pattern actually formed on the magnetic layer. With respect to this, the present inventors suppose that in the magnetic tape in a range of pH in which the isoelectric point of the surface zeta potential of is 5.5 or more, that is, in a range of nearly neutral to basic pH, the fact that it is difficult for the magnetic layer surface and the servo write head to react electrochemically and/or the fact that it is difficult for scrapings generated by bringing the magnetic layer surface and the servo write head into contact with each other and scraping the magnetic layer surface to be fixed to the servo write head, contributes to improvement of stability of a contact state between the magnetic layer surface and the servo write head, and this leads to formation of a servo pattern having a shape closer to a design shape, that is, the difference ($L_{99.9}-L_{0.1}$) being 180 nm or less.

Here, the above description is merely supposition and the present invention is not limited thereto.

Hereinafter, the magnetic tape will be described later in detail.

Isoelectric Point of Surface Zeta Potential of Magnetic Layer

The isoelectric point of the surface zeta potential of the magnetic layer of the magnetic tape is 5.5 or more. It is supposed that this aspect contributes to an increase in an acceptable amount of a deviation amount (a track off-set amount), for ensuring excellent reproducing quality.

As will be described later in detail, the isoelectric point of the surface zeta potential of the magnetic layer can be controlled by the kind of a component used for forming the magnetic layer, a formation step of the magnetic layer, and the like. From a viewpoint of availability of the controlling, the isoelectric point of the surface zeta potential of the magnetic layer is preferably 7.0 or less, more preferably 6.7 or less, and still more preferably 6.5 or less. In addition, the isoelectric point of the surface zeta potential of the magnetic layer is 5.5 or more, preferably 5.7 or more, and still more preferably 6.0 or more.

Difference ($L_{99.9}-L_{0.1}$)

The difference ($L_{99.9}-L_{0.1}$) is 180 nm or less. It is supposed that this aspect also contributes to an increase in an acceptable amount of a deviation amount (a track off-set amount), for ensuring excellent reproducing quality. From the above viewpoint, the difference ($L_{99.9}-L_{0.1}$) is preferably 170 nm or less, more preferably 160 nm or less, and still more preferably 150 nm or less. Further, the difference ($L_{99.9}-L_{0.1}$) may be, for example, 50 nm or more, 60 nm or more, 70 nm or more, 80 nm or more, 90 nm or more, or 100 nm or more. Here, it is considered that the smaller a value of the difference ($L_{99.9}-L_{0.1}$) is, the more preferable it is to increase the acceptable amount of a deviation amount (a track off-set amount), for ensuring excellent reproducing quality, and thus the difference ($L_{99.9}-L_{0.1}$) may be below the lower limit exemplified above.

Next, a magnetic layer of the magnetic tape, and the like will be further described.

Magnetic Layer

Ferromagnetic Powder

A magnetic layer includes ferromagnetic powder and a binding agent. As the ferromagnetic powder included in the magnetic layer, known ferromagnetic powder that is ferromagnetic powder used in the magnetic layer of various magnetic recording media, may be used. It is preferable to use ferromagnetic powder having a small average particle size, from a viewpoint of improvement of recording density. In this respect, an average particle size of the ferromagnetic powder is preferably 50 nm or less, more preferably 45 nm or less, still more preferably 40 nm or less, still more preferably 35 nm or less, still more preferably 30 nm or less, still more preferably 25 nm or less, and still more preferably 20 nm or less. On the other hand, from a viewpoint of magnetization stability, an average particle size of the ferromagnetic powder is preferably 5 nm or more, more preferably 8 nm or more, still more preferably 10 nm or more, and still more preferably 15 nm or more, and still more preferably 20 nm or more.

Hexagonal Ferrite Powder

As a preferred specific example of ferromagnetic powder, hexagonal ferrite powder can be used. For details of the hexagonal ferrite powder, descriptions disclosed in paragraphs 0012 to 0030 of JP2011-225417A, paragraphs 0134 to 0136 of JP2011-216149A, paragraphs 0013 to 0030 of JP2012-204726A, and paragraphs 0029 to 0084 of JP2015-127985A can be referred to, for example.

In the present invention and this specification, "hexagonal ferrite powder" refers to ferromagnetic powder in which a hexagonal ferrite type crystal structure is detected as a main phase by X-ray diffraction analysis. The main phase refers to a structure to which the highest intensity diffraction peak in an X-ray diffraction spectrum obtained by X-ray diffraction analysis is attributed. For example, in a case where the highest intensity diffraction peak is attributed to a hexagonal ferrite crystal structure in an X-ray diffraction spectrum obtained by X-ray diffraction analysis, it is determined that the hexagonal ferrite crystal structure is detected as the main phase. In a case where only a single structure is detected by X-ray diffraction analysis, this detected structure is taken as the main phase. The hexagonal ferrite type crystal structure includes at least an iron atom, a divalent metal atom and an oxygen atom, as a constituent atom. The divalent metal atom is a metal atom that can be a divalent cation as an ion, and examples thereof may include an alkaline earth metal atom such as a strontium atom, a barium atom, and a calcium atom, a lead atom, and the like. In the present invention and this specification, hexagonal strontium ferrite powder means that a main divalent metal atom contained in the powder is a strontium atom, and hexagonal barium ferrite powder means that a main divalent metal atom included in the powder is a barium atom. The main divalent metal atom refers to a divalent metal atom that accounts for the most on an at % basis among divalent metal atoms included in the powder. Here, a rare earth atom is not included in the above divalent metal atom. The "rare earth atom" in the present invention and this specification is selected from the group consisting of a scandium atom (Sc), an yttrium atom (Y), and a lanthanoid atom. The Lanthanoid atom is selected from the group consisting of a lanthanum atom (La), a cerium atom (Ce), a praseodymium atom (Pr), a neodymium atom (Nd), a promethium atom (Pm), a samarium atom (Sm), a europium atom (Eu), a gadolinium atom (Gd), a terbium atom (Tb), a dysprosium atom (Dy), a holmium atom (Ho), an erbium atom (Er), a thulium atom (Tm), an ytterbium atom (Yb), and a lutetium atom (Lu).

Hereinafter, the hexagonal strontium ferrite powder which is an aspect of the hexagonal ferrite powder will be described in more detail.

An activation volume of the hexagonal strontium ferrite powder is preferably in a range of 800 to 1600 $nm^3$. The particulate hexagonal strontium ferrite powder exhibiting an activation volume in the above range is suitable for manufacturing a magnetic tape exhibiting excellent electromagnetic conversion characteristics. An activation volume of the hexagonal strontium ferrite powder is preferably 800 $nm^3$ or more, and may be, for example, 850 $nm^3$ or more. Further, from a viewpoint of further improving electromagnetic conversion characteristics, an activation volume of the hexagonal strontium ferrite powder is more preferably 1500 nm³ or less, still more preferably 1400 nm³ or less, still more preferably 1300 nm³ or less, still more preferably 1200 nm³ or less, and still more preferably 1100 nm³ or less. The same applies to an activation volume of the hexagonal barium ferrite powder.

The "activation volume" is a unit of magnetization reversal and is an index indicating a magnetic size of a particle. An activation volume described in the present invention and this specification and an anisotropy constant Ku which will be described later are values obtained from the following relational expression between a coercivity Hc and an activation volume V, by performing measurement in an Hc measurement portion at a magnetic field sweep rate of 3 minutes and 30 minutes using a vibrating sample magnetometer (measurement temperature: 23° C.±1° C.). In a unit of the anisotropy constant Ku, 1 erg/cc=1.0×10⁻¹ J/m³.

$$Hc=2Ku/Ms\{1-[(kT/KuV)\ln(At/0.693)]^{1/2}\}$$

[In the above formula, Ku: anisotropy constant (unit: J/m³), Ms: saturation magnetization (Unit: kA/m), k: Boltzmann constant, T: absolute temperature (unit: K), V: activation volume (unit: cm³), A: spin precession frequency (unit: s⁻¹), t: magnetic field reversal time (unit: s)]

An index for reducing thermal fluctuation, in other words, improving thermal stability may include an anisotropy constant Ku. The hexagonal strontium ferrite powder may preferably have Ku of 1.8×10⁵ J/m³ or more, and more preferably have a Ku of 2.0×10⁵ J/m³ or more. Ku of the hexagonal strontium ferrite powder may be, for example, 2.5×10⁵ J/m³ or less. Here, it means that the higher Ku is, the higher thermal stability is, this is preferable, and thus, a value thereof is not limited to the values exemplified above.

The hexagonal strontium ferrite powder may or may not include a rare earth atom. In a case where the hexagonal strontium ferrite powder includes a rare earth atom, it is preferable to include a rare earth atom at a content (bulk content) of 0.5 to 5.0 at % with respect to 100 at % of an iron atom. In an aspect, the hexagonal strontium ferrite powder including a rare earth atom may have a rare earth atom surface layer portion uneven distribution property. In the present invention and this specification, the "rare earth atom surface layer portion uneven distribution property" means that a rare earth atom content with respect to 100 at % of an iron atom in a solution obtained by partially dissolving hexagonal strontium ferrite powder with an acid (hereinafter, referred to as a "rare earth atom surface layer portion content" or simply a "surface layer portion content" for a rare earth atom) and a rare earth atom content with respect to 100 at % of an iron atom in a solution obtained by totally dissolving hexagonal strontium ferrite powder with an acid (hereinafter, referred to as a "rare earth atom bulk content" or simply a "bulk content" for a rare earth atom) satisfy a ratio of a rare earth atom surface layer portion content/a rare earth atom bulk content>1.0. A rare earth atom content in hexagonal ferrite powder which will be described later is the same meaning as the rare earth atom bulk content. On the other hand, partial dissolution using an acid dissolves a surface layer portion of a particle configuring hexagonal strontium ferrite powder, and thus, a rare earth atom content in a solution obtained by partial dissolution is a rare earth atom content in a surface layer portion of a particle configuring hexagonal strontium ferrite powder. A rare earth atom surface layer portion content satisfying a ratio of "rare earth atom surface layer portion content/rare earth atom bulk content>1.0" means that in a particle of hexagonal strontium ferrite powder, rare earth atoms are unevenly distributed in a surface layer portion (that is, more than in an inside). The surface layer portion in the present invention and this specification means a partial region from a surface of a particle configuring hexagonal strontium ferrite powder toward an inside.

In a case where hexagonal ferrite powder includes a rare earth atom, a rare earth atom content (bulk content) is preferably in a range of 0.5 to 5.0 at % with respect to 100 at % of an iron atom. It is considered that a bulk content in the above range of the included rare earth atom and uneven distribution of the rare earth atoms in a surface layer portion of a particle configuring hexagonal strontium ferrite powder contribute to suppression of a decrease in a reproducing output in repeated reproduction. It is supposed that this is because hexagonal strontium ferrite powder includes a rare earth atom with a bulk content in the above range, and rare earth atoms are unevenly distributed in a surface layer portion of a particle configuring hexagonal strontium ferrite powder, and thus it is possible to increase an anisotropy constant Ku. The higher a value of an anisotropy constant Ku is, the more a phenomenon of so-called thermal fluctuation can be suppressed (in other words, thermal stability can be improved). By suppressing occurrence of thermal fluctuation, it is possible to suppress a decrease in reproducing output during repeated reproduction. It is supposed that uneven distribution of rare earth atoms in a particulate surface layer portion of hexagonal strontium ferrite powder contributes to stabilization of spins of iron (Fe) sites in a crystal lattice of a surface layer portion, and thus, an anisotropy constant Ku may be increased.

Moreover, it is supposed that the use of hexagonal strontium ferrite powder having a rare earth atom surface layer portion uneven distribution property as a ferromagnetic powder in the magnetic layer also contributes to inhibition of a surface of the magnetic layer from being scraped by being slid with respect to the magnetic head. That is, it is supposed that hexagonal strontium ferrite powder having rare earth atom surface layer portion uneven distribution property can also contribute to an improvement of running durability of the magnetic tape. It is supposed that this may be because uneven distribution of rare earth atoms on a surface of a particle configuring hexagonal strontium ferrite powder contributes to an improvement of interaction between the particle surface and an organic substance (for example, a binding agent and/or an additive) included in the magnetic layer, and, as a result, a strength of the magnetic layer is improved.

From a viewpoint of further suppressing a decrease in reproducing output during repeated reproduction and/or a viewpoint of further improving the running durability, the rare earth atom content (bulk content) is more preferably in a range of 0.5 to 4.5 at %, still more preferably in a range of 1.0 to 4.5 at %, and still more preferably in a range of 1.5 to 4.5 at %.

The bulk content is a content obtained by totally dissolving hexagonal strontium ferrite powder. In the present invention and this specification, unless otherwise noted, the content of an atom means a bulk content obtained by totally dissolving hexagonal strontium ferrite powder. The hexagonal strontium ferrite powder including a rare earth atom may include only one kind of rare earth atom as the rare earth atom, or may include two or more kinds of rare earth atoms. The bulk content in the case of including two or more types of rare earth atoms is obtained for the total of two or more types of rare earth atoms. This also applies to other components in the present invention and this specification. That is, unless otherwise noted, a certain component may be used alone or in combination of two or more. A content amount or content in a case where two or more components are used refers to that for the total of two or more components.

In a case where the hexagonal strontium ferrite powder includes a rare earth atom, the included rare earth atom may be any one or more of rare earth atoms. As a rare earth atom that is preferable from a viewpoint of further suppressing a decrease in reproducing output in repeated reproduction, there are a neodymium atom, a samarium atom, an yttrium atom, and a dysprosium atom, here, a neodymium atom, a samarium atom, and an yttrium atom are more preferable, and a neodymium atom is still more preferable.

In the hexagonal strontium ferrite powder having a rare earth atom surface layer portion uneven distribution property, the rare earth atoms may be unevenly distributed in the surface layer portion of a particle configuring the hexagonal strontium ferrite powder, and the degree of uneven distribution is not limited. For example, for a hexagonal strontium ferrite powder having a rare earth atom surface layer portion uneven distribution property, a ratio between a surface layer portion content of a rare earth atom obtained by partial dissolution under dissolution conditions which will be described later and a bulk content of a rare earth atom obtained by total dissolution under dissolution conditions which will be described later, that is, "surface layer portion content/bulk content" exceeds 1.0 and may be 1.5 or more. A "surface layer portion content/bulk content" larger than 1.0 means that in a particle configuring the hexagonal strontium ferrite powder, rare earth atoms are unevenly distributed in the surface layer portion (that is, more than in the inside). Further, a ratio between a surface layer portion content of a rare earth atom obtained by partial dissolution under dissolution conditions which will be described later and a bulk content of a rare earth atom obtained by total dissolution under the dissolution conditions which will be described later, that is, "surface layer portion content/bulk content" may be, for example, 10.0 or less, 9.0 or less, 8.0 or less, 7.0 or less, 6.0 or less, 5.0 or less, or 4.0 or less. Here, in the hexagonal strontium ferrite powder having a rare earth atom surface layer portion uneven distribution property, the rare earth atoms may be unevenly distributed in the surface layer portion of a particle configuring the hexagonal strontium ferrite powder, and the "surface layer portion content/bulk content" is not limited to the illustrated upper limit or lower limit.

The partial dissolution and the total dissolution of the hexagonal strontium ferrite powder will be described below. For the hexagonal strontium ferrite powder that exists as a powder, the partially and totally dissolved sample powder is taken from the same lot of powder. On the other hand, for the hexagonal strontium ferrite powder included in the magnetic layer of the magnetic tape, a part of the hexagonal strontium ferrite powder taken out from the magnetic layer is subjected to partial dissolution, and the other part is subjected to total dissolution. The hexagonal strontium ferrite powder can be taken out from the magnetic layer by a method disclosed in a paragraph 0032 of JP2015-091747A, for example.

The partial dissolution means that dissolution is performed such that, at the end of dissolution, the residue of the hexagonal strontium ferrite powder can be visually checked in the solution. For example, by partial dissolution, it is possible to dissolve a region of 10 to 20 mass % of the particle configuring the hexagonal strontium ferrite powder with the total particle being 100 mass %. On the other hand, the total dissolution means that dissolution is performed such that, at the end of dissolution, the residue of the hexagonal strontium ferrite powder can not be visually checked in the solution.

The partial dissolution and measurement of the surface layer portion content are performed by the following method, for example. Here, the following dissolution conditions such as an amount of sample powder are illustrative, and dissolution conditions for partial dissolution and total dissolution can be employed in any manner.

A container (for example, a beaker) containing 12 mg of sample powder and 10 ml of 1 mol/L hydrochloric acid is held on a hot plate at a set temperature of 70° C. for 1 hour. The obtained solution is filtered by a membrane filter of 0.1 μm. Elemental analysis of the filtrated solution is performed by an inductively coupled plasma (ICP) analyzer. In this way, the surface layer portion content of a rare earth atom with respect to 100 at % of an iron atom can be obtained. In a case where a plurality of types of rare earth atoms are detected by elemental analysis, the total content of all rare earth atoms is defined as the surface layer portion content. This also applies to the measurement of the bulk content.

On the other hand, the total dissolution and measurement of the bulk content are performed by the following method, for example.

A container (for example, a beaker) containing 12 mg of sample powder and 10 ml of 4 mol/L hydrochloric acid is held on a hot plate at a set temperature of 80° C. for 3 hours. Thereafter, the method is carried out in the same manner as the partial dissolution and the measurement of the surface layer portion content, and the bulk content with respect to 100 at % of an iron atom can be obtained.

From a viewpoint of increasing the reproducing output in a case of reproducing information recorded on the magnetic tape, it is desirable that mass magnetization σs of the ferromagnetic powder included in the magnetic tape is high. In this regard, the hexagonal strontium ferrite powder including a rare earth atom but not having the rare earth atom surface layer portion uneven distribution property tends to have σs largely lower than the hexagonal strontium ferrite powder including no rare earth atom. On the other hand, it is considered that hexagonal strontium ferrite powder having a rare earth atom surface layer portion uneven distribution property is preferable in suppressing such a large decrease in σs. In an aspect, σs of the hexagonal strontium ferrite powder may be 45 A·m$^2$/kg or more, and may be 47 A·m$^2$/kg or more. On the other hand, from a viewpoint of noise reduction, σs is preferably 80 A·m$^2$/kg or less and more preferably 60 A·m$^2$/kg or less. σs can be measured using a known measuring device, such as a vibrating sample magnetometer, capable of measuring magnetic properties. In the present invention and this specification, unless otherwise noted, the mass magnetization as is a value measured at a magnetic field intensity of 1194 kA/m (15 kOe).

Regarding the content (bulk content) of a constituent atom of the hexagonal ferrite powder, the strontium atom content may be, for example, in a range of 2.0 to 15.0 at % with respect to 100 at % of an iron atom. In an aspect, in the hexagonal strontium ferrite powder, a divalent metal atom included in the powder may be only a strontium atom. In another aspect, the hexagonal strontium ferrite powder may include one or more other divalent metal atoms in addition to a strontium atom. For example, a barium atom and/or a calcium atom may be included. In a case where another divalent metal atom other than a strontium atom is included, a barium atom content and a calcium atom content in the hexagonal strontium ferrite powder are, for example, in a range of 0.05 to 5.0 at % with respect to 100 at % of an iron atom, respectively.

As a crystal structure of hexagonal ferrite, a magnetoplumbite type (also referred to as an "M type"), a W type, a Y type, and a Z type are known. The hexagonal strontium ferrite powder may have any crystal structure. The crystal structure can be checked by X-ray diffraction analysis. In the hexagonal strontium ferrite powder, a single crystal structure or two or more crystal structures may be detected by X-ray diffraction analysis. For example, according to an aspect, in the hexagonal strontium ferrite powder, only the M-type crystal structure may be detected by X-ray diffraction analysis. For example, M-type hexagonal ferrite is represented by a composition formula of $AFe_{12}O_{19}$. Here, A represents a divalent metal atom, and in a case where the hexagonal strontium ferrite powder is the M-type, A is only a strontium atom (Sr), or in a case where, as A, a plurality of divalent metal atoms are included, as described above, a strontium atom (Sr) accounts for the most on an at % basis. The divalent metal atom content of the hexagonal strontium ferrite powder is usually determined by the type of crystal structure of the hexagonal ferrite and is not particularly limited. The same applies to the iron atom content and the oxygen atom content. The hexagonal strontium ferrite powder may include at least an iron atom, a strontium atom, and an oxygen atom, and may further include a rare earth atom. Furthermore, the hexagonal strontium ferrite powder may or may not include atoms other than these atoms. As an example, the hexagonal strontium ferrite powder may include an aluminum atom (Al). A content of an aluminum atom can be, for example, 0.5 to 10.0 at % with respect to 100 at % of an iron atom. From a viewpoint of further suppressing a decrease in reproducing output in repeated reproduction, the hexagonal strontium ferrite powder includes an iron atom, a strontium atom, an oxygen atom, and a rare earth atom, and the content of atoms other than these atoms is preferably 10.0 at % or less, more preferably in a range of 0 to 5.0 at %, and may be 0 at % with respect to 100 at % of an iron atom. That is, in an aspect, the hexagonal strontium ferrite powder may not include atoms other than an iron atom, a strontium atom, an oxygen atom, and a rare earth atom. The content expressed in at % is obtained by converting a content of each atom (unit: mass %) obtained by totally dissolving hexagonal strontium ferrite powder into a value expressed in at % using an atomic weight of each atom. Further, in the present invention and this specification, "not include" for a certain atom means that a content measured by an ICP analyzer after total dissolution is 0 mass %. A detection limit of the ICP analyzer is usually 0.01 ppm (part per million) or less on a mass basis. The "not included" is used as a meaning including that an atom is included in an amount less than the detection limit of the ICP analyzer. In an aspect, the hexagonal strontium ferrite powder may not include a bismuth atom (Bi).

Metal Powder

As a preferred specific example of the ferromagnetic powder, a ferromagnetic metal powder can also be used. For details of the ferromagnetic metal powder, descriptions disclosed in paragraphs 0137 to 0141 of JP2011-216149A and paragraphs 0009 to 0023 of JP2005-251351A can be referred to, for example.

ε-Iron Oxide Powder

As a preferred specific example of the ferromagnetic powder, ε-iron oxide powder can also be used. In the present invention and this specification, "ε-iron oxide powder" refers to ferromagnetic powder in which a ε-iron oxide type crystal structure is detected as a main phase by X-ray diffraction analysis. For example, in a case where the highest intensity diffraction peak is attributed to a ε-iron oxide type crystal structure in an X-ray diffraction spectrum obtained by X-ray diffraction analysis, it is determined that the ε-iron oxide type crystal structure is detected as the main phase. As a manufacturing method of ε-iron oxide powder, a manufacturing method from a goethite, a reverse micelle method, and the like are known. All of the manufacturing methods are well known. Regarding a method of manufacturing ε-iron oxide powder in which a part of Fe is substituted with substitutional atoms such as Ga, Co, Ti, Al, or Rh, a description disclosed in J. Jpn. Soc. Powder Metallurgy Vol. 61 Supplement, No. S1, pp. S280 to S284, J. Mater. Chem. C, 2013, 1, pp. 5200 to 5206 can be referred to, for example. Here, the manufacturing method of ε-iron oxide powder capable of being used as the ferromagnetic powder in the magnetic layer of the magnetic tape is not limited to the methods described here.

An activation volume of the ε-iron oxide powder is preferably in a range of 300 to 1500 $nm^3$. The particulate ε-iron oxide powder exhibiting an activation volume in the above range is suitable for manufacturing a magnetic tape exhibiting excellent electromagnetic conversion characteristics. An activation volume of the ε-iron oxide powder is preferably 300 $nm^3$ or more, and may be, for example, 500 $nm^3$ or more. Further, from a viewpoint of further improving electromagnetic conversion characteristics, an activation volume of the ε-iron oxide powder is more preferably 1400 $nm^3$ or less, still more preferably 1300 $nm^3$ or less, still more preferably 1200 $nm^3$ or less, and still more preferably 1100 $nm^3$ or less.

An index for reducing thermal fluctuation, in other words, improving thermal stability may include an anisotropy constant Ku. The ε-iron oxide powder preferably has Ku of $3.0\times10^4$ $J/m^3$ or more, and more preferably has Ku of $8.0\times10^4$ $J/m^3$ or more. Ku of the ε-iron oxide powder may be, for example, $3.0\times10^5$ $J/m^3$ or less. Here, it means that the higher Ku is, higher thermal stability is, this is preferable, and thus, a value thereof is not limited to the values exemplified above.

From a viewpoint of increasing the reproducing output in a case of reproducing information recorded on the magnetic tape, it is desirable that mass magnetization as of the ferromagnetic powder included in the magnetic tape is high. In this regard, in an aspect, as of the ε-iron oxide powder may be 8 $A \cdot m^2/kg$ or more, and may be 12 $A \cdot m^2/kg$ or more. On the other hand, from a viewpoint of noise reduction, as of the ε-iron oxide powder is preferably 40 $A \cdot m^2/kg$ or less and more preferably 35 $A \cdot m^2/kg$ or less.

In the present invention and this specification, unless otherwise noted, an average particle size of various powders such as the ferromagnetic powder is a value measured by the following method using a transmission electron microscope.

The powder is imaged at a magnification ratio of 100,000 with a transmission electron microscope, and the image is printed on printing paper so that the total magnification ratio becomes 500,000 to obtain an image of particles configuring the powder. A target particle is selected from the obtained image of particles, an outline of the particle is traced with a digitizer, and a size of the particle (primary particle) is measured. The primary particle is an independent particle which is not aggregated.

The measurement described above is performed regarding 500 particles randomly extracted. An arithmetic average of the particle sizes of 500 particles obtained as described above is an average particle size of the powder. As the transmission electron microscope, a transmission electron microscope H-9000 manufactured by Hitachi, Ltd. can be used, for example. In addition, the measurement of the particle size can be performed by well-known image analysis software, for example, image analysis software KS-400 manufactured by Carl Zeiss. The average particle size shown in examples which will be described later is a value measured by using a transmission electron microscope H-9000 manufactured by Hitachi, Ltd. as the transmission electron microscope, and image analysis software KS-400 manufactured by Carl Zeiss as the image analysis software, unless otherwise noted. In the present invention and this specification, the powder means an aggregate of a plurality of particles. For example, ferromagnetic powder means an aggregate of a plurality of ferromagnetic particles. Further, the aggregate of the plurality of particles not only includes an aspect in which particles configuring the aggregate directly come into contact with each other, but also includes an aspect in which a binding agent or an additive which will be described later is interposed between the particles. The term "particle" is used to describe a powder in some cases.

As a method of taking sample powder from the magnetic tape in order to measure the particle size, a method disclosed in a paragraph of 0015 of JP2011-048878A can be used, for example.

In the present invention and this specification, unless otherwise noted, (1) in a case where the shape of the particle observed in the particle image described above is a needle shape, a fusiform shape, or a columnar shape (here, a height is greater than a maximum long diameter of a bottom surface), the size (particle size) of the particles configuring the powder is shown as a length of a long axis configuring the particle, that is, a long axis length, (2) in a case where the shape of the particle is a plate shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an unspecified shape, and the long axis configuring the particles cannot be specified from the shape, the particle size is shown as an equivalent circle diameter. The equivalent circle diameter is a value obtained by a circle projection method.

In addition, regarding an average acicular ratio of the powder, a length of a short axis, that is, a short axis length of each of the particles is measured in the measurement described above, a value of (long axis length/short axis length) of each particle is obtained, and an arithmetic average of the values obtained regarding 500 particles is calculated. Here, unless otherwise noted, in a case of (1), the short axis length as the definition of the particle size is a length of a short axis configuring the particle, in a case of (2), the short axis length is a thickness or a height, and in a case of (3), the long axis and the short axis are not distinguished, thus, the value of (long axis length/short axis length) is assumed as 1, for convenience.

In addition, unless otherwise noted, in a case where the shape of the particle is specified, for example, in a case of definition of the particle size (1), the average particle size is an average long axis length, and in a case of the definition (2), the average particle size is an average plate diameter. In a case of the definition (3), the average particle size is an average diameter (also referred to as an average particle diameter).

A content (filling percentage) of the ferromagnetic powder of the magnetic layer is preferably 50 to 90 mass % and more preferably 60 to 90 mass %. A component other than the ferromagnetic powder of the magnetic layer is at least a binding agent, and one or more kinds of additives can be randomly included. A high filling percentage of the ferromagnetic powder in the magnetic layer is preferable from a viewpoint of improvement of recording density.

Binding Agent and Curing Agent

The magnetic tape is a coating type magnetic tape and includes a binding agent in the magnetic layer. The binding agent is one or more kinds of resins. As the binding agent, various resins usually used as a binding agent of a coating type magnetic recording medium can be used. For example, as the binding agent, a resin selected from a polyurethane resin, a polyester resin, a polyamide resin, a vinyl chloride resin, an acrylic resin obtained by copolymerizing styrene, acrylonitrile, methyl methacrylate, or the like, a cellulose resin such as nitrocellulose, an epoxy resin, a phenoxy resin, and a polyvinylalkylal resin such as polyvinyl acetal or polyvinyl butyral can be used alone or a plurality of the resins can be mixed with each other to be used. Among these, a polyurethane resin, an acrylic resin, a cellulose resin, and a vinyl chloride resin are preferable. These resins may be homopolymers or copolymers. These resins can be used as the binding agent even in the non-magnetic layer and/or a back coating layer which will be described later.

For the binding agent described above, descriptions disclosed in paragraphs 0028 to 0031 of JP2010-024113A can be referred to. An average molecular weight of the resin used as the binding agent can be, for example, 10,000 or more and 200,000 or less as a weight-average molecular weight. The weight-average molecular weight of the present invention and this specification is a value obtained by performing polystyrene conversion of a value measured under the following measurement conditions by gel permeation chromatography (GPC). The weight-average molecular weight of the binding agent shown in examples which will be described later is a value obtained by performing polystyrene conversion of a value measured under the following measurement conditions.

GPC device: HLC-8120 (manufactured by Tosoh Corporation)

Column: TSK gel Multipore HXL-M (manufactured by Tosoh Corporation, 7.8 mm ID (inner diameter)×30.0 cm)

Eluent: Tetrahydrofuran (THF)

In an aspect, as a binding agent, a binding agent containing an acidic group can be used. The acidic group in the present invention and this specification is used in a meaning including a form of a group capable of releasing $H^+$ in water or a solvent including water (aqueous solvent) to be dissociated into an anion and a salt thereof. As a specific example of an acidic group, a form of each of a sulfonic acid group, a sulfuric acid group, a carboxy group, a phosphoric acid group, and a salt thereof, can be used, for example. For example, a form of a salt of a sulfonic acid group ($-SO_3H$) means a group represented by $-SO_3M$, where M represents a group representing an atom (for example, an alkali metal atom or the like) which can be a cation in water or an aqueous solvent. The same applies to the form of each of salts of the various groups described above. As an example of a binding agent containing an acidic group, a resin containing at least one type of acidic group selected from the group consisting of a sulfonic acid group and a salt thereof (for example, a polyurethane resin, vinyl chloride resin, or the like) can be used, for example. Here, the resin included in the magnetic layer is not limited to these resins. In the binding agent containing an acidic group, an acidic group content can be, for example, in a range of 0.03 to 0.50 meq/g. Contents of various functional groups such as an acidic group included in a resin, can be obtained by a well-known method according to the kind of functional group. The binding agent can be used in a magnetic layer forming composition in an amount of, for example, 1.0 to 30.0 parts by mass with respect to 100.0 parts by mass of the ferromagnetic powder.

In regards to the controlling of the isoelectric point of the surface zeta potential of the magnetic layer, it is supposed that formation of the magnetic layer so as to decrease the amount of an acidic component present in a surface layer part of the magnetic layer contributes to an increase in value of the isoelectric point. In addition, it is supposed that increasing the amount of a basic component present in the surface layer part of the magnetic layer also contributes to an increase in value of the isoelectric point. The acidic component is used in a meaning including a form of a component capable of releasing $H^+$ in water or a aqueous solvent to be dissociated into an anion and a salt thereof. The basic component is used in a meaning including a form of a component capable of releasing $OH^-$ in water or aqueous solvent to be dissociated into a cation and a salt thereof. For example, it is considered that in a case where the acidic component is used, a process of, after unevenly distributing the acidic component in a surface layer part of a coating layer of a magnetic layer forming composition, decreasing the amount of the acidic component of the surface layer part leads to an increase in value of the isoelectric point of the surface zeta potential of the magnetic layer to control the isoelectric point to be 5.5 or more. For example, it is considered that in a step of applying a magnetic layer forming composition onto a non-magnetic support, the applying which is performed in an alternating magnetic field by applying an alternating magnetic field leads to uneven distribution of the acidic component in the surface layer part of the coating layer of the magnetic layer forming composition. Furthermore, it is supposed that performing a burnish treatment thereafter contributes to a removal of at least a part of the unevenly distributed acidic component. The burnish treatment is a treatment of rubbing a surface to be treated with a member (for example, an abrasive tape or a grinding tool such as a grinding blade or a grinding wheel). Details of a magnetic layer forming step including the burnish treatment will be described later. As the acidic component, a binding agent containing an acidic group can be used, for example.

In addition, a curing agent can also be used together with a resin usable as the binding agent. As the curing agent, in an aspect, a thermosetting compound which is a compound in which a curing reaction (crosslinking reaction) proceeds due to heating can be used, and in another aspect, a photo-curable compound in which a curing reaction (crosslinking reaction) proceeds due to light irradiation can be used. At least a part of the curing agent is included in the magnetic layer in a state of being reacted (crosslinked) with other components such as the binding agent, by proceeding the curing reaction in a magnetic layer forming step. The same applies to the layer formed using this composition in a case where the composition used to form the other layer includes a curing agent. The preferred curing agent is a thermosetting compound, and polyisocyanate is suitable for this. For details of the polyisocyanate, descriptions disclosed in paragraphs 0124 and 0125 of JP2011-216149A can be referred to. The curing agent can be used in the magnetic layer forming composition in an amount of, for example, 0 to 80.0 parts by mass, and preferably 50.0 to 80.0 parts by mass, from a viewpoint of improvement of a strength of the magnetic layer, with respect to 100.0 parts by mass of the binding agent.

Additive

The magnetic layer may include a ferromagnetic powder and a binding agent, and, as necessary, include one or more kinds of additives. As the additive, the curing agent described above is used as an example. In addition, examples of the additive which can be included in the magnetic layer include non-magnetic powder (for example, inorganic powder or carbon black), a lubricant, a dispersing agent, a dispersing assistant, an antibacterial agent, an antistatic agent, and an antioxidant. As the non-magnetic powder, non-magnetic powder which can function as an abrasive, or non-magnetic powder which can function as a protrusion forming agent which forms protrusions suitably protruded from the magnetic layer surface (for example, non-magnetic colloidal particles) is used. An average particle size of the colloidal silica (silica colloidal particles) shown in examples which will be described later is a value obtained by a method disclosed in a paragraph 0015 of JP2011-048878A as a measurement method of an average particle diameter. As the additive, a commercially available product can be suitably selected or manufactured by a well-known method according to the desired properties, and any amount thereof can be used. As an example of the additive which can be used in the magnetic layer including the abrasive, a dispersing agent disclosed in paragraphs 0012 to 0022 of JP2013-131285A can be used as a dispersing agent for improving dispersibility of the abrasive. For example, for the lubricant, descriptions disclosed in paragraphs 0030 to 0033, 0035, and 0036 of JP2016-126817A can be referred to. The non-magnetic layer may include a lubricant. For the lubricant which may be included in the non-magnetic layer, descriptions disclosed in paragraphs 0030, 0031, 0034, 0035, and 0036 of JP2016-126817A can be referred to. For the dispersing agent, descriptions disclosed in paragraphs 0061 and 0071 of JP2012-133837A can be referred to. The dispersing agent may be included in the non-magnetic layer. For the dispersing agent which can be included in the non-magnetic layer, a description disclosed in a paragraph 0061 of JP2012-133837A can be referred to.

The magnetic layer described above can be provided on the surface of the non-magnetic support directly or indirectly through the non-magnetic layer.

Non-Magnetic Layer

Next, the non-magnetic layer will be described. The magnetic tape may include a magnetic layer on a non-magnetic support directly, or may include a non-magnetic layer including non-magnetic powder and a binding agent between the non-magnetic support and the magnetic layer. The non-magnetic powder used in the non-magnetic layer may be powder of inorganic substance or powder of organic substance. In addition, carbon black and the like can be used. Examples of the inorganic substance include metal, metal oxide, metal carbonate, metal sulfate, metal nitride, metal carbide, and metal sulfide. These non-magnetic powders can be purchased as a commercially available product or can be manufactured by a well-known method. For details thereof, descriptions disclosed in paragraphs 0146 to 0150 of JP2011-216149A can be referred to. For carbon black which can be used in the non-magnetic layer, descriptions disclosed in paragraphs 0040 and 0041 of JP2010-024113A can be referred to. The content (filling percentage) of the non-magnetic powder of the non-magnetic layer is preferably 50 to 90 mass % and more preferably 60 to 90 mass %.

In regards to other details of a binding agent or an additive of the non-magnetic layer, the well-known technique regarding the non-magnetic layer can be applied. In addition, in regards to the type and the content of the binding agent, and the type and the content of the additive, for example, the well-known technique regarding the magnetic layer can be applied.

The non-magnetic layer of the magnetic tape also includes a substantially non-magnetic layer including a small amount of ferromagnetic powder as impurities, for example, or intentionally, together with the non-magnetic powder. Here, the substantially non-magnetic layer is a layer having a residual magnetic flux density of 10 mT or less, a layer having a coercivity of 7.96 kA/m (100 Oe) or less, or a layer having a residual magnetic flux density of 10 mT or less and a coercivity of 7.96 kA/m (100 Oe) or less. It is preferable that the non-magnetic layer does not have a residual magnetic flux density and a coercivity.

Non-Magnetic Support

Next, the non-magnetic support will be described. As the non-magnetic support (hereinafter, also simply referred to as a "support"), well-known components such as polyethylene terephthalate, polyethylene naphthalate, polyamide, polyamide imide, and aromatic polyamide subjected to biaxial stretching are used. Among these, polyethylene terephthalate, polyethylene naphthalate, and polyamide are preferable. Corona discharge, plasma treatment, easy-bonding treatment, or thermal treatment may be performed with respect to these supports in advance.

Back Coating Layer

The magnetic tape may or may not include a back coating layer including non-magnetic powder and a binding agent on a surface side of the non-magnetic support opposite to the surface provided with the magnetic layer. Preferably, the back coating layer includes one or both of carbon black and inorganic powder. In regards to the binding agent included in the back coating layer and various additives which can be randomly included in the back coating layer, the well-known technique regarding the back coating layer can be applied, and the well-known technique regarding the treatment of the magnetic layer and/or the non-magnetic layer can be applied. For example, for the back coating layer, descriptions disclosed in paragraphs 0018 to 0020 of JP2006-331625A and page 4, line 65, to page 5, line 38, of U.S. Pat. No. 7,029,774B can be referred to.

Various Thicknesses

A thickness of the non-magnetic support is preferably 3.00 to 20.00 μm, more preferably 3.00 to 10.00 μm, and still more preferably 3.00 to 6.00 μm.

A thickness of the magnetic layer can be optimized according to a saturation magnetization amount of a magnetic head used, a head gap length, a recording signal band, and the like. A thickness of the magnetic layer is generally 0.01 μm to 0.15 μm, and preferably 0.02 μm to 0.12 μm and more preferably 0.03 μm to 0.10 μm from a viewpoint of high density recording. The magnetic layer may be at least a single layer, the magnetic layer may be separated into two or more layers having different magnetic properties, and a configuration of a well-known multilayered magnetic layer can be applied as the magnetic layer. A thickness of the magnetic layer in a case where the magnetic layer is separated into two or more layers is a total thickness of the layers.

A thickness of the non-magnetic layer is, for example, 0.10 to 1.50 μm and is preferably 0.10 to 1.00 μm.

A thickness of the back coating layer is preferably 0.90 μm or less and more preferably in the range of 0.10 to 0.70 nm.

The thickness of each layer of the magnetic tape and the non-magnetic support can be obtained by a well-known film thickness measurement method. As an example, a cross section of the magnetic tape in a thickness direction is, for example, exposed by a well-known method of ion beams or microtome, and the exposed cross section is observed with a scanning electron microscope. In the cross section observation, various thicknesses can be obtained as a thickness obtained at one portion of the cross section, or an arithmetic average of thicknesses obtained at a plurality of portions of two or more portions, for example, two portions which are randomly extracted. In addition, the thickness of each layer may be obtained as a designed thickness calculated according to the manufacturing conditions.

Method of Manufacturing Magnetic Tape

Manufacturing of Magnetic Tape Having Servo Pattern

Each composition for forming the magnetic layer, the back coating layer, and the non-magnetic layer which is randomly provided, normally includes a solvent, together with various components described above. As the solvent, various organic solvents generally used for manufacturing a coating type magnetic recording medium can be used. The amount of solvent in each layer forming composition is not particularly limited, and can be the same as that of each layer forming composition of a normal coating type magnetic recording medium. A step of preparing the composition for forming each layer generally includes at least a kneading step, a dispersing step, and a mixing step provided before and after these steps, if necessary. Each step may be divided into two or more stages. The component used in the preparation of each layer forming composition may be added at an initial stage or in a middle stage of each step. In addition, each component may be separately added in two or more steps.

In order to prepare each layer forming composition, a well-known technique can be used. In the kneading step, preferably, a kneader having a strong kneading force such as an open kneader, a continuous kneader, a pressure kneader, or an extruder is used. For details of the kneading processes, descriptions disclosed in JP1989-106338A (JP-H01-106338A) and JP1989-079274A (JP-H01-079274A) can be referred to. Moreover, in order to disperse each layer forming composition, one or more kinds of dispersion beads selected from the group consisting of glass beads and other dispersion beads can be used as a dispersion medium. As such dispersion beads, zirconia beads, titania beads, and steel beads which are dispersion beads having high specific gravity are suitable. These dispersion beads can be used by optimizing a particle diameter (bead diameter) and a filling percentage. As a dispersing device, a well-known dispersing device can be used. Each layer forming composition may be filtered by a well-known method before performing the coating step. The filtering can be performed by using a filter, for example. As the filter used in the filtering, a filter having a pore diameter of 0.01 to 3 μm (for example, filter made of glass fiber or filter made of polypropylene) can be used, for example.

The magnetic layer can be formed by directly applying the magnetic layer forming composition onto the surface of the non-magnetic support or performing multilayer coating of the magnetic layer forming composition with the non-magnetic layer forming composition in order or at the same time. The back coating layer can be formed by applying a back coating layer forming composition onto the surface of the non-magnetic support on which the magnetic layer is formed or on the surface thereof on a side opposite to the surface on which the magnetic layer is to be formed. For details of the coating for forming each layer, a description disclosed in a paragraph 0066 of JP2010-231843A can be referred to.

The coating of the magnetic layer forming composition performed in an alternating magnetic field can contribute to the controlling of the isoelectric point of a surface zeta potential of the magnetic layer to be 5.5 or more. The present inventors suppose that since an acidic component (for example, a binding agent containing an acidic group) is easily unevenly distributed in a surface layer part of a coating layer of the magnetic layer forming composition due to the applied alternating magnetic field, a magnetic layer in which the acidic component is unevenly distributed in the surface layer part is obtained by drying this coating layer. Furthermore, it is supposed that performing a burnish treatment thereafter contributes to a removal of at least a part of the unevenly distributed acidic component to control the isoelectric point of the surface zeta potential of the magnetic layer to be 5.5 or more.

The applying of the alternating magnetic field can be performed by disposing a magnet in a coating device so that the alternating magnetic field is applied vertically to the surface of the coating layer of the magnetic layer forming composition. A magnetic field intensity of the alternating magnetic field can be set to about 0.05 to 3.00 T, for example. However, there is no limitation to this range. The term "vertical" in the present invention and this specification does not necessarily mean only a vertical direction in strict meaning, but includes a range of errors allowed in the technical field to which the present invention belongs. The range of errors can mean, for example, a range of less than $\pm 10°$ from an exact vertical direction.

The burnish treatment is a treatment of rubbing a surface to be treated with a member (for example, an abrasive tape or a grinding tool such as a grinding blade or a grinding wheel), and can be performed in the same manner as a well-known burnish treatment for manufacturing a coating type magnetic recording medium. The burnish treatment can be preferably carried out by performing one or both of rubbing (polishing) a surface of the coating layer to be treated with an abrasive tape and rubbing (grinding) a surface of the coating layer to be treated with a grinding tool. As the abrasive tape, a commercially available product may be used or an abrasive tape manufactured by a well-known method may be used. As the grinding tool, a well-known grinding blade such as a fixed blade, a diamond wheel, or a rotary blade, and a grinding wheel, or the like can be used. In addition, a wiping treatment of wiping off the surface of the coating layer rubbed by the abrasive tape and/or the grinding tool with a wiping material may be performed. For details of the preferred abrasive tape, grinding tool, burnish treatment, and wiping treatment, descriptions disclosed in paragraphs 0034 to 0048 and FIG. 1 of JP1994-052544A (JP-H01-052544A) and the examples thereof can be referred to. It is considered that the more the burnish treatment is strengthened, the more the acidic component unevenly distributed in the surface layer part of the coating layer of the magnetic layer forming composition by performing the applying in an alternating magnetic field can be removed. The burnish treatment can be strengthened as an abrasive having high hardness is used as the abrasive contained in the abrasive tape, and can be strengthened as the amount of the abrasive in the abrasive tape is increased. Moreover, the burnish treatment can be strengthened as a grinding tool having high hardness is used as the grinding tool. In regards to the burnish treatment conditions, the burnish treatment can be strengthened as a sliding speed between the surface of the coating layer to be treated and the member (for example, an abrasive tape or a grinding tool) is increased. The sliding speed can be increased by increasing one or both of the speed for moving the member and the speed for moving the magnetic tape to be treated. Although the reason is not clear, the isoelectric point of the surface zeta potential of the magnetic layer may tend to increase after the burnish treatment as the amount of the binding agent containing an acidic group in the coating layer of the magnetic layer forming composition is increased.

In a case where the magnetic layer forming composition contains a curing agent, it is preferable to perform a curing treatment at any stage of the steps for forming the magnetic layer. The burnish treatment is preferably performed at least before the curing treatment. The burnish treatment may be further performed after the curing treatment. It is considered that it is preferable to perform the burnish treatment before the curing treatment in order to increase a removal efficiency for removing the acidic component from the surface layer part of the coating layer of the magnetic layer forming composition. The curing treatment can be performed by a treatment such as thermal treatment or light irradiation according to the kind of the curing agent contained in the magnetic layer forming composition. The curing treatment conditions are not particularly limited, and may be appropriately set according to the treatment of the magnetic layer forming composition, the kind of curing agent, the thickness of the coating layer, and the like. For example, in a case where the coating layer is formed using the magnetic layer forming composition containing polyisocyanate as a curing agent, the curing treatment is preferably the thermal treatment.

Preferably, a surface smoothing treatment can be performed before the curing treatment. The surface smoothing treatment is a treatment performed for increasing the smoothness of the surface of the magnetic tape, and is preferably performed by a calendering treatment. For details of the calendering treatment, for example, a description disclosed in a paragraph 0026 of JP2010-231843A can be referred to.

For various other steps for manufacturing the magnetic tape, a well-known technique can be applied. For details of the various steps, descriptions disclosed in paragraphs 0067 to 0070 of JP2010-231843A can be referred to, for example. It is preferable that the coating layer of the magnetic layer forming composition is subjected to an orientation process, while this coating layer is in a wet (not dried) state. For the orientation process, various well-known techniques such as a description disclosed in a paragraph 0067 of JP2010-231843A can be used. For example, a vertical orientation process can be performed by a well-known method such as a method using a polar opposing magnet. In an orientation zone, a drying speed of the coating layer can be controlled depending on a temperature and a flow rate of dry air and/or a transportation speed of the magnetic tape in the orientation zone. In addition, the coating layer may be preliminarily dried before the transportation to the orientation zone. In a case of performing the orientation process, it is preferable to apply a magnetic field (for example, a direct current magnetic field) for orienting the ferromagnetic powder with respect to the coating layer of the magnetic layer forming composition applied in an alternating magnetic field.

Servo Pattern Formation

The magnetic tape has a timing-based servo pattern in the magnetic layer. FIG. 14 shows a disposition example of a region (servo band) in which the timing-based servo pattern is formed and a region (data band) which is interposed between two servo bands. FIG. 15 shows a disposition example of the timing-based servo pattern. Specific examples of a shape of the timing-based servo pattern are shown in FIGS. 15 to 17 and FIGS. 19 to 21. Here, the disposition example and/or the shape shown in each drawing is merely an example, and a servo pattern, a servo band, and a data band may be formed and disposed in a shape and a disposition according to a type of the magnetic tape apparatus (drive). Further, for a shape and a disposition of the timing-based servo pattern, it is possible to apply the well-known technique such as disposition examples illustrated in, for example, FIG. 4, FIG. 5, FIG. 6, FIG. 9, FIG. 17, and FIG. 20 of U.S. Pat. No. 5,689,384A without any limitation.

The servo pattern can be formed by magnetizing a specific region of the magnetic layer with the servo write head mounted on a servo writer. In the timing-based servo system, for example, a servo signal is obtained by reading pairs of non-parallel servo patterns (also referred to as "servo stripes") continuously disposed in plural in a longitudinal direction of a magnetic tape by a servo element.

In an aspect, as shown in JP2004-318983A, information indicating a servo band number (referred to as "servo band ID (identification)" or "UDIM (Unique Data Band Identification Method) information") is embedded in each servo band. This servo band ID is recorded by shifting a specific one of the plurality of pairs of the servo patterns in the servo band so that positions thereof are relatively displaced in a longitudinal direction of the magnetic tape. Specifically, a way of shifting the specific one of the plurality of pairs of servo patterns is changed for each servo band. Accordingly, the recorded servo band ID is unique for each servo band, and thus, the servo band can be uniquely specified only by reading one servo band with a servo element.

As a method for uniquely specifying a servo band, there is a method using a staggered method as shown in ECMA (European Computer Manufacturers Association)-319. In this staggered method, a group of pairs of non-parallel servo patterns (servo stripes) disposed continuously in plural in a longitudinal direction of the magnetic tape is recorded so as to be shifted in a longitudinal direction of the magnetic tape for each servo band. Since this combination of shifting methods between adjacent servo bands is unique throughout the magnetic tape, it is possible to uniquely specify a servo band in a case of reading a servo pattern with two servo elements.

As shown in ECMA-319, information indicating a position of the magnetic tape in the longitudinal direction (also referred to as "LPOS (Longitudinal Position) information") is usually embedded in each servo band. This LPOS information is also recorded by shifting the positions of the pair of servo patterns in the longitudinal direction of the magnetic tape, as the UDIM information. Here, unlike the UDIM information, in this LPOS information, the same signal is recorded in each servo band.

It is also possible to embed, in the servo band, the other information different from the above UDIM information and LPOS information. In this case, the embedded information may be different for each servo band as the UDIM information or may be common to all servo bands as the LPOS information.

As a method of embedding information in the servo band, it is possible to employ a method other than the above. For example, a predetermined code may be recorded by thinning out a predetermined pair from the group of pairs of servo patterns.

The servo write head has a pair of gaps corresponding to the pair of servo patterns as many as the number of servo bands. Usually, a core and a coil are connected to each pair of gaps, and by supplying a current pulse to the coil, a magnetic field generated in the core can cause generation of a leakage magnetic field in the pair of gaps. In a case of forming the servo pattern, by inputting a current pulse while running the magnetic tape on the servo write head, the magnetic pattern corresponding to the pair of gaps is transferred to the magnetic tape to form the servo pattern.

A width of each gap can be appropriately set according to a density of the servo pattern to be formed. The width of each gap can be set to, for example, 1 μm or less, 1 to 10 μm, 10 μm or more, and the like.

Before the servo pattern is formed on the magnetic tape, the magnetic tape is usually subjected to a demagnetization (erasing) process. This erasing process can be performed by applying a uniform magnetic field to the magnetic tape using a direct current magnet or an alternating current magnet. The erasing process includes direct current (DC) erasing and alternating current (AC) erasing. AC erasing is performed by gradually decreasing an intensity of the magnetic field while reversing a direction of the magnetic field applied to the magnetic tape. On the other hand, DC erasing is performed by applying a unidirectional magnetic field to the magnetic tape. As the DC erasing, there are two methods. A first method is horizontal DC erasing of applying a magnetic field in one direction along a longitudinal direction of the magnetic tape. A second method is vertical DC erasing of applying a magnetic field in one direction along a thickness direction of the magnetic tape. The erasing process may be performed on the entire magnetic tape or may be performed for each servo band of the magnetic tape.

A direction of the magnetic field of the servo pattern to be formed is determined according to a direction of the erasing. For example, in a case where the horizontal DC erasing is performed to the magnetic tape, the servo pattern is formed so that the direction of the magnetic field is opposite to the direction of the erasing. Therefore, an output of a servo signal obtained by reading the servo pattern can be increased. As shown in JP2012-053940A, in a case where a pattern is transferred to, using the gap, a magnetic tape that has been subjected to vertical DC erasing, a servo signal obtained by reading the formed servo pattern has a monopolar pulse shape. On the other hand, in a case where a pattern is transferred to, using the gap, a magnetic tape that has been subjected to horizontal DC erasing, a servo signal obtained by reading the formed servo pattern has a bipolar pulse shape.

The magnetic tape described above is usually accommodated in a magnetic tape cartridge and the magnetic tape cartridge is mounted in the magnetic tape apparatus.

Magnetic Tape Cartridge

An aspect of the present invention relates to a magnetic tape cartridge comprising the above magnetic tape.

Details of the magnetic tape included in the magnetic tape cartridge are as described above.

In the magnetic tape cartridge, generally, the magnetic tape is accommodated inside a cartridge body in a state of being wound around a reel. The reel is rotatably provided inside the cartridge body. As the magnetic tape cartridge, a single reel type magnetic tape cartridge having one reel inside the cartridge body and a dual reel type magnetic tape cartridge having two reels inside the cartridge body are widely used. In a case where the single reel type magnetic tape cartridge is mounted on a magnetic tape apparatus (drive) for recording and/or reproducing information (magnetic signal) on the magnetic tape, the magnetic tape is pulled out of the magnetic tape cartridge to be wound around the reel on the drive side. A magnetic head is disposed in a magnetic tape transportation path from the magnetic tape cartridge to a winding reel. Feeding and winding of the magnetic tape are performed between a reel (supply reel) on the magnetic tape cartridge side and a reel (winding reel) on the drive side. During this time, information is recorded and/or reproduced as the magnetic head and the magnetic layer surface of the magnetic tape come into contact with each other to be slid on each other. On the other hand, in the dual reel type magnetic tape cartridge, both the supply reel and the winding reel are provided inside the magnetic tape cartridge. The magnetic tape cartridge may be either a single reel type or a dual reel type magnetic tape cartridge. The magnetic tape cartridge has only to include the magnetic tape according to the aspect of the present invention, and the well-known technique can be applied to the others. For the aspect of the magnetic tape cartridge, the above-mentioned description regarding the magnetic tape cartridge 12 in FIG. 1 can be referred to.

Magnetic Tape Apparatus

An aspect of the present invention relates to a magnetic tape apparatus including the above described magnetic tape, a reading element unit, and an extraction unit, in which the reading element unit includes a plurality of reading elements each of which reads data from a specific track region including a reading target track in a track region included in the magnetic tape, and in which the extraction unit performs a waveform equalization process with respect to each reading result for each reading element, to extract, from the reading result, data derived from the reading target track. Such a magnetic tape apparatus is as described in detail above.

EXAMPLES

Hereinafter, the present invention will be described with reference to examples. Here, the present invention is not limited to aspects shown in the examples. Unless otherwise noted, "parts" and "%" described below are based on mass. In addition, steps and evaluations described below were performed in an environment of an atmosphere temperature of 23° C.±1° C., unless otherwise noted. "eq" in the following description is an equivalent and is a unit that cannot be converted into SI unit.

A "binding agent A" described below is a $SO_3Na$ group-containing polyurethane resin (weight-average molecular weight: 70,000, $SO_3Na$ group: 0.20 meq/g).

A "binding agent B" described below is a vinyl chloride copolymer (product name: MR110, $SO_3K$ group-containing vinyl chloride copolymer, $SO_3K$ group: 0.07 meq/g) manufactured by Kaneka Corporation.

An activation volume in Table 1 is a value obtained by the method described above for each ferromagnetic powder using a vibrating sample magnetometer (manufactured by Toei Kogyo Co., Ltd.).

Manufacturing of Magnetic Tape

Example 1

(1) Preparation of Alumina Dispersion 3.0 parts of 2,3-dihydroxynaphthalene (manufactured by Tokyo Chemical Industry Co., Ltd.), 31.3 parts of a 32% solution (solvent is a mixed solvent of methyl ethyl ketone and toluene) of a $SO_3Na$ group-containing polyester polyurethane resin (UR-4800 ($SO_3Na$ group: 0.08 meq/g) manufactured by Toyobo Co., Ltd.), and 570.0 parts of a mixed solution of methyl ethyl ketone and cyclohexanone (mass ratio of 1:1) as a solvent were mixed with respect to 100.0 parts of alumina powder (HIT-80 manufactured by Sumitomo Chemical Co., Ltd) having a gelatinization ratio of about 65% and a brunauer-emmett-teller (BET) specific surface area of 20 $m^2/g$, and this mixture was dispersed in the presence of zirconia beads by a paint shaker for 5 hours. After the dispersion, the dispersion liquid and the beads were separated by a mesh and an alumina dispersion was obtained.

(2) Treatment of Magnetic Layer Forming Composition

| Magnetic Liquid | |
|---|---|
| Ferromagnetic powder | 100.0 parts |
| Type: hexagonal barium ferrite powder, activation volume: see Table 1) | |
| Binding agent (type: see Table 1) | see Table 1 |
| Cyclohexanone | 150.0 parts |
| Methyl ethyl ketone | 150.0 parts |
| Abrasive Liquid | |
| Alumina dispersion prepared above (1) | 6.0 parts |
| Silica Sol (Protrusion Forming Agent Liquid) | |
| Colloidal silica (average particle size: 120 nm) | 2.0 parts |
| Methyl ethyl ketone | 1.4 parts |
| Other Components | |
| Stearic acid | 2.0 parts |
| Stearic acid amide | 0.2 parts |
| Butyl stearate | 2.0 parts |
| Polyisocyanate (CORONATE (registered trademark) manufactured by Tosoh Corporation) | 2.5 parts |
| Finishing Additive Solvent | |
| Cyclohexanone | 200.0 parts |
| Methyl ethyl ketone | 200.0 parts |

(3) Treatment of Non-Magnetic Layer Forming Composition

| | |
|---|---|
| Non-magnetic inorganic powder: α-iron oxide | 100.0 parts |
| Average particle size (average long axis length): | 0.15 μm |
| Average acicular ratio: | 7 |
| BET specific surface area: | 52 $m^2/g$ |
| Carbon black | 20.0 parts |
| Average particle size: | 20 nm |
| Binding agent A | 18.0 parts |
| Stearic acid | 2.0 parts |
| Stearic acid amide | 0.2 parts |
| Butyl stearate | 2.0 parts |
| Cyclohexanone | 300.0 parts |
| Methyl ethyl ketone | 300.0 parts |

(4) Treatment of Back Coating Layer Forming Composition

| | |
|---|---|
| Non-magnetic inorganic powder: α-iron oxide | 80.0 parts |
| Average particle size (average long axis length): | 0.15 μm |
| Average acicular ratio: | 7 |
| BET specific surface area: | 52 $m^2/g$ |
| Carbon black | 20.0 parts |
| Average particle size: | 20 nm |
| Vinyl chloride copolymer | 13.0 parts |
| Sulfonate group-containing polyurethane resin | 6.0 parts |
| Phenylphosphonic acid | 3.0 parts |
| Methyl ethyl ketone | 155.0 parts |
| Polyisocyanate | 5.0 parts |
| Cyclohexanone | 355.0 parts |

(5) Preparation of Each Layer Forming Composition

The magnetic layer forming composition was prepared by the following method.

The magnetic liquid was prepared by dispersing (beads dispersing) each component using a batch type vertical sand mill for 24 hours. As the dispersion beads, zirconia beads having a bead diameter of 0.5 mm were used.

The prepared magnetic liquid, the abrasive liquid, and other components (silica sol, other components, and finishing additive solvent) were mixed with one another and beads-dispersed for 5 minutes by using the sand mill, and the treatment (ultrasonic dispersion) was performed with a batch type ultrasonic device (20 kHz, 300 W) for 0.5 minutes. Thereafter, the resultant dispersion liquid was filtered using a filter having a pore diameter of 0.5 μm, and the magnetic layer forming composition was prepared.

The non-magnetic layer forming composition was prepared by the following method.

Each component excluding a lubricant (stearic acid, stearic acid amide, and butyl stearate), cyclohexanone, and methyl ethyl ketone was dispersed using a batch type vertical sand mill for 24 hours to obtain a dispersion liquid. As the dispersion beads, zirconia beads having a bead diameter of 0.5 mm were used. Thereafter, the remaining components were added into the obtained dispersion liquid and were stirred by a dissolver. The dispersion liquid obtained as described above was filtered using a filter having a pore diameter of 0.5 μm, and thus a non-magnetic layer forming composition was prepared.

The back coating layer forming composition was prepared by the following method.

Each component excluding polyisocyanate and cyclohexanone was kneaded and diluted by an open kneader, and was subjected to dispersion processes of 12 passes, with a horizontal beads mill disperser using zirconia beads having a bead diameter of 1 mm, by setting a retention time per pass to 2 minutes at a bead filling rate of 80 vol % and a rotor tip circumferential speed of 10 m/sec. Thereafter, the remaining components were added into the obtained dispersion liquid and were stirred by a dissolver. The dispersion liquid obtained as described above was filtered using a filter having a pore diameter of 1 μm, and thus a back coating layer forming composition was prepared.

(6) Method of Manufacturing Magnetic Tape

The non-magnetic layer forming composition prepared in the section (5) was applied onto a surface of a support made of biaxially stretched polyethylene naphthalate having a thickness of 5.00 μm so that the thickness after the drying becomes 1.00 μm and was dried to form a non-magnetic layer.

Then, in a coating device disposed with a magnet for applying an alternating magnetic field, the magnetic layer forming composition prepared in the section (5) was applied onto a surface of a non-magnetic layer so that the thickness after the drying becomes 0.10 μm, while applying an alternating magnetic field (magnetic field strength: 0.15 T) to form a coating layer. The applying of the alternating magnetic field was performed so that the alternating magnetic field was applied vertically to the surface of the coating layer. After that, a vertical orientation process was performed by applying a direct current magnetic field having a magnetic field intensity of 0.30 T in a vertical direction with respect to a surface of a coating layer, while the coating layer of the magnetic layer forming composition is in a wet (not dried) state. After that, the coating layer was dried to form a magnetic layer.

After that, the back coating layer forming composition prepared in the section (5) was applied onto the surface of the support made of polyethylene naphthalate on a side opposite to the surface on which the non-magnetic layer and the magnetic layer were formed, so that the thickness after the drying becomes 0.50 μm, and was dried to form a back coating layer.

After the magnetic tape obtained as described above was slit to have a width of ½ inches (0.0127 meters), the burnish treatment and the wiping treatment of the surface of the coating layer of the magnetic layer forming composition were performed. The burnish treatment and the wiping treatment were performed by using a commercially available abrasive tape (product name MA22000 manufactured by FUJIFILM Corporation, abrasive: diamond/Cr2O3/bengala) as the abrasive tape, using a commercially available sapphire blade (manufactured by KYOCERA Corporation, width of 5 mm, length of 35 mm, tip angle of 60 degrees) as the grinding blade, and using a commercially available wiping material (product name WRP736 manufactured by KURARAY CO., LTD.) as the wiping material, in the processing apparatus having the configuration shown in FIG. 1 of JP1994-052544 (JP-H06-052544A). As the treatment conditions, the treatment conditions in Example 12 of JP1994-052544A (JP-H01-052544A) were adopted.

After the burnish treatment and the wiping treatment, a calendering treatment (surface smoothing treatment) was performed by using a calender roll configured of only a metal roll, at a speed of 80 m/min, a linear pressure of 300 kg/cm (294 kN/m), and a calender temperature (surface temperature of a calender roll) of 100° C.

Then, the thermal treatment (curing treatment) was performed in an environment of an atmosphere temperature of 70° C. for 36 hours to obtain a magnetic tape.

In a state where the magnetic layer of the obtained magnetic tape was demagnetized, a servo pattern (timing-based servo pattern) having a disposition and a shape according to an LTO Ultrium format was formed on the magnetic layer by a servo write head (leakage magnetic field: 247 kA/m) mounted on the servo writer. Accordingly, a magnetic tape of Example 1 including data bands, servo bands, and guide bands in the disposition according to the LTO Ultrium format in the magnetic layer, and including servo patterns having the disposition and the shape according to the LTO Ultrium format on the servo band was obtained.

Examples 2 to 6 and Comparative Examples 1 to 8

A magnetic tape was manufactured in the same manner as in Example 1 except that various items were changed as shown in Table 1.

For the magnetic tape production method, as shown in Table 1, in Examples 2 to 6, the same method for manufacturing magnetic tape as in Example 1 was performed. That is, the application of the alternating magnetic field was performed during the coating of the magnetic layer forming composition and the burnish treatment and the wiping treatment were performed on the coating layer of the magnetic layer forming composition in the same manner as in Example 1.

With respect to this, in Comparative Examples 1 to 4, 7, and 8, the same method for manufacturing magnetic tape as in Example 1 was performed, except that the application of the alternating magnetic field was not performed during the coating of the magnetic layer forming composition and the burnish treatment and the wiping treatment were not performed on the coating layer of the magnetic layer forming composition.

In Comparative Example 5, the same method for manufacturing magnetic tape as in Example 1 was performed except that the burnish treatment and the wiping treatment were not performed on the coating layer of the magnetic layer forming composition.

In Comparative Example 6, the same method for manufacturing magnetic tape as in Example 1 was performed except that the application of the alternating magnetic field was not performed during the coating of the magnetic layer forming composition.

Comparative Example 9

A magnetic tape was manufactured in the same manner as in Example 1 except that hexagonal barium ferrite powder having an activation volume shown in Table 1 was used as ferromagnetic powder, various conditions were changed as shown in Table 1, and a servo write head having a leakage magnetic field of 366 kA/m was used as the servo write head.

Evaluation of Physical Properties (1) Isoelectric Point of Surface Zeta Potential of Magnetic Layer Six samples for isoelectric point measurement were cut out from each magnetic tape of the examples and the comparative examples, and two samples were placed in a measurement cell in one measurement. In the measurement cell, a sample installing surface and a surface of the back coating layer of the sample were bonded to each other by using a double-sided tape in an upper and lower sample table (size of each sample installing surface is 1 cm×2 cm) of the measurement cell. In a case where an electrolyte flows in the measurement cell after disposing the two samples as described above, the magnetic layer surface of the two samples bonded to each other on the upper and lower sample table of the measurement cell comes into contact with the electrolyte, and thus, the surface zeta potential of the magnetic layer can be measured. The measurement was performed three times in total by using two samples in each measurement, and the isoelectric points of the surface zeta potential of the magnetic layer were obtained. Table 1 shows an arithmetic average of the three values obtained by three times of the measurement as the isoelectric point of the surface zeta potential of the magnetic layer of each magnetic tape. As a surface zeta potential measurement device, SurPASS manufactured by Anton Paar was used. The measurement conditions were set as follows. Other details of the method of obtaining the isoelectric point are as described above.

Measurement cell: variable gap cell (20 mm×10 mm)
Measurement mode: streaming current
Gap: about 200 μm
Measurement temperature: room temperature
Ramp target pressure/time: 400,000 Pa (400 mbar)/60 seconds
Electrolyte: KCl aqueous solution having concentration of 1 mmol/L (adjusted pH to 9)
pH adjusting solution: HCl aqueous solution having concentration of 0.1 mol/L or KOH aqueous solution having concentration of 0.1 mol/L
Measurement pH: pH 9→pH 3 (measured at 13 measurement points in total at interval of about 0.5)

(2) Difference ($L_{99.9}-L_{0.1}$)

A difference ($L_{99.9}-L_{0.1}$) was obtained for each magnetic tape of the examples and the comparative examples by the following method.

Using Dimension 3100 manufactured by Bruker as a magnetic force microscope in a frequency modulation mode and SSS-MFMR (nominal curvature radius of 15 nm) manufactured by Nanoworld AG as a probe, in a range of 90 μm×90 μm of the magnetic layer surface of the magnetic tape on which the servo pattern was formed, rough measurement was performed at a pitch of 100 nm to extract a servo pattern (magnetization region). A distance between a magnetic layer surface and a probe distal end during magnetic force microscopy was 20 nm. Since the above measurement range includes the five servo patterns of the A burst formed in accordance with the LTO Ultrium format, these five servo patterns were extracted.

The magnetic profile was obtained by measuring the vicinity of the boundary between the magnetization region and the non-magnetization region at a pitch of 5 nm, using the magnetic force microscope and the probe, in a downstream edge of each servo pattern in a running direction. Since the obtained magnetic profile was inclined at an angle $\alpha=12°$, rotation correction was performed by analysis software so that the angle $\alpha=0°$.

The measurement was performed at three different portions on the magnetic layer surface. Each measurement range includes five servo patterns of the A burst.

Thereafter, the difference ($L_{99.9}-L_{0.1}$) was obtained by the method described above using analysis software. As analysis software, MATLAB manufactured by MathWorks was used. Such an obtained difference ($L_{99.9}-L_{0.1}$) is shown in Table 1.

Performance Evaluation (1) The recording of data was performed on the magnetic layer of each magnetic tape of the examples and the comparative examples by using a recording and reproducing head mounted on TS 1155 tape drive manufactured by IBM Corporation, under recording conditions of a rate of 6 m/s, a linear recording density of 600 kbpi (255 bit PRBS), and a track pitch of 2 μm. The unit kbpi is a unit of linear recording density (cannot be converted into SI unit system). The PRBS is an abbreviation of Pseudo Random Bit Sequence.

By the recording, a specific track region, where the reading target track is positioned, is formed on the magnetic layer of each magnetic tape between two adjacent tracks, that is, between a first noise mixing source track and a second noise mixing source track.

(2) The following data reading was performed as a model experiment of performing the data reading using the reading element unit including two reading elements disposed in an adjacent state. In the following model experiment, the data reading was performed by bringing the magnetic layer surface and the reading element into contact with each other to be slid on each other.

The reading was started in a state where the magnetic head including a single reading element was disposed so that the center of the reading target track in the tape width direction coincides with the center of the reading element in the track width direction, and a first data reading was performed. During this first data reading, the servo pattern was read by the servo element, and the tracking in the timing-based servo system was also performed. In addition, the data reading operation was performed by the reading element synchronously with the servo pattern reading operation.

Then, the position of the same magnetic head was deviated in the tape width direction (one adjacent track side) by 500 nm, and a second data reading was performed, in the same manner as in the first data reading. The two times of data reading described above were respectively performed under reading conditions of a reproducing element width of 0.2 μm, a rate of 4 m/s, and a sampling rate:bit rate of 1.25 times.

A reading signal obtained by the first data reading was input to an equalizer, and the waveform equalization process according to the deviation amount of the positions between the magnetic tape and the magnetic head (reading element) of the first data reading was performed. This waveform equalization process is a process performed as follows. A ratio between an overlapping region of the reading element and the reading target track and an overlapping region of the reading element and the adjacent track is specified from the deviation amount of the position obtained by reading the servo pattern formed at regular cycle by the servo element. A convolution arithmetic operation of a tap coefficient derived from this specific ratio using an arithmetic expression, was performed with respect to the reading signal, and accordingly, the waveform equalization process was performed. The arithmetic expression is an arithmetic expression in which Extended Partial Response class 4 (EPR4) is set as a reference waveform (target). Regarding a reading signal obtained in the second data reading, the waveform equalization process was performed in the same manner.

By performing a phase matching process (two-dimensional signal process) of the two reading signals subjected to the waveform equalization process, a reading signal which was expected to be obtained by the reading element unit including two reading elements disposed in an adjacent state (reading element pitch=500 nm) was obtained. Regarding the reading signal obtained by doing so, an SNR at a signal detection point was calculated.

(3) The operation of (2) was repeated while performing track off-set of the position of the reading element at the start of the first data reading to the first noise mixing source track and the second noise mixing source track, respectively from the center of the reading target track in the tape width direction at interval of 0.1 μm, and an envelope of the SNR with respect to the track position was obtained.

In each of the examples and the comparative examples, the envelope of the SNR was obtained reading only the first data reading result (that is, data reading result obtained with only a single element).

(4) The envelope of the SNR obtained regarding the data reading result obtained with only the single element was set as a reference envelope, and the SNR decreased from the SNR of the track center of the reference envelope by −3 dB was set as an SNR lower limit value. Regarding each envelope, the maximum track off-set amount equal to or greater than the lower limit value was set as an allowable track off-set amount. In respective examples and the comparative examples, a rate of increase of the allowable track off-set amount with respect to the allowable track off-set amount obtained with only the single element was obtained as a "rate of increase of the allowable track off-set amount".

The results described above are shown in Table 1 (Tables 1-1 and 1-2).

TABLE 1-1

| | | Example 1 | Example 2 | Example 3 | Example 4 | Example 5 | Example 6 |
|---|---|---|---|---|---|---|---|
| Ferromagnetic powder | Activation volume | 1,600 nm$^3$ | 1,600 nm$^3$ | 1,600 nm$^3$ | 1,600 nm$^3$ | 1,600 nm$^3$ | 1,600 nm$^3$ |
| Binding agent content of magnetic liquid | Binding agent A | 5.0 parts | 10.0 parts | 15.0 parts | 20.0 parts | 0 parts | 10.0 parts |
| | Binding agent B | 0 parts | 0 parts | 0 parts | 0 parts | 10 parts | 10 parts |
| Alternating current magnetic field during coating | | Performed | Performed | Performed | Performed | Performed | Performed |
| Burnish treatment | | Performed | Performed | Performed | Performed | Performed | Performed |
| Isoelectric point of surface zeta potential of magnetic layer | | 5.5 | 6.1 | 6.3 | 6.5 | 6.0 | 6.4 |
| Difference ($L_{99.9} - L_{0.1}$) (nm) | | 180 | 165 | 150 | 120 | 150 | 130 |
| Rate of increase of allowable track off-set amount (%) | | 25 | 28 | 30 | 35 | 30 | 33 |

TABLE 1-2

| | | Comparative Example 1 | Comparative Example 2 | Comparative Example 3 | Comparative Example 4 | Comparative Example 5 |
|---|---|---|---|---|---|---|
| Ferromagnetic powder | Activation volume | 1,600 nm$^3$ | 1,600 nm$^3$ | 1,600 nm$^3$ | 1,600 nm$^3$ | 1,600 nm$^3$ |
| Binding agent content of magnetic liquid | Binding agent A | 5.0 parts | 10.0 parts | 15.0 parts | 20.0 parts | 15.0 parts |
| | Binding agent B | 0 parts | 0 parts | 0 parts | 0 parts | 0 parts |
| Alternating current magnetic field during coating | | Not performed | Not performed | Not performed | Not performed | Performed |
| Burnish treatment | | Not performed | Not performed | Not performed | Not performed | Not performed |
| Isoelectric point of surface zeta potential of magnetic layer | | 5.0 | 4.8 | 4.6 | 4.6 | 4.3 |
| Difference ($L_{99.9} - L_{0.1}$) (nm) | | 260 | 260 | 255 | 260 | 260 |
| Rate of increase of allowable track off-set amount (%) | | 2 | 2 | 3 | 2 | 2 |

| | | Comparative Example 6 | Comparative Example 7 | Comparative Example 8 | Comparative Example 9 |
|---|---|---|---|---|---|
| Ferromagnetic powder | Activation volume | 1,600 nm$^3$ | 1,600 nm$^3$ | 1,600 nm$^3$ | 2,500 nm$^3$ |
| Binding agent content of | Binding agent A | 15.0 parts | 0 parts | 10.0 parts | 15.0 parts |

TABLE 1-2-continued

|  |  |  |  |  |  |
|---|---|---|---|---|---|
| magnetic liquid | Binding agent B | 0 parts | 10 parts | 10 parts | 0 parts |
| Alternating current magnetic field during coating | | Not performed | Not performed | Not performed | Not performed |
| Burnish treatment | | Performed | Not performed | Not performed | Not performed |
| Isoelectric point of surface zeta potential of magnetic layer | | 4.6 | 4.8 | 4.7 | 4.6 |
| Difference ($L_{99.9} - L_{0.1}$) (nm) | | 260 | 260 | 260 | 155 |
| Rate of increase of allowable track off-set amount (%) | | 2 | 2 | 2 | 15 |

As shown in Table 1, according to the examples, the rate of increase of the allowable track off-set amount equal to or greater than 20% could be realized.

A large allowable track off-set amount obtained by the method described above is advantageous, from a viewpoint of performing the reproducing with excellent reproducing quality, even with a small track margin. From this viewpoint, a rate of increase of the allowable track off-set amount is preferably equal to or greater than 20%.

An aspect of the present invention is useful in magnetic recording where it is desired to reproduce high density recorded data with excellent reproducing quality.

What is claimed is:

1. A magnetic tape comprising:
a non-magnetic support; and
a magnetic layer including ferromagnetic powder and a binding agent,
wherein the magnetic layer has a timing-based servo pattern,
wherein an edge shape of the timing-based servo pattern, specified by magnetic force microscopy is a shape in which a difference $L_{99.9}-L_{0.1}$ between a value $L_{99.9}$ of a cumulative distribution function of 99.9% and a value $L_{0.1}$ of a cumulative distribution function of 0.1% in a position deviation width from an ideal shape of the magnetic tape in a longitudinal direction is 180 nm or less, and
wherein an isoelectric point of a surface zeta potential of the magnetic layer is 5.5 or more.

2. The magnetic tape according to claim 1,
wherein the isoelectric point is 5.5 or more and 7.0 or less.

3. The magnetic tape according to claim 1,
wherein the binding agent is a binding agent containing an acidic group.

4. The magnetic tape according to claim 3,
wherein the acidic group includes at least one type of acidic group selected from the group consisting of a sulfonic acid group and a salt thereof.

5. The magnetic tape according to claim 1,
wherein the timing-based servo pattern is a linear servo pattern which continuously extends from one side of the magnetic tape in a width direction to the other side thereof and is inclined at an angle α with respect to the width direction, and
wherein the ideal shape is a linear shape extending in a direction of the angle α.

6. The magnetic tape according to claim 1,
wherein the difference $L_{99.9}-L_{0.1}$ is 100 nm or more and 180 nm or less.

7. The magnetic tape according to claim 1, further comprising:
a non-magnetic layer including non-magnetic powder and a binding agent between the non-magnetic support and the magnetic layer.

8. The magnetic tape according to claim 1, further comprising:
a back coating layer including non-magnetic powder and a binding agent on a surface side of the non-magnetic support opposite to a surface side provided with the magnetic layer.

9. A magnetic tape cartridge comprising:
the magnetic tape according to claim 1.

10. The magnetic tape cartridge according to claim 9,
wherein the isoelectric point is 5.5 or more and 7.0 or less.

11. The magnetic tape cartridge according to claim 9,
wherein the binding agent is a binding agent containing an acidic group.

12. The magnetic tape cartridge according to claim 11,
wherein the acidic group includes at least one type of acidic group selected from the group consisting of a sulfonic acid group and a salt thereof.

13. The magnetic tape cartridge according to claim 9,
wherein the timing-based servo pattern is a linear servo pattern which continuously extends from one side of the magnetic tape in a width direction to the other side thereof and is inclined at an angle α with respect to the width direction, and
wherein the ideal shape is a linear shape extending in a direction of the angle α.

14. The magnetic tape cartridge according to claim 9,
wherein the difference $L_{99.9}-L_{0.1}$ is 100 nm or more and 180 nm or less.

15. A magnetic tape apparatus comprising:
a magnetic tape;
a reading element unit; and
an extraction unit,
wherein the magnetic tape is the magnetic tape according to claim 1,
wherein the reading element unit includes a plurality of reading elements each of which reads data from a specific track region including a reading target track in a track region included in the magnetic tape, and
wherein the extraction unit performs a waveform equalization process with respect to each reading result for each reading element, to extract, from the reading result, data derived from the reading target track.

16. The magnetic tape apparatus according to claim 15,
wherein the isoelectric point is 5.5 or more and 7.0 or less.

17. The magnetic tape apparatus according to claim 15,
wherein the binding agent is a binding agent containing an acidic group.

18. The magnetic tape apparatus according to claim 17,
wherein the acidic group includes at least one type of acidic group selected from the group consisting of a sulfonic acid group and a salt thereof.

19. The magnetic tape apparatus according to claim 15,
wherein the timing-based servo pattern is a linear servo pattern which continuously extends from one side of the magnetic tape in a width direction to the other side thereof and is inclined at an angle $\alpha$ with respect to the width direction, and wherein the ideal shape is a linear shape extending in a direction of the angle $\alpha$.

20. The magnetic tape apparatus according to claim 15, wherein the difference $L_{99.9}-L_{0.1}$ is 100 nm or more and 180 nm or less.

* * * * *